US009725569B2

(12) United States Patent
Holtcamp et al.

(10) Patent No.: US 9,725,569 B2
(45) Date of Patent: Aug. 8, 2017

(54) POROUS PROPYLENE POLYMERS

(71) Applicant: ExxonMobil Chemical Patents Inc., Baytown, TX (US)

(72) Inventors: Matthew W. Holtcamp, Huffman, TX (US); Gregory S. Day, College Station, TX (US); Jian Yang, Houston, TX (US); Lubin Luo, Houston, TX (US); Steven D. Brown, League City, TX (US); Rohan A. Hule, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/142,021

(22) Filed: Apr. 29, 2016

(65) Prior Publication Data

US 2016/0355653 A1 Dec. 8, 2016

Related U.S. Application Data

(60) Provisional application No. 62/171,581, filed on Jun. 5, 2015.

(51) Int. Cl.
*C08J 9/00* (2006.01)
*C08F 4/02* (2006.01)
(Continued)

(52) U.S. Cl.
CPC ...... *C08J 9/00* (2013.01); *C08F 4/02* (2013.01); *C08F 10/06* (2013.01);
(Continued)

(58) Field of Classification Search
CPC . C08J 9/00; C08J 2323/10; C08F 4/02; C08F 4/65012; C08F 4/65916; C08L 23/10; C08L 23/14
See application file for complete search history.

(56) References Cited

U.S. PATENT DOCUMENTS

| 5,411,994 A | 5/1995 | Galli et al. |
| 5,539,076 A | 7/1996 | Nowlin et al. |

(Continued)

FOREIGN PATENT DOCUMENTS

| EP | 1 205 493 | 5/2002 |
| EP | 1 380 598 | 1/2004 |

(Continued)

OTHER PUBLICATIONS

Cecchin, G. et al., "On the Mechanism of Polypropene Growth over MgCl2/TiCl4 Catalyst Systems," Macromolecular Chemistry and Physics, 2001, vol. 202, No. 10, p. 1987-1994.

(Continued)

*Primary Examiner* — Caixia Lu
(74) *Attorney, Agent, or Firm* — Catherine L. Bell

(57) ABSTRACT

This invention relates to high porosity (≥15%) and/or low pore diameter (PD<165 μm) propylene polymers and propylene polymerization processes using single site catalyst systems with supports having high surface area (SA≥400 m$^2$/g), low pore volume (PV≤2 mL/g), a specific mean pore diameter range (PD=1-20 nm), and high average particle size (PS≥30 μm).

25 Claims, 9 Drawing Sheets

(51) Int. Cl.
*C08F 4/6592* (2006.01)
*C08F 10/06* (2006.01)
*C08F 4/659* (2006.01)

(52) U.S. Cl.
CPC ...... *C08F 4/65912* (2013.01); *C08F 4/65927* (2013.01); *C08J 2323/12* (2013.01)

(56) References Cited

U.S. PATENT DOCUMENTS

| | | |
|---|---|---|
| 5,547,756 A | 8/1996 | Kamo et al. |
| 5,589,549 A | 12/1996 | Govoni et al. |
| 5,661,098 A | 8/1997 | Harrison et al. |
| 5,990,242 A | 11/1999 | Naga et al. |
| 6,001,764 A | 12/1999 | Pullukat et al. |
| 6,069,213 A | 5/2000 | Nemzek et al. |
| 6,174,930 B1 | 1/2001 | Agarwal et al. |
| 6,262,195 B1 | 7/2001 | Dall'Occo et al. |
| 6,329,315 B1 | 12/2001 | Denton et al. |
| 6,350,830 B1 | 2/2002 | Gores et al. |
| 6,429,250 B1 | 8/2002 | Rohrmann et al. |
| 6,777,366 B2 | 8/2004 | Gauthier et al. |
| 6,777,367 B2 | 8/2004 | Gauthier et al. |
| 6,787,616 B2 | 9/2004 | Takemori et al. |
| 6,855,783 B2 | 2/2005 | Gauthier et al. |
| 6,916,886 B2 | 7/2005 | Morioka et al. |
| 6,992,153 B1 | 1/2006 | Collina et al. |
| 8,399,375 B2 | 3/2013 | Itan et al. |
| 8,557,917 B2 | 10/2013 | Leskinen et al. |
| 9,249,239 B2 | 2/2016 | Jian et al. |
| 9,376,559 B2 | 6/2016 | Holtcamp et al. |
| 9,458,257 B2 | 10/2016 | Funaya et al. |
| 2002/0147105 A1 | 10/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1* | 10/2009 | Ciaccia ................ C08F 210/06 526/127 |
| 2011/0034649 A1 | 2/2011 | Standaert et al. |
| 2011/0081817 A1 | 4/2011 | Bieser et al. |
| 2011/0112262 A1 | 5/2011 | Gauthier et al. |
| 2011/0160373 A1 | 6/2011 | Bernreitner et al. |
| 2013/0253124 A1 | 9/2013 | Bernreiter et al. |
| 2013/0345376 A1 | 12/2013 | Luo et al. |
| 2014/0221514 A1 | 8/2014 | Datta et al. |
| 2014/0303308 A1* | 10/2014 | Grestenberger ........ C08L 23/10 524/528 |
| 2014/0357771 A1* | 12/2014 | Tranninger ............. C08L 23/14 524/210 |
| 2015/0025205 A1 | 1/2015 | Yang et al. |
| 2015/0025208 A1 | 1/2015 | Yang et al. |
| 2015/0119537 A1 | 4/2015 | Holtcamp et al. |
| 2016/0137763 A1 | 5/2016 | Holtcamp et al. |
| 2016/0355618 A1 | 12/2016 | Luo et al. |
| 2016/0355619 A1 | 12/2016 | Ye et al. |
| 2016/0355654 A1 | 12/2016 | Luo et al. |
| 2016/0355655 A1 | 12/2016 | Luo et al. |
| 2016/0355656 A1 | 12/2016 | Luo et al. |
| 2016/0355657 A1 | 12/2016 | Luo et al. |

FOREIGN PATENT DOCUMENTS

| | | |
|---|---|---|
| EP | 1 541 598 | 6/2005 |
| JP | 2003-073414 | 3/2003 |
| JP | 2012-214709 | 11/2012 |
| WO | WO 96/11218 | 4/1996 |
| WO | WO 2004/092225 | 10/2004 |
| WO | WO 2014/016318 | 1/2014 |
| WO | WO 2015/065676 | 5/2015 |
| WO | WO 2015/070360 | 5/2015 |
| WO | 2016/196331 | 12/2016 |
| WO | 2016/197014 | 12/2016 |
| WO | 2016/197037 | 12/2016 |

OTHER PUBLICATIONS

Chen, J. et al., "Preparation and characterization of agglomerated porous hollow silica supports for olefin polymerization catalyst," Journal of Non-Crystalline Solids, 2007, vol. 353, No. 11-12, pp. 1030-1036.

Pasquini, N., (Ed.), Polypropylene Handbook, 2005, $2^{nd}$ Ed., Hanser Publishers, Munich, pp. 78-89.

Shinamoto, Ron et al., "Microspherical Silica Supports with High Pore Volume for Metallocene Catalysts," presented at Metallocenes Europe '97 Dusseldorf, Germany, Apr. 8-9, 1997.

Smit, M. et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.

Von Hohenesche, C. et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.

Mortazavi, M.M. et al., "*Characterization of MAO-Modified Silicas for Ethylene Polymerization,*" Journal of Applied Polymer Science, 2013, vol. 130, No. 6, pp. 4568-4575.

D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.

Zheng et al., "Fragmentation Behavior of Silica-Supported Metallocene/MAO Catalysts in the Early Stages of Olefin Polymerization," Macromolecules, 2005, vol. 35, No. 11, pp. 4673-4678.

Imhoff et al., "Characterization of Methylaluminoxanes and Determination of Trimethylaluminum Using Proton NMR", Organometallics, 1998, vol. 17, pp. 1941-1945.

Kaminsky, "Highly Active Metallocene Catalysts for Olefin Polymerization," Journal of Chemical Society, Dalton Trans., 1998, pp. 1413-1418.

Sinn, "Proposals for Structure and Effect of Methylalumoxane Based on Mass Balances and Phase Separation Experiments," Macromolecular Symposia, 1995, vol. 97, Issue 1, pp. 27-52.

* cited by examiner

POROUS PROPYLENE POLYMERS

CROSS REFERENCE TO RELATED APPLICATIONS

This invention claims priority to and the benefit of U.S. Ser. No. 62/171,581, filed Jun. 5, 2015.

FIELD OF THE INVENTION

This invention relates to porous propylene polymers and methods to make and use them.

BACKGROUND OF THE INVENTION

Recently, efforts have been made to prepare heterophasic copolymers, such as an impact copolymer (ICP), using newly developed metallocene (MCN) catalysis technology to capitalize on the benefits such catalysts provide. Homopolymers prepared with such "single-site" catalysts often have a narrow molecular weight distribution (MWD), low extractables, and a variety of other favorable properties associated therewith, and copolymers often also have narrow composition distributions.

Unfortunately, common MCN, immobilized on a conventional support coated with an activator such as methylalumoxane (MAO), is not able to provide copolymer components with sufficiently high molecular weight and/or rubber loadings under commercially relevant process conditions. Compared to their Ziegler-Natta (ZN) system catalyzed counterparts, the iPP matrix of the ICP prepared using MCN has a low porosity, and is unable to hold a sufficiently high rubber content within the iPP matrix required for toughness and impact resistance. Also, the MCN-ICP has an MWD that is too narrow to obtain sufficient crystalline, low molecular weight polymer required for stiffness. The formation of rubber in a separate phase outside the matrix is undesirable, e.g., it can result in severe reactor fouling.

Pore structures in conventional iPP, whether from ZN or MCN systems, are understood to be generated from the fast crystallization of low molecular weight portions of the polymer that causes volumetric shrinkage during crystallization. Nello Pasquini (Ed.), *Polypropylene Handbook*, 2nd Edition, Hanser Publishers, Munich, pp. 78-89, (2005), reports volumetric shrinkage processes only generate low porosities for limited rubber loadings, e.g., 7% porosity from a conventional ZN catalyst system, and 16% more is obtained through the treatment of the $MgCl_2$-supported ZN system via controlled dealcoholation, allowing the iPP matrix to be filled with a rubber content nearing 25 wt %. Cecchin, G. et al., *Marcromol. Chem. Phys.*, vol. 202, p. 1987 (2001), report that the micromorphologies of catalyst systems based on magnesium chloride-supported titanium tetrachloride ($MgCl_2/TiCl_4$) contribute to the morphology of the polymer granules. However, the rubber content of such an ICP obtained from an in-reactor, one-catalyst system is still significantly lower than the 40 wt % rubber content that can be achieved in a polymer blend ICP, which provides flexibility for the rubber content that is sometimes desired.

Accordingly, it has been elusive to balance the toughness and stiffness of a one-catalyst, sequential polymerization ICP, since on the one hand, the formation of high porosity and high fill rubber loading needed for toughness requires the presence of a high concentration of hydrogen to form the low molecular weight polymers needed for the fast-crystallization shrinkage, and on the other hand, polymerization under these conditions for maximizing porosity detracts from the stiffness of the resulting ICP.

U.S. Pat. No. 5,990,242 approaches this problem by using an ethylene/butene (or higher alphaolefin) copolymer second component, rather than a propylene copolymer, prepared using a hafnocene type MCN. Such hafnium MCNs are generally useful for producing relatively higher molecular weight polymers; however, their activities are typically much lower than the more commonly used zirconocenes. In any event, the second component molecular weights and intrinsic viscosities are lower than desired for good impact strength.

WO 2004/092225 discloses MCN polymerization catalysts supported on silica having a 10-50 μm particle size (PS), 200-800 $m^2/g$ surface area, and 0.9 to 2.1 mL/g pore volume, and shows an example of a 97 μm PS, 643 $m^2/g$ surface area and 3.2 mL/g pore volume silica (p. 12, Table I, support E (MS3060)) used to obtain iPP (pp. 18-19, Tables V and VI, run 21).

EP 1 380 598 discloses certain MCN catalysts supported on silica having a 2-12 m PS, 600-850 $m^2/g$ surface area, and 0.1 to 0.8 mL/g pore volume, and shows an example of silica having a 6.9 μm PS, 779 $m^2/g$ surface area and 0.23 mL/g pore volume (p. 25, Table 3, Ex. 16) to obtain polyethylene.

EP 1 541 598 discloses certain MCN catalysts supported on silica having a 2 to 20 μm particle size, 350-850 $m^2/g$ surface area, and 0.1 to 0.8 mL/g pore volume (p. 4, lines 15-35), and shows an example of a 10.5 μm particle size, 648 $m^2/g$ surface area and 0.51 mL/g pore volume silica (see p. 17, Example 12) for an ethylene polymerization.

EP 1 205 493 describes a 1126 $m^2/g$ specific surface area (SA) and 0.8 cc/g structural porous volume (small pores only) silica support used with an MCN catalyst for ethylene copolymerization (Examples 1, 6 and 7).

JP 2003073414 describes a 1 to 200 μm particle size (PS), 500 $m^2/g$ or more SA, and 0.2 to 4.0 mL/g pore volume (PV) silica, but shows examples of propylene polymerization with certain MCNs where the silica has particle sizes of 12 μm and 20 μm.

JP 2012214709 describes 1.0 to 4.0 μm PS, 260 to 1000 $m^2/g$ SA, and 0.5 to 1.4 mL/g PV silica used to polymerize propylene.

Other references of interest include US 2011/0034649; US 2011/0081817; Madri Smit et al., Journal of Polymer Science: Part A: Polymer Chemistry, Vol. 43, pp. 2734-2748, (2005); and "Microspherical Silica Supports with High Pore Volume for Metallocene Catalysts," Ron Shinamoto and Thomas J. Pullukat, presented at "Metallocenes Europe '97 Dusseldorf, Germany, Apr. 8-9, 1997.

Accordingly, there is need for new catalysts and/or processes that produce polypropylene materials that meet the needs for use in particular applications, such as one or more of: porosity, a good balance of stiffness and toughness, and/or other properties needed for high impact strength; homopolymers and copolymers with narrow MWD, low extractables, bimodal MWD, bimodal PSD, narrow composition distribution, and/or other benefits of MCN catalyzed homopolymers and copolymers; high porosity propylene polymers; heterophasic copolymers with a high fill loading of a second polymer component in a first polymer component; preparation of bimodal MWD or PSD heterophasic copolymers in a single-catalyst, sequential polymerization process; economic production using commercial-scale processes and conditions; and combinations thereof.

SUMMARY OF THE INVENTION

In some embodiments of the invention, porous polypropylene and propylene polymerization processes are presented, which process can produce new propylene polymers having the benefits of metallocene (MCN) catalyzed polymers in addition to properties desirable for high impact strength or other applications. Importantly, these polymers can be economically produced using commercial-scale processes and conditions.

In one aspect, embodiments of the invention relate to a propylene polymer comprising: at least 50 mol % propylene; a 1% Secant flexural modulus (1% SFM) of at least 1000 MPa, determined according to ASTM D 790 (A, 1.0 mm/min); between greater than 5 and less than 200 regio defects per 10,000 propylene units, determined by $^{13}C$ NMR; if a comonomer is present, a composition distribution breadth index (CDBI) of 50% or more; and a matrix comprising a porosity of about 15% or more and a median PD between greater than 6 μm and less than 160 μm, as determined by mercury intrusion porosimetry. In some embodiments of the invention, the propylene polymer comprises a multimodal PSD, a multimodal MWD, a heterophasic copolymer comprising a fill phase, or a combination thereof.

In another aspect, embodiments of the invention relate to a process to polymerize propylene comprising: (a) contacting propylene monomer under polymerization conditions with a catalyst system, the catalyst system comprising a single site catalyst precursor compound, an activator, and a support, the support having an average particle size (PS) of more than 30 μm, e.g., more than 50 μm and or up to 200 μm, a specific surface area (SA) of 400 m$^2$/g or more, e.g., 400 to 1000 m$^2$/g (e.g., 400-650 m$^2$/g or 650-1000 m$^2$/g), a pore volume (PV) of from 0.5 to 2 mL/g, e.g., 0.5 to 1.5 mL/g, and a mean PD of from 1 to 20 nm, e.g., 1 to 7 nm or 7 to 20 nm; and (b) forming a matrix of propylene polymer comprising at least 50 mol % propylene and a porosity of 15% or more, e.g., 30 to 85%, as determined by mercury intrusion porosimetry. In some embodiments of the invention, the support in (a) comprises agglomerates of a plurality of primary particles, and/or the propylene polymer matrix formed in (b) has a median PD less than 165 μm, e.g., less than 160 μm, as determined by mercury intrusion porosimetry.

DEFINITIONS

Figure 1:
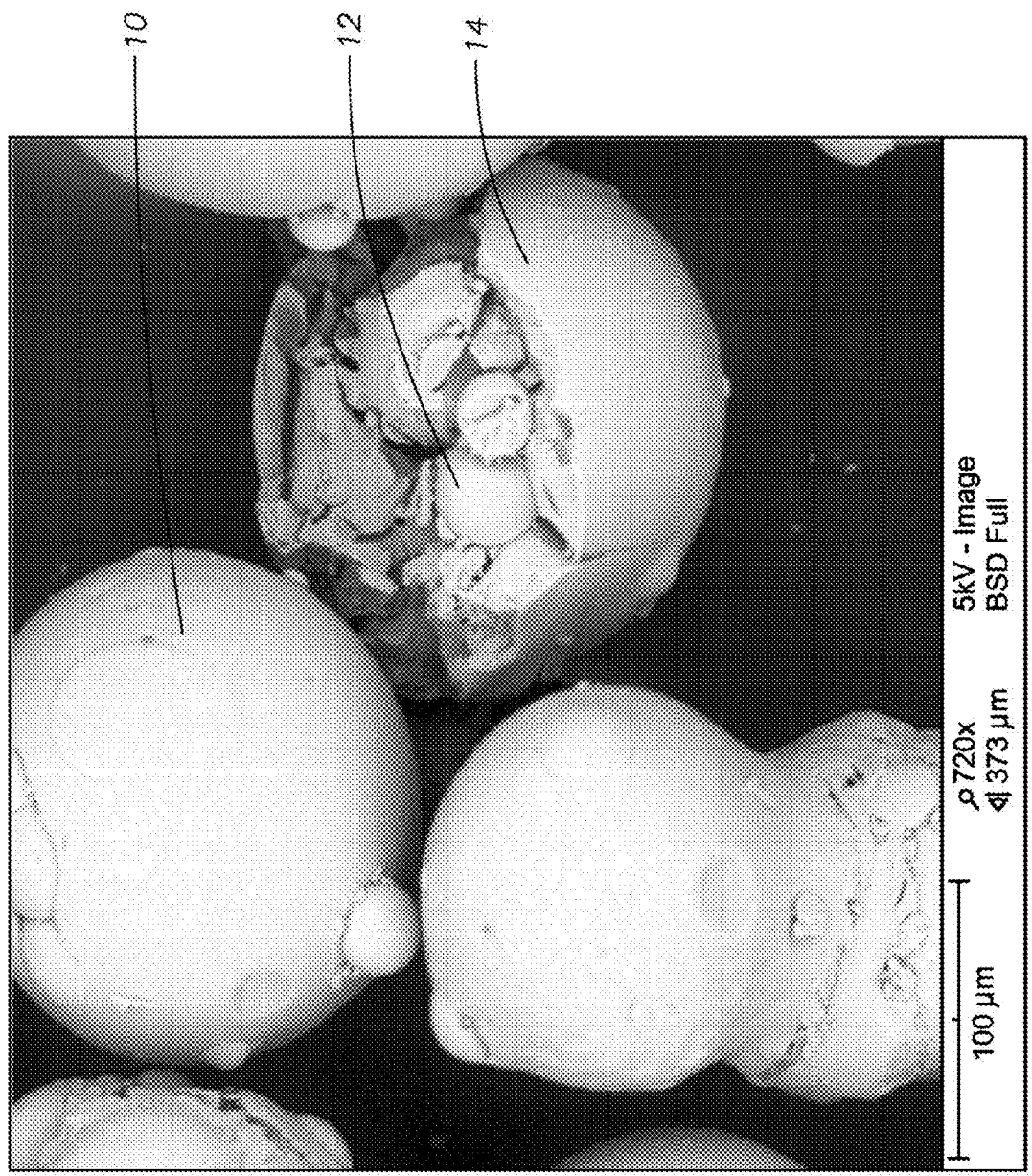
FIG. 1 is an electron micrograph showing D 150-60A silica comprising agglomerated primary particles.

For purposes of this disclosure and the claims appended thereto, the new numbering scheme for the Periodic Table Groups is used as described in CHEMICAL AND ENGINEERING NEWS, 63(5), p. 27, (1985).

For purposes herein "mean" refers to the statistical mean or average, i.e., the sum of a series of observations or statistical data divided by the number of observations in the series, and the terms mean and average are used interchangeably; "median" refers to the middle value in a series of observed values or statistical data arranged in increasing or decreasing order, i.e., if the number of observations is odd, the middle value, or if the number of observations is even, the arithmetic mean of the two middle values.

For purposes herein, the mode, also called peak value or maxima, refers to the value or item occurring most frequently in a series of observations or statistical data, i.e., the inflection point. An inflection point is that point where the second derivative of the curve changes in sign. For purposes herein, a multimodal distribution is one having two or more peaks, i.e., a distribution having a plurality of local maxima; a bimodal distribution has two inflection points; and a unimodal distribution has one peak or inflection point.

For purposes herein, particle size (PS) or diameter, and distributions thereof, are determined by laser diffraction using a MASTERSIZER 3000 (range of 1 to 3500 m) available from Malvem Instruments, Ltd., Worcestershire, England. Average PS refers to the distribution of particle volume with respect to particle size. Unless otherwise indicated expressly or by context, "particle" refers to the overall particle body or assembly such as an aggregate, agglomerate, or encapsulated agglomerate, rather than subunits or parts of the body, such as the "primary particles" in agglomerates or the "elementary particles" in an aggregate.

For purposes herein, the surface area (SA, also called the specific surface area or BET surface area), pore volume (PV), and mean or average pore diameter (PD) of catalyst support materials are determined by the Brunauer-Emmett-Teller (BET) method using adsorption-desorption of nitrogen (temperature of liquid nitrogen: 77 K) with a MICROMERITICS TRISTAR II 3020 instrument after degassing of the powders for 4 hrs. at 350° C. More information regarding the method can be found, for example, in *"Characterization of Porous Solids and Powders: Surface Area, Pore Size and Density,"* S. Lowell et al., Springer, 2004, PV refers to the total PV, including both internal and external PV. Mean PD refers to the distribution of total PV with respect to PD.

For purposes herein, porosity of polymer particles refers to the volume fraction or percentage of PV within a particle or body comprising a skeleton or matrix of the propylene polymer, on the basis of the overall volume of the particle or body with respect to total volume. The porosity and median PD of polymer particles are determined using mercury intrusion porosimetry. Mercury intrusion porosimetry involves placing the sample in a penetrometer and surrounding the sample with mercury. Mercury is a non-wetting liquid to most materials and resists entering voids, doing so only when pressure is applied. The pressure at which mercury enters a pore is inversely proportional to the size of the opening to the void. As mercury is forced to enter pores within the sample material, it is depleted from a capillary stem reservoir connected to the sample cup. The incremental volume depleted after each pressure change is determined by measuring the change in capacity of the stem. This intrusion volume is recorded with the corresponding pressure. Unless otherwise specified, all porosimetry data are obtained using MICROMERITICS ANALYTICAL SERVICES and/or the AUTOPORE IV 9500 mercury porosimeter.

The skeleton of the matrix phase of a porous, particulated material in which the pores are formed is inclusive of nonpolymeric and/or inorganic inclusion material within the skeleton, e.g., catalyst system materials including support material, active catalyst system particles, catalyst system residue particles, or a combination thereof. As used herein, "total volume" of a matrix refers to the volume occupied by the particles comprising the matrix phase, i.e., excluding interstitial spaces between particles but inclusive of interior pore volumes or internal porosity within the particles. "Internal" or "interior" pore surfaces or volumes refer to pore surfaces and/or volumes defined by the surfaces inside the particle which cannot be contacted by other similar particles, as opposed to external surfaces which are surfaces capable of contacting another similar particle.

Where the propylene polymer is wholly or partially filled, e.g., in the context of the pores containing a fill rubber or fill material other than the propylene polymer, the porosity also refers to the fraction of the void spaces or pores within the particle or body regardless of whether the void spaces or pores are filled or unfilled, i.e., the porosity of the particle or body is calculated by including the volume of the fill material as void space as if the fill material were not present.

For purposes herein, "as determined by mercury intrusion porosimetry" shall also include and encompass "as if determined by mercury intrusion porosimetry," such as, for example, where the mercury porosimetry technique cannot be used, e.g., in the case where the pores are filled with a non-gaseous material such as a fill phase. In such a case, mercury porosimetry may be employed on a sample of the material obtained prior to filling the pores with the material or just prior to another processing step that prevents mercury porosimetry from being employed, or on a sample of the material prepared at the same conditions used in the process to prepare the material up to a point in time just prior to filling the pores or just prior to another processing step that prevents mercury porosimetry from being employed.

The term "agglomerate" as used herein refers to a material comprising an assembly, of primary particles held together by adhesion, i.e., characterized by weak physical interactions such that the particles can easily be separated by mechanical forces, e.g., particles joined together mainly at corners or edges. The term "primary particles" refers to the smallest, individual disagglomerable units of particles in an agglomerate (without fracturing), and may in turn be an encapsulated agglomerate, an aggregate or a monolithic particle. Agglomerates are typically characterized by having an SA not appreciably different from that of the primary particles of which it is composed. Silica agglomerates are prepared commercially, for example, by a spray drying process.

Figure 2:
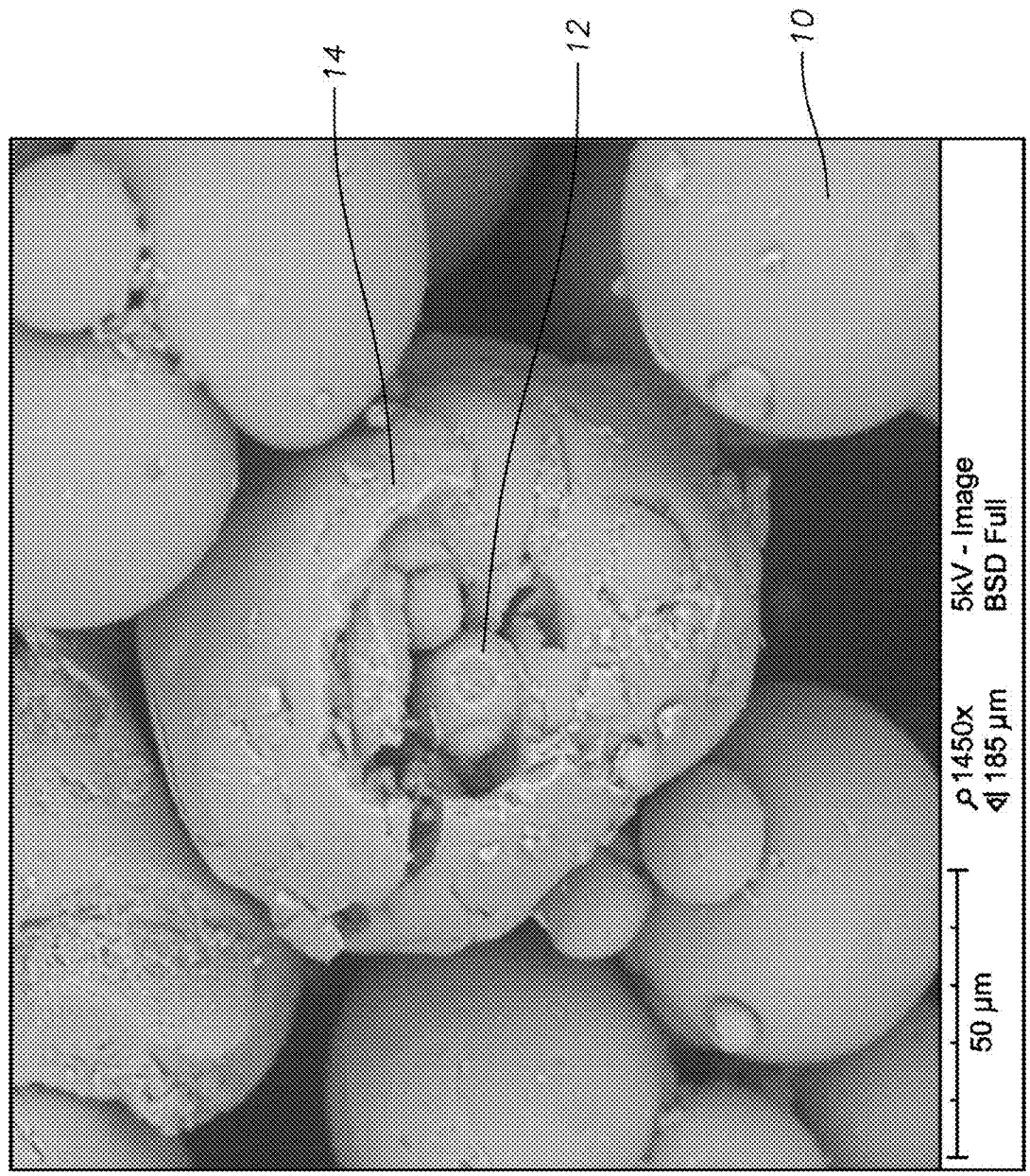
FIG. 2 is an electron micrograph showing PD 13054 silica comprising agglomerated primary particles.

FIGS. 1-2 show examples of encapsulated agglomerates 10, which, as seen in the partially opened particles, are comprised of a plurality of primary particles 12. FIG. 1 shows an electron micrograph of D 150-60A silica, which appears as generally spherical particles or grains 10, which, as seen in a partially opened particle, are actually agglomerates comprised of a plurality of substructures or primary particles 12 within the outer spherical shell or aggregate surface 14 that partially or wholly encapsulates the agglomerates. Likewise, FIG. 2 is an electron micrograph of PD 13054, showing interior agglomerates 10 comprised of around 5-50 µm primary particles and encapsulating aggregate 14. The examples shown are for illustrative purposes only and the sizes of the particles shown may not be representative of a statistically larger sample; the majority of the primary particles in this or other commercially available silicas may be larger or smaller than the image illustrated, e.g., 2 µm or smaller, depending on the particular silica production process employed by the manufacturer.

"Aggregates" are an assembly of elementary particles sharing a common crystalline structure, e.g., by a sintering or other physico-chemical process such as when the particles grow together. Aggregates are generally mechanically unbreakable, and the specific surface area of the aggregate is substantially less than that of the corresponding elementary particles. An "elementary particle" refers to the individual particles or grains in or from which an aggregate has been assembled. For example, the primary particles in an agglomerate may be elementary particles or aggregates of elementary particles. For more information on agglomerates and aggregates, see Walter, D., Primary Particles—Agglomerates—Aggregates, in Nanomaterials (ed Deutsche Forschungsgemeinschaft), Wiley-VCH Verlag GmbH & Co. KGaA, Weinheim, Germany, doi: 10.1002/9783527673919, pp. 1-24 (2013).

Figure 3:
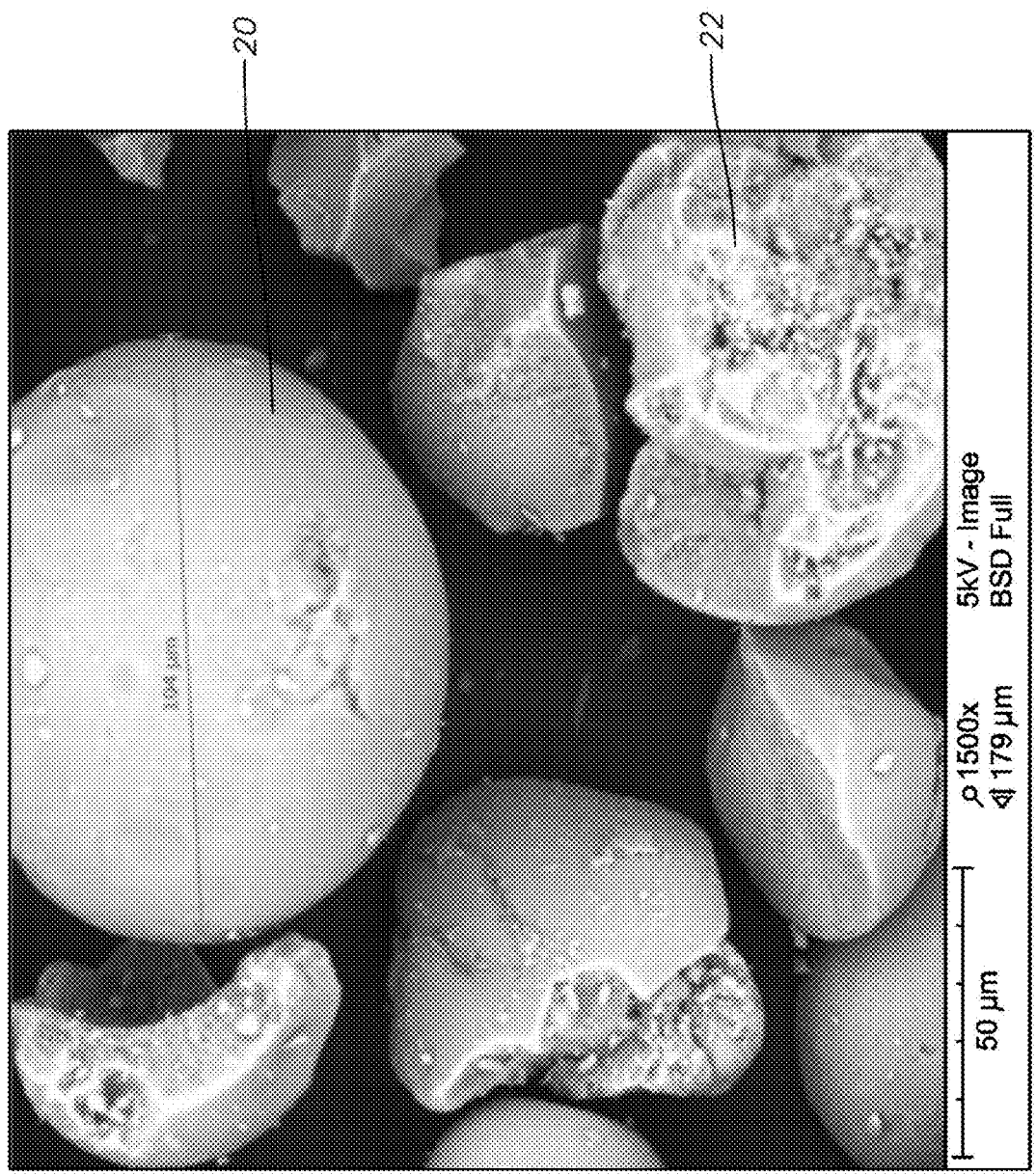
FIG. 3 is an electron micrograph showing a comparative MS 3050 silica.

The terms "monolith" or "monolithic" refer to a material formed of a single mass of material, and include aggregates as well as bulk materials without any defined geometry or grain structure. FIG. 3 shows a comparative support MS 3050, comprised of generally spherical particles 20 with an entirely aggregated or monolithic core 22, lacking the agglomerated primary particles and internal pore morphology of the FIG. 1-2 supports.

The terms "capsule" or "encapsulated" or "microencapsulated" are used interchangeably herein to refer to an agglomerate in the 1-1000 µm size range comprising an exterior surface that is coated or otherwise has a physical barrier that inhibits disagglomeration of the primary particles from the interior of microencapsulated agglomerate. The barrier or coating may be an aggregate, for example, of primary and/or elementary particles otherwise constituted of the same material as the agglomerate. FIGS. 1-2 show examples of microencapsulated agglomerates 10 comprised of a plurality of primary particles 12 within an outer aggregate surface or shell 14 that partially or wholly encapsulates the agglomerates, in which the primary particles may be allowed to disagglomerate by fracturing, breaking, dissolving, chemically degrading or otherwise removing all or a portion of the shell 14.

In the case of spray dried, amorphous, hydrated-surface silica as one example, the agglomerates 10 may typically have an overall size range of 1-300 µm (e.g., 30-200 µm), the primary particles 12 a size range of 0.001-50 µm (e.g., 50-400 nm or 1-50 µm), and the elementary particles a size range of 1-400 nm (e.g., 5-40 nm). As used herein, "spray dried" refers to metal oxide such as silica obtained by expanding a sol in such a manner as to evaporate the liquid from the sol, e.g., by passing the silica sol through a jet or nozzle with a hot gas.

"Disagglomeration" or "disagglomerating" refers to the degradation of an agglomerate to release free primary particles and/or smaller fragments, which may also include reaction products and/or materials supported on a surface thereof, e.g., activator and/or catalyst precursor compounds supported thereon. For example, dispersion in a liquid is a typical process by which unencapsulated agglomerates may be disagglomerated. Optionally, disagglomeration may also form smaller agglomerates as the residues from which one or more primary particles has been released and/or as the result of re-agglomeration of free primary particles and/or smaller fragments.

"Fracturing" as used herein refers to the degradation of monoliths, aggregates, primary particles, shells or the like. "Fragmentation" or "fragmenting" refers collectively to the release of relatively smaller particles whether by disagglomeration, fracturing, and/or some other process, as the case may be. The term "fragments" is used herein to refer to the smaller particles including residue agglomerates and any new particles formed from the preceding larger particles resulting from fragmentation, including agglomerate residues of primary particles, free primary particles, fracturing residues whether smaller or larger than the primary particles, and including any of such particles with or without supportation products thereon or therein. Fragmentation, especially where disagglomeration is a primary mechanism, may occur essentially without the formation of fines, i.e., the formation of less than 2 vol % fines, based on the total volume of the agglomerate. As used herein "fines" generally refers to particles smaller than 0.5 µm.

Fragmentation can occur by the external application of thermal forces, such as high heat, such as during calcination of support particles, and/or the presence of mechanical forces from crushing under compression or from the impact of moving particles into contact with other particles and/or onto fixed surfaces, sometimes referred to as "agitation fragmentation." Fragmentation can also result in some embodiments herein from the insertion, expansion and/or other interaction of materials in connection with pores of the particles, such as, for example, when MAO is inserted or polymer is formed in the pores, and subunits of the support particle are broken off or the support particle otherwise expands to force subunits of the particle away from other subunits, e.g., causing a capsule to break open, forcing primary particles away from each other and/or fracturing primary particles, such as may occur during polymerization or during a heat treatment for catalyst preparation or activation. This latter type of fragmentation is referred to herein as "expansion fragmentation" and/or "expansion disagglomeration" in the case of disagglomerating particles from an agglomerate, including microencapsulated agglomerates.

For purposes of this specification and the claims appended thereto, when referring to polymerizing in the presence of at least X mmol hydrogen or other chain transfer or termination agent ("CTA") per mole of propylene, the ratio is determined based upon the amounts of hydrogen or other chain transfer agent and propylene fed into the reactor. A "chain transfer agent" is hydrogen or an agent capable of hydrocarbyl and/or polymeryl group exchange between a coordinative polymerization catalyst and a metal center of the CTA during polymerization.

Unless otherwise indicated, "catalyst productivity" is a measure of how many grams of polymer (Pol or P) are produced using a polymerization catalyst comprising W g of catalyst (cat), over a period of time of T hrs.; and may be expressed by the following formula: P/(T×W) and expressed in units of grams polymer divided by the product of grams catalyst and time in hrs. (gPol gcat$^{-1}$ hr.$^{-1}$).

Unless otherwise indicated, "conversion" is the amount of monomer that is converted to polymer product, and is reported as mol %, and is calculated based on the polymer yield and the amount of monomer fed into the reactor.

Unless otherwise indicated, "catalyst activity" is a measure of how active the catalyst is and is reported as the mass of product polymer (P) produced per mole of catalyst (cat) transition metal used (kg P/mol cat).

An "olefin", alternatively referred to as "alkene", is a linear, branched, or cyclic compound of carbon and hydrogen having at least one double bond. For the purposes of this invention, ethylene shall be considered an α-olefin. An "alkene" group is a linear, branched, or cyclic radical of carbon and hydrogen having at least one double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

An "ethylene polymer" or "polyethylene" or "ethylene copolymer" is a polymer or copolymer comprising at least 50 mol % ethylene derived units; a "propylene polymer" or "polypropylene" or "propylene copolymer" is a polymer or copolymer comprising at least 50 mol % propylene derived units; and so on. The term "polypropylene" is meant to encompass isotactic polypropylene (iPP), defined as having at least 10% or more isotactic pentads, highly isotactic polypropylene, defined as having 50% or more isotactic pentads, syndiotactic polypropylene (sPP), defined as having at 10% or more syndiotactic pentads, homopolymer polypropylene (hPP, also called propylene homopolymer or homopolypropylene), and so-called random copolymer polypropylene (RCP, also called propylene random copolymer). Herein, an RCP is specifically defined to be a copolymer of propylene and 1 to 10 wt % of an olefin chosen from ethylene and $C_4$ to $C_8$ 1-olefins. Preferably isotactic polymers (such as IPP) have at least 20% (preferably at least 30%, preferably at least 40%) isotactic pentads. A polyolefin is "atactic", also referred to as "amorphous" if it has less than 10% isotactic pentads and syndiotactic pentads.

The terms "ethylene-propylene rubber" or "EP rubber" (EPR) mean a copolymer of ethylene and propylene, and, optionally, one or more diene monomer(s), where the ethylene content is from 35 to 85 mol %, the total diene content is 0 to 5 mol %, and the balance is propylene with a minimum propylene content of 15 mol %.

The term "hetero-phase" or "heterophasic" refers to the presence of two or more morphological phases in a composition comprising two or more polymers, where each phase comprises a different polymer or a different ratio of the polymers as a result of partial or complete immiscibility (i.e., thermodynamic incompatibility). A common example is a morphology consisting of a continuous matrix phase and at least one dispersed or discontinuous phase. The dispersed phase takes the form of discrete domains (particles) distributed within the matrix (or within other phase domains, if there are more than two phases). Another example is a co-continuous morphology, where two phases are observed but it is unclear which one is the continuous phase, and which is the discontinuous phase, e.g., where a matrix phase has generally continuous internal pores and a fill phase is deposited within the pores, or where the fill phase expands within the pores of an initially globular matrix phase to expand the porous matrix globules, corresponding to the polymer initially formed on or in the support agglomerates, into subglobules which may be partially or wholly separated and/or co-continuous or dispersed within the fill phase, corresponding to the polymer formed on or in the primary particles of the support. For example, a polymer globule may initially have a matrix phase with a porosity corresponding to the support agglomerates, but a higher fill phase due to expansion of the fill phase in interstices between subglobules of the matrix phase.

The presence of multiple phases is determined using microscopy techniques, e.g., optical microscopy, scanning electron microscopy (SEM), or atomic force microscopy (AFM); or by the presence of two glass transition (Tg) peaks in a dynamic mechanical analysis (DMA) experiment; or by a physical method such as solvent extraction, e.g., xylene extraction at an elevated temperature to preferential separate one polymer phase; in the event of disagreement among these methods, DMA performed according to the procedure set out in US 2008/0045638 at page 36, including any references cited therein, shall be used.

A "polypropylene impact copolymer" or simply an "impact copolymer" (ICP), is a combination, typically heterophasic, of crystalline and amorphous polymers, such as, for example, iPP and rubber, which provide the ICP with both stiffness and toughness, i.e., a stiffness greater than that of one or more of the amorphous polymer(s) and a toughness greater than that of one or more of the crystalline polymer(s). An ICP may typically have a morphology such that the matrix phase comprises a higher proportion of the crystalline polymer, and a rubber is present in a lower proportion in a dispersed or co-continuous phase, e.g., a blend comprising 60 to 95 wt % of a matrix of iPP, and 5 to 40 wt % of an ethylene, propylene or other polymer with a $T_g$ of −30° C. or less.

The term "sequential polymerization" refers to a polymerization process wherein different polymers are produced at different periods of time in the same or different reactors, e.g., to produce a multimodal and/or heterophasic polymer. The terms "gas phase polymerization," "slurry phase polymerization," "homogeneous polymerization process," and "bulk polymerization process" are defined below.

The term "continuous" means a system that operates without interruption or cessation. For example, a continuous process to produce a polymer would be one where the reactants are continually introduced into one or more reactors and polymer product is continually withdrawn.

As used herein, Mn is number average molecular weight, Mw is weight average molecular weight, Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weights (e.g., Mw, Mn, and Mz) are g/mol and are determined by GPC-DRI as described below. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane, OTf is trifluoromethanesulfonate.

Ambient temperature, also referred to herein as room temperature (RT), is 23° C.±3° C. unless otherwise indicated.

A "catalyst system" is a combination of at least one catalyst precursor compound, at least one activator, an optional co-activator, and a support material. A polymerization catalyst system is a catalyst system that can polymerize monomers to polymer. For the purposes of this invention and the claims thereto, when catalyst systems are described as comprising neutral stable forms of the components, it is well understood by one of ordinary skill in the art that the ionic form of the component is the form that reacts with the monomers to produce polymers.

In the description herein, the single site catalyst precursor compound may be described as a catalyst precursor, a catalyst precursor compound, a pre-catalyst compound, metallocene or MCN, metallocene compound, metallocene catalyst, metallocene catalyst compound, metallocene catalyst precursor compound or a transition metal compound, or similar variation, and these terms are used interchangeably. A catalyst precursor compound is a neutral compound without polymerization activity, e.g., $Cp_2ZrCl_2$, which requires an activator, e.g., MAO, to form an active catalyst species, e.g., $[Cp_2ZrMe]^+$, or a resting active catalyst species, e.g., $[Cp_2Zr(\mu\text{-Me})_2AlMe_2]^+$ to become capable of polymerizing olefin monomers. A metallocene catalyst is defined as an organometallic compound (and may sometimes be referred to as such in context) with at least one π-bound cyclopentadienyl moiety (or substituted cyclopentadienyl moiety) and more frequently two π-bound cyclopentadienyl moieties or substituted cyclopentadienyl moieties. Indene, substituted indene, fluorene and substituted fluorene are all substituted cyclopentadienyl moieties.

The phrase "compositionally different" means the compositions in question differ by at least one atom. For example cyclopentadiene differs from methyl cyclopentadiene in the presence of the methyl group. For example "bisindenyl zirconium dichloride" is different from "(indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilyl-bis(2-methyl 4-phenyl)hafnium dimethyl is considered to be the same as meso-dimethylsilylbis(2-methyl 4-phenyl)hafnium dimethyl.

An organometallic compound is defined as a compound containing at least one bond between a carbon atom of an organic compound and a metal, and is typically, although not always, capable of deprotonating hydroxyl groups, e.g., from a support material. A deprotonating agent is defined as a compound or system capable of deprotonating hydroxyl groups from the support, and may be an organometallic or another compound such as a metal amide, e.g., aluminum amide or lithium amide.

An "anionic ligand" is a negatively charged ligand, which donates one or more pairs of electrons to a metal ion. A "neutral donor ligand" is a neutrally charged ligand, which donates one or more pairs of electrons to a metal ion.

The terms "cocatalyst" and "activator" are used herein interchangeably and are defined to be any compound which can activate the catalyst precursor compound by converting a neutral catalyst precursor compound to a catalytically active catalyst compound cation. The terms, "non-coordinating anion" (NCA), "compatible" NCA, "bulky activator," "molecular volume," "less bulky," "more bulky," are defined below.

In embodiments, the heterophasic propylene polymer composition produced herein, e.g., comprising fill rubber, or produced with phased hydrogen supply, and/or produced after time period B when specified, may be referred to herein as an impact copolymer, or a propylene impact copolymer, or an in-reactor propylene impact copolymer, or an in-reactor propylene impact copolymer composition, and such terms are used interchangeably herein.

The terms "hydrocarbyl radical", "hydrocarbyl" and "hydrocarbyl group" are used interchangeably throughout this document. Likewise, the terms "group", "radical", and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

A substituted hydrocarbyl radical is a hydrocarbyl radical where at least one hydrogen has been replaced by a heteroatom or heteroatom containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where $R^*$ is independently a hydrocarbyl or halocarbyl radical and two or more $R^*$ may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of Groups 1-17 of the periodic table either alone or connected to other elements by covalent or other interactions, such as ionic, van der Waals forces, or hydrogen bonding. Examples of functional groups include carboxylic acid, acid halide, carboxylic ester, carboxylic salt, carboxylic anhydride, aldehyde and their chalcogen (Group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, sulfonates, phosphines, phosphates, other phosphorus compounds, silanes, boranes, borates, alanes, aluminates. Functional groups may also be taken broadly to include organic polymer supports or inorganic support material, such as alumina, and silica. Preferred examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$ and the like, where $R^*$ is independently a hydrocarbyl, substituted hydrocarbyl, halocarbyl or substituted halocarbyl radical as defined above and two $R^*$ may join together to form a substituted or unsubstituted saturated, partially unsaturated or aromatic cyclic or polycyclic ring structure. Also preferred are sulfonate radicals, $S(=O)_2OR^*$, where $R^*$ is defined as above. Examples include $SO_3Me$ (mesylate), $SO_3$(4-tosyl) (tosylate), $SO_3CF_3$ (triflate), $SO_3$(n-$C_4F_9$) (nonaflate), and the like.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl", or "substituted indenyl", or "substituted aryl", the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

As used herein, "and/or" means either or both (or any or all) of the terms or expressions referred to, and "and or" means the earlier one(s) of the terms or expressions referred to or both (all) of the terms or expressions referred to, i.e., the later term or expression is optional.

DETAILED DESCRIPTION OF THE INVENTION

The present invention in some embodiments provides highly porous propylene polymers. In some embodiments of the invention the propylene polymer comprises at least 50 mol % propylene; a 1% Secant flexural modulus (1% SFM) of at least 1000 MPa, determined according to ASTM D 790 (A, 1.0 mm/min); between greater than 5 and less than 200 regio defects per 10,000 propylene units, determined by $^{13}C$ NMR; if a comonomer is present, a composition distribution breadth index (CDBI) of 50% or more; and a matrix comprising a porosity of about 15% or more, preferably 30% or more, and a median PD between greater than 6 and less than 160 μm, as determined by mercury intrusion porosimetry. In some embodiments of the invention, the propylene polymer comprises a multimodal PSD, a multimodal MWD, a heterophasic copolymer comprising a fill phase, or a combination thereof.

In some embodiments of the invention, the polymer is in a particulated form wherein at least 95% by volume has a particle size greater than about 120 µm.

In some embodiments of the invention, the polymer further comprises an active catalyst system dispersed in the matrix, the catalyst system comprising a single site catalyst precursor compound, an activator for the precursor compound, and a support having a specific surface area of 400 m²/g or more, a pore volume of from 0.5 to 2 mL/g, and a mean pore diameter of from 1 to 20 nm (10 to 200 Å).

In some embodiments of the invention, the polymer further comprises a heterophasic copolymer comprising a fill phase at least partially filling the pores in the matrix.

In some embodiments of the invention, the polymer comprises: a total propylene content of at least 75 wt %; if comonomer is present, a total co-monomer content from about 3 wt % up to about 25 wt %; if comonomer is present, a CDBI of at least 60%; a matrix porosity of at least 35%; a matrix median pore diameter greater than 8 µm and less than 150 µm, as determined by mercury intrusion porosimetry; at least 50% isotactic pentads; more than 10 regio defects per 10,000 propylene units, determined by 13C NMR; a 1% Secant flexural modulus of at least 1800 MPa; a melting point (Tm, DSC peak second melt) of at least 145° C.; an Mw/Mn as measured by GPC-DRI of greater than 1 up to 5; a multimodal molecular weight distribution with an overall Mw/Mn of greater than 1 to 20 and at least one mode having an Mw/Mn of greater than 1 to 5; at least 95% by volume having a particle size greater than 150 µm up to 10 mm; a melt flow rate (MFR, ASTM 1238, 230° C., 2.16 kg) from about 0.1 dg/min up to about 300 dg/min; an Mw (as measured by GPC-DRI) from 50,000 to 1,000,000 g/mol; or a combination thereof.

In some embodiments of the invention, the catalyst systems and supports described herein are useful in a process to polymerize propylene, e.g., to make highly porous propylene polymers. In some embodiments of the invention, the process to polymerize propylene comprises: (a) contacting propylene monomer under polymerization conditions with a catalyst system comprising a single site catalyst precursor compound, an activator, and a support, the support having an average PS of more than 30 µm, e.g., more than 50 µm and or up to 200 µm, a surface area of 400 m²/g or more, e.g., 400 to 1000 m²/g (e.g., 400-650 m²/g or 650-1000 m²/g), a PV of from 0.5 to 2 mL/g (e.g., 0.5 to 1.5 mL/g), and a mean PD of from 1 to 20 nm, e.g., 1 to 7 nm or 7 to 20 nm; and (b) forming a matrix of propylene polymer comprising at least 50 mol % propylene and a porosity of 15% or more, e.g., 30 to 85%, as determined by mercury intrusion porosimetry. In some embodiments of the invention, the support in (a) comprises agglomerates of a plurality of primary particles, and/or the propylene polymer matrix formed in (b) comprises a median PD less than 165 µm or less than 160 µm as determined by mercury intrusion porosimetry. In some embodiments of the process, the catalyst system(s) may comprise one or more of any of the catalyst systems described herein.

According to some embodiments of the invention, the contacting of the propylene monomer with the catalyst system is carried out in a slurry. According to some embodiments of the invention, the polymerization conditions comprise a pressure of from about 0.96 MPa (140 psi) to about 5.2 MPa (750 psi) and a temperature of from about 50° C. to 100° C.

According to some embodiments of the invention, the propylene monomer in (a) is essentially free of ethylene and $C_4$ to $C_{20}$ alpha olefins, and the propylene polymer formed is a propylene homopolymer. According to some embodiments of the invention, the process further comprises varying a concentration of hydrogen or other CTA in (a), wherein the propylene polymer formed in (b) has a multimodal MWD.

According to some embodiments of the invention, the process further comprises melt processing the propylene polymer at a shear rate of 1000 sec$^{-1}$ or more.

According to some embodiments of the process, the propylene polymer formed in (b) comprises a matrix comprising a porosity of 15% or more, based on the total volume of the matrix, and a median PD less than 160 µm, as determined by mercury intrusion porosimetry.

Preferred embodiments of the catalyst system, support, activator, catalyst precursor compound, and co-activator are described in more detail below.

Support Materials:

In embodiments according to the invention herein, the catalyst system may comprise porous solid particles as an inert support material to which the catalyst precursor compound and/or activator may be anchored, bound, adsorbed or the like. Preferably, the support material is an inorganic oxide in a finely divided form. Suitable inorganic oxide materials for use in MCN catalyst systems herein include Groups 2, 4, 13, and 14 metal oxides, such as silica, alumina, magnesia, titania, zirconia, and the like, and mixtures thereof. Other suitable support materials, however, can be employed, for example, finely divided functionalized polyolefins, such as finely divided polyethylene or polypropylene. Particularly useful supports include silica, magnesia, titania, zirconia, montmorillonite, phyllosilicate, zeolites, talc, clays, and the like. Also, combinations of these support materials may be used, for example, silica-chromium, silica-alumina, silica-titania, and the like.

In some preferred embodiments, the support material preferably comprises silica, e.g., amorphous silica, which may include a hydrated surface presenting hydroxyl or other groups which can be deprotonated to form reactive sites to anchor activators and/or catalyst precursors. Other porous support materials may optionally be present with the preferred silica as a co-support, for example, talc, other inorganic oxides, zeolites, clays, organoclays, or any other organic or inorganic support material and the like, or mixtures thereof.

The support materials of some embodiments of the invention, unexpectedly, are generally resistant to agitation fragmentation or expansion fragmentation during calcination temperatures. In some embodiments, the support can be calcined essentially free of fragmentation, i.e., the PS distribution is not changed significantly and/or less than 5 vol % of primary particles (if present) and/or fines is generated, by total volume of the support material.

According to some embodiments of the invention, the support material is then contacted with the activator (described in more detail below, at least one single site catalyst precursor compound (described in more detail below), and/or cocatalyst (described in more detail below), and optionally, a scavenger or co-activator (described in more detail below).

According to some embodiments of the invention, the support in, and/or used to prepare, the catalyst system, preferably has or comprises the following:

a) an average particle size (PS) and/or a PS mode of more than 30 µm, or more than 40 µm, or more than 50 µm, or more than 60 μm, or more than 65 μm, or more than 70 μm, or more than 75 μm, or more than 80 μm, or more than 85 μm, or more than 90 μm, or more than 100 μm, or more than 120 μm; and/or up to 200 μm, or less than 180 μm, or less than 160 μm, or less than 150 μm, or less than 130 μm; e.g., 30-200 μm, or 50-200 μm, or 60-200 μm;

b) a pore volume (PV) from at least 0.1 mL/g, or at least 0.15 mL/g, or at least 0.2 mL/g, or at least 0.25 mL/g, or at least 0.3 mL/g, or at least 0.5 mL/g; and/or up to 2 mL/g, or less than 1.6 mL/g, or less than 1.5 mL/g, or less than 1.4 mL/g, or less than 1.3 mL/g; e.g., 0.5-2 mL/g or 0.5-1.5 mL/g or 1.1-1.6 mL/g;

c) a specific surface area (SA) of less than 1400 $m^2/g$, or less than 1200 $m^2/g$, or less than 1100 $m^2/g$, or less than 1000 $m^2/g$, or less than 900 $m^2/g$, or less than 850 $m^2/g$, or less than 800 $m^2/g$, or less than 750 $m^2/g$, or less than 700 $m^2/g$, or less than 650 $m^2/g$; and/or more than 400 $m^2/g$, or more than 600 $m^2/g$, or more than 650 $m^2/g$, or more than 700 $m^2/g$; e.g., 400-1000 $m^2/g$, or 600-1000 $m^2/g$, or 650-1000 $m^2/g$, or 700-1000 $m^2/g$, or 400-650 $m^2/g$, or 400-700 $m^2/g$;

d) a mean pore diameter (PD) greater than 0.1 nm, greater than 1 nm, or greater than 2 nm, or greater than 3 nm, or greater than 4 nm, or greater than 5 nm, or greater than 6 nm, or greater than 7 nm, or greater than 8 nm; and/or less than 20 nm, or less than 15 nm, or less than 13 nm, or less than 12 nm, or less than 10 nm, or less than 8 nm, or less than 7 nm, or less than 6 nm; e.g., 1-7 nm, or 1-8 nm, or 1-13 nm, or 7-13 nm, or 8-13 nm, or 7-20 nm, or 8-20 nm;

e) agglomerates composed of a plurality of primary particles, the primary particles having an average PS of 1 nm to less than 50 μm, or 1 μm to less than 30 μm;

f) microencapsulated agglomerates;

g) spray dried;

h) silica, e.g., amorphous silica and/or silica having a hydrated surface; and/or i) any combination or subcombination thereof.

In some embodiments, the support comprises an agglomerate of a plurality of primary particles, and in further embodiments the support is at least partially encapsulated. Additionally or alternatively, the support comprises a spray dried material, e.g., spray dried silica. In embodiments according to the present invention, the support materials, in addition to meeting the PS, SA, PV and PD characteristics, are preferably made from a process that agglomerates smaller primary particles, e.g., average PS in the range of 0.001-50 μm, into the larger agglomerates with average PS in the range of 30-200 μm, such as those from a spray drying process. The larger particles, i.e., the agglomerates, may thus comprise small particles, i.e., primary particles. Either or both of the agglomerates and/or primary particles can have high or low sphericity and roundness, e.g., a Wadell sphericity of 0.8 or more, 0.85 or more, 0.9 or more, or 0.95 or more, or less than 0.95, less than 0.90, less than 0.85, or less than 0.8; and a Wadell roundness from 0.1 or less up to 0.9 or more.

The SA, PV, and mean PD, are generally interrelated, in some embodiments, in that within certain ranges of these parameters the product of the mean PD and SA may be proportional to the PV. The PV, PD, and SA in some embodiments are preferably selected to balance the desired mechanical strength with the desired activator loading, i.e., high SA to accommodate high activator and catalyst loading, yet not too high so as to maintain sufficient strength to avoid fragmentation during calcination or from agitation and handling, while at the same time avoiding excessive strength, which might undesirably inhibit fragmentation during polymerization in some embodiments. Preferably, to meet these requirements the support materials in some embodiments of the invention have PS in the range of 30-200 μm, SA 400-1000 $m^2/g$, PV 0.5-2 mL/g, and mean PD 1-20 nm. Silicas which may be suitable according to some embodiments of the invention are commercially available under the trade designations D 150-60A, D 100-100A, D 70-120, PD 13054, PD 14024, and the like. This combination of property ranges is in contrast to most other silica supports used for MCN catalysts for iPP. For example, if the SA is too low, the activity may be low; if the PV is too high, the particles may be mechanically fragile; if the PS and/or PV are too small, the result may be low activity, low porosity, low rubber fill, excess surface-deposited rubber, and/or reactor fouling; and if the PS is too large, heat removal is inefficient, monomer mobility into the interior of the polymer particle is limited, monomer concentration is insufficient, chain termination is premature, and/or low molecular weights result.

In some embodiments, agglomerates having, within the preferred ranges of SA≥400 $m^2/g$ and mean PD=1-20 nm, either a lower SA, e.g., less than 700 $m^2/g$ or less than 650 $m^2/g$, and/or a higher mean PD, e.g., more than 7 nm or more than 8 nm, have higher strength and are more resistant to debris dominated fragmentation during the supportation process, which can thus be carried out at higher temperatures, and higher catalyst loadings can be achieved for higher catalyst activity.

In some other embodiments, on the other hand, agglomerates with SA greater than 650 $m^2/g$ or greater than 700 $m^2/g$, and mean PD less than 8 nm or less than 7 nm, can be prepared with minimal fragmentation with carefully controlled process conditions such as low supportation reaction temperatures, and yet may more readily fragment during polymerization, which can lead to relatively higher propylene polymer porosity and/or higher fill phase content in the case of heterophasic copolymers. On the other hand, when SA is in the range of about 650 or 700 $m^2/g$ or higher, to maintain mechanical strength the PD must be low, e.g., less than 7 nm, and the silica fragmentation can be promoted, if desired, using supportation conditions that facilitate the essentially complete or partial fragmentation, e.g., at a temperature higher than about 40 or 60° C.

According to some embodiments of the invention, the support material may further comprise, in addition to or in combination with any one or more of the support materials or supported catalyst systems or mixtures described above, an optional second or co-support material, which may be designed to promote the polymerization of another propylene polymer or copolymer (as in a bimodal polypropylene) and/or another olefin polymer or copolymer, e.g., a rubber fill material or an EP rubber (as in an impact copolymer). The second catalyst support material according to some embodiments of the invention, when present, is most preferably an inorganic oxide, has SA in the range of from about 10 to about 700 $m^2/g$, PV in the range of from about 0.1 to about 4.0 mL/g, and average PS in the range of from about 5 to about 500 μm. More preferably, the SA of the second catalyst support material is in the range of from about 50 to about 500 $m^2/g$, PV of from about 0.5 to about 3.5 mL/g and average PS of from about 10 to about 200 m. Most preferably the SA of the second catalyst support material is in the range is from about 100 to about 400 $m^2/g$, PV from about 0.8 to about 3.0 mL/g and average PS is from about 5 to about 100 μm. The mean PD of the second catalyst support material useful in some embodiments of the invention is in the range of from 1 to 100 nm (10 to 1000 Å), preferably 5 to 50 nm (50 to about 500 Å), and most preferably 7.5 to 35 nm (75 to about 350 Å). In some embodiments of the invention, the second catalyst support material is a high SA, amorphous silica (surface area=300 m$^2$/gm; pore volume of 1.65 mL/gm). Preferred second support silicas, when present, are marketed under the tradenames listed in Table A, especially GRACE 952 (also known as DAVISON 952) or GRACE 955 (also known as DAVISON 955) by the Davison Chemical Division of W.R. Grace and Company, and in other embodiments GRACE 948 (also known as DAVISON 948) second support is used.

The support material can be used wet, i.e., containing adsorbed water, or dry, that is, free of absorbed water. The amount of absorbed water can be determined by standard analytical methods, e.g., LOD (loss of drying) from an instrument such as LECO TGA 701 under conditions such as 300° C. for 3 hrs. In some embodiments of the invention, wet support material (without calcining) can be contacted with the activator or another organometallic compound as otherwise described below, with the addition of additional organometallic or other scavenger compound that can react with or otherwise remove the water, such as a metal alkyl. For example, contacting wet silica with an aluminum alkyl such as AlMe$_3$, usually diluted in an organic solvent such as toluene, forms in-situ MAO, and if desired additional MAO can be added to control the desired amount of MAO loaded on the support, in a manner otherwise similar as described below for dry silica.

Drying of the support material can be effected according to some embodiments of the invention by heating or calcining above about 100° C., e.g., from about 100° C. to about 1000° C., preferably at least about 200° C. When the support material is silica, according to some embodiments of the invention it is heated to at least 130° C., preferably about 130° C. to about 850° C., and most preferably at about 200-600° C.; and for a time of 1 minute to about 100 hrs., e.g., from about 12 hrs. to about 72 hrs., or from about 24 hrs. to about 60 hrs. The calcined support material in some embodiments according to this invention, comprises at least some groups reactive with an organometallic compound, e.g., reactive hydroxyl (OH) groups to produce the supported catalyst systems of this invention.

Supportation:

According to some embodiments of the invention, the support is treated with an organometallic compound to react with deprotonated reactive sites on the support surface. In general the support is treated first with an organometallic activator such as MAO, and then the supported activator is treated with the MCN, optional metal alkyl co-activator, as in the following discussion for illustrative purposes, although the MCN and or co-activator can be loaded first, followed by contact with the other catalyst system components, especially where the activator is not an organometallic compound or otherwise reactive with the support surface.

The support material in some embodiments, having reactive surface groups, typically hydroxyl groups, e.g., after calcining (or metal alkyl treatment, e.g., in the wet process), is slurried in a non-polar solvent and contacted with the organometallic compound (activator in this example), preferably dissolved in the solvent, preferably for a period of time in the range of from about 0.5 hrs. to about 24 hrs., from about 2 hrs. to about 16 hrs., or from about 4 hrs. to about 8 hrs. Suitable non-polar solvents are materials in which, other than the support material and its adducts, all of the reactants used herein, i.e., the activator, and the MCN compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The mixture of the support material and activator (or other organometallic compound) in various embodiments of the invention may generally be heated or maintained at a temperature of from about −60° C. up to about 130 or 140° C., such as, for example: about 40° C. or below, about 23° C. or below, about −20° C. or below; from about 10° C. or 20° C. up to about 60° C. or about 40° C.; about 23° C. or about 25° C. or above; or from about 40° C., about 60° C., or about 80° C. up to about 100° C., or about 120° C. Where the support may be susceptible to fragmentation during activator/catalyst precursor supportation (e.g., SA≥650 m$^2$/g, PD≤7 nm), fragmentation can be controlled through the manipulation of reaction conditions to inhibit fragmentation such as at a lower reaction temperature, e.g., −60-40° C., preferably −20° C.-30° C., to achieve <10 vol % fragmented particles, preferably <5 vol % fragmented particles; or to promote fragmentation such as at a higher reaction temperature, e.g., ≥40° C., preferably ≥60° C., to achieve >10 vol % fragmented particles, e.g., 10-80 vol % fragmented particles, such as 10-20 vol % fragmented particles, 20-70 vol % fragmented particles, 70-90 vol % fragmented particles, >90 vol % fragmented particles or the like. In general, the time and temperature required to promote fragmentation are inversely related, i.e., at a higher temperature, debris dominated fragmentation may require a shorter period of time.

According to some embodiments of the present invention, the support material is not fragmented during supportation or other treatment prior to polymerization, i.e., the supported catalyst system has a PSD that is essentially maintained upon treatment with the organometallic compound and/or less than 5 vol % of fines is generated by volume of the total support material, e.g., where the support material is resistant to fragmentation, or supportation conditions are selected to inhibit fragmentation.

Maintaining a sufficiently large average PS or PS mode of the supported catalyst system material, according to some embodiments of the invention, facilitates the formation of sufficiently large propylene polymer particles rich with small pores, which can, for example, be readily filled with rubber fill, e.g., in making an ICP or other heterophasic copolymer. On the other hand, an excess of porous polypropylene fines, e.g., 5 vol % or more smaller than 120 µm, generally formed from smaller particles such as the primary particles of the support material agglomerates or sub-primary particle debris or fines, may result in fouling or plugging of the reactor, lines or equipment during the polymerization of a rubber in the presence of the porous polypropylene or vice versa, and/or in the formation of non-particulated polymer.

In embodiments according to the present invention, the supported catalysts, e.g., on silica with SA>about 650 m$^2$/g and PD<about 70 Å, are able to polymerize propylene to produce iPP resins with very high stiffness, e.g., up to 2200 MPa 1% secant flexural modulus. In some embodiments according to the present invention, the supported catalysts, e.g., on silica with balanced PS, SA, PV, and PD, such as, for example, PS 70-100 µm, SA 400-650 m$^2$/g, PV 1.1-1.6 mL/g, and PD 90-120 Å, and prepared under low fragmentation conditions, are able to polymerize propylene to produce iPP resins, and/or having relatively high porosity, e.g., greater than 30%. Furthermore, highly porous structures can house active catalytic species to continue polymerizing additional monomers to form second phase copolymers in heterophasic copolymers such as ICP with improved physical/chemical properties. ICP resins prepared from the catalysts based on MAO supported on support materials with limited fragmentation as disclosed herein have been discovered to show improved ethylene-propylene (EP) rubber uptake.

In contrast to known catalyst support materials which may have a conventional unimodal distribution of particle sizes, the mixtures of finished catalyst supported on fragmented and non-fragmented supports, according to some embodiments of the invention are bimodal in PSD, and different polypropylene properties are thereby achieved, and with the result that the different polypropylene properties can be balanced as desired. Additionally, in some embodiments, the PSD of the resulting iPP resin changes according to the PSD of the supported catalyst system, i.e., support fragments produce smaller iPP particles relative to the larger iPP particles formed from the larger more or less intact agglomerates. In general, in the context of propylene polymerization according to various embodiments of the present invention, the non-fragmented support particles facilitate the formation of large PS, high PV, low PD, fillable polypropylene particles, whereas the fragments may facilitate a higher catalyst activity and formation of a polypropylene with smaller PS and higher stiffness, and thus the porosity, rubber fill content and stiffness can be balanced by selecting the appropriate mix of fragmented and non-fragmented supports.

Figure 7:
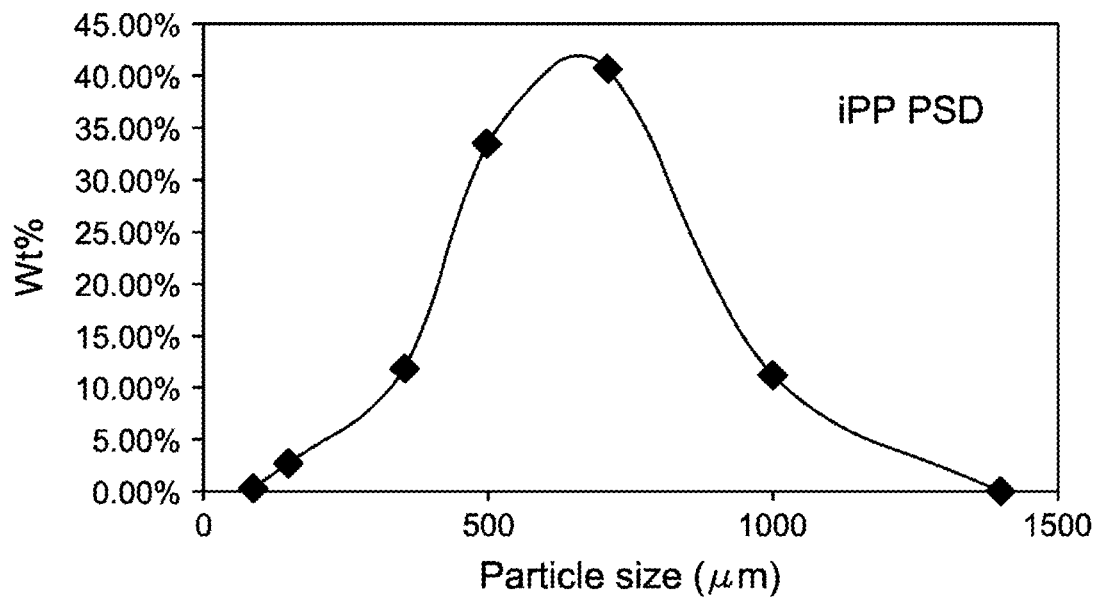
FIG. 7 is a graphical representation showing a typical particle size distribution (PSD) of CiPP6 particles produced using a catalyst supported on a comparative silica, showing a PSD from a heat-treated catalyst supportation process according to Example 6.
Figure 8:
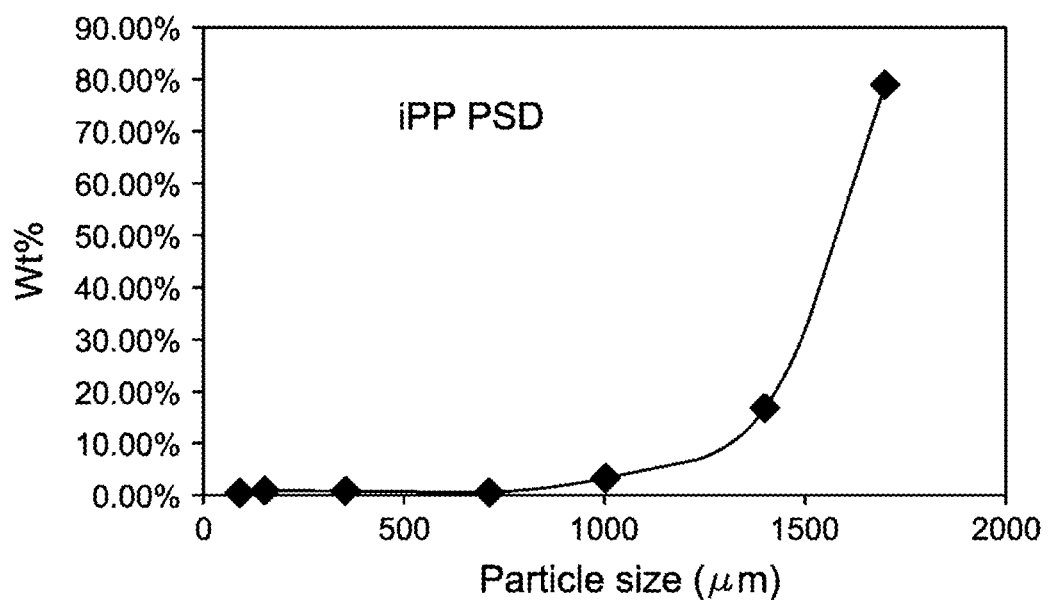
FIG. 8 is a graphical representation showing the PSD of PiPP12 particles produced using a supported catalyst prepared from a low temperature controlled process to inhibit support fragmentation according to Example 6.
Figure 9:
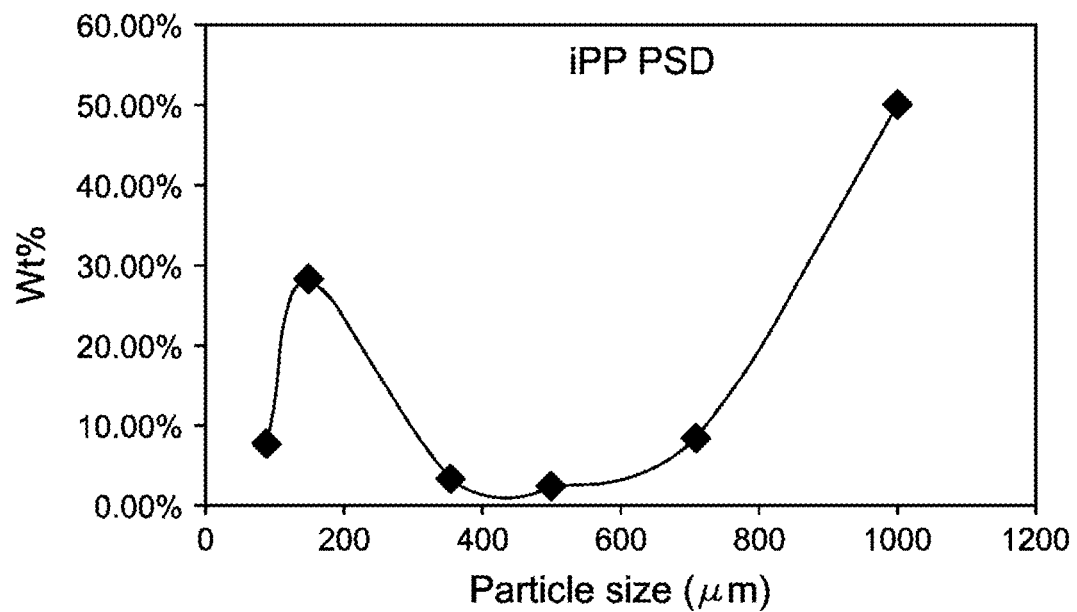
FIG. 9 is a graphical representation showing the PSD of PiPP13 particles produced using a supported catalyst prepared through a medium temperature treatment to control partial fragmentation of the support according to Example 6.
Figure 10:
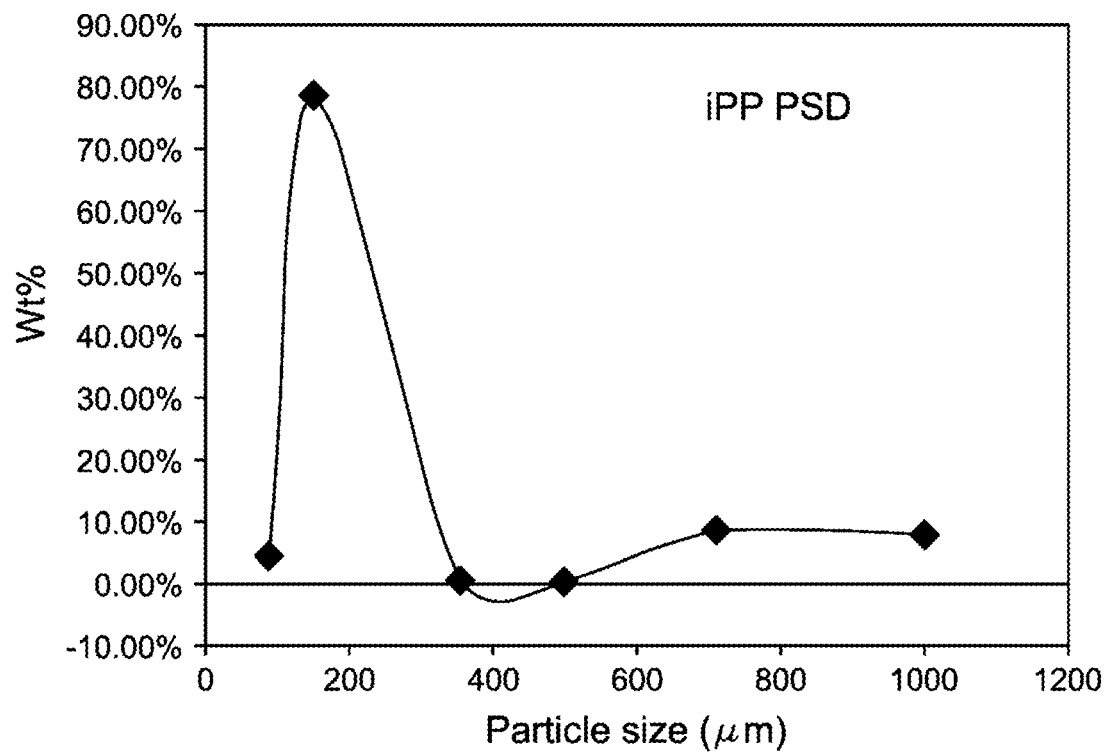
FIG. 10 is a graphical representation showing the PSD of PiPP14 particles produced using supported catalyst prepared through a high temperature treatment to promote support fragmentation according to Example 6.

With reference to FIG. 7, CiPP6 obtained in Example 6 using a conventional catalyst with a relatively broad, unimodal PSD has a corresponding bell-shaped curve. With reference to FIGS. 8-10 and Example 6, the finished catalyst, supported on non-fragmented agglomerates obtains a PSD in the relatively large-size area of PiPP12 (FIG. 8), supported on a mix of non-fragmented agglomerates and fragments gives a bimodal distribution of both large and small PiPP13 particles (FIG. 9), and supported on debris dominated fragments obtains a small particle size dominated bell-shaped distribution of PiPP14 (FIG. 10). In FIG. 8, the PSD of PiPP12 from the catalyst prepared under reaction conditions of −20-0° C. for 3 hrs. shows the majority as large particles from non-fragmented catalyst particles; in FIG. 9, the PSD of the PiPP13 from the catalyst prepared under reaction conditions of 80° C. for 1 hr. shows two modes, i.e., a smaller, second mode from the catalyst system fragments; and in FIG. 10 the PSD of PiPP14 from the catalyst prepared under reaction conditions of 100° C. for 3 hrs. shows the majority as relatively small particles from the catalyst system fragments. Further, porosity analyses based on oil filling microscopy indicated that the small-particle iPP mode has low porosity, e.g., 2 vol %, whereas the large-particle iPP mode has high porosity, e.g., 40 vol %. Therefore, such supports prepared with low temperature treatment or other mild reaction conditions, according to these examples, avoids catalyst fragmentation and provides very high rubber loadings, e.g., up to 76 wt % or more, without significant reactor fouling.

For the first time, high porosity iPP resins may be formed based on the support structure, independent of polymerization conditions utilized by other systems to gain iPP porosity, e.g., other systems that polymerize propylene under high hydrogen polymerization conditions to produce low molecular weight resins that crystallize and shrink to form limited pores. High stiffness and high porosity iPP resins according to the instant disclosure can be obtained, in some embodiments, regardless of the hydrogen concentration in the polymerization, and result in improved ICP.

In some embodiments of the invention, the supported activator is optionally treated with another organometallic compound which is also selected as the scavenger, preferably a metal alkyl such as an aluminum alkyl, to scavenge any hydroxyl or other reactive species that may be exposed by or otherwise remaining after treatment with the first organometallic compound, e.g., hydroxyl groups on surfaces exposed by fragmentation may be reacted and thereby removed by contact of the fragments with an aluminum alkyl such as triisobutylaluminum (TIBA). Useful metal alkyls which may be used according to some embodiments of the invention to treat the support material have the general formula $R_n$-M, wherein R is $C_1$-$C_{40}$ hydrocarbyl such as $C_1$-$C_{12}$ alkyl, for example, M is a metal, and n is equal to the valence of M, and may include oxophilic species such as diethyl zinc and aluminum alkyls, such as, for example, trimethylaluminum, triethylaluminum, triisobutylaluminum, tri-n-hexylaluminum, tri-n-octylaluminum and the like, including combinations thereof. Then the activator/support material is contacted with a solution of the catalyst precursor compound. In some embodiments of the invention, the supported activator is generated in situ. In alternate embodiments of the invention, the slurry of the support material is first contacted with the catalyst precursor compound for a period of time in the range of from about 0.5 hrs. to about 24 hrs., from about 2 hrs. to about 16 hrs., or from about 4 hrs. to about 8 hrs., and the slurry of the supported MCN compound is then contacted with an organometallic-activator solution and/or organometallic-scavenger solution.

Activators: Activators are compounds used to activate any one of the catalyst precursor compounds described above by converting the neutral catalyst precursor compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, including modified alumoxane compounds, and ionizing anion precursor compounds that abstract a reactive, σ-bound, metal ligand making the metal complex cationic and providing a charge-balancing noncoordinating or weakly coordinating anion.

Alumoxanes are generally oligomeric, partially hydrolyzed aluminum alkyl compounds containing —Al(R1)-O— sub-units, where R1 is an alkyl group, and may be produced by the hydrolysis of the respective trialkylaluminum compound. Examples of alumoxane activators include methylalumoxane (MAO), ethylalumoxane, butylalumoxane, isobutylalumoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different alumoxanes may also be used as the activator(s).

There are a variety of methods for preparing alumoxanes suitable for use in the present invention, non-limiting examples of which are described in U.S. Pat. No. 4,665,208; U.S. Pat. No. 4,952,540; U.S. Pat. No. 5,041,584; U.S. Pat. No. 5,091,352; U.S. Pat. No. 5,206,199; U.S. Pat. No. 5,204,419; U.S. Pat. No. 4,874,734; U.S. Pat. No. 4,924,018; U.S. Pat. No. 4,908,463; U.S. Pat. No. 4,968,827; U.S. Pat. No. 5,308,815; U.S. Pat. No. 5,329,032; U.S. Pat. No. 5,248,801; U.S. Pat. No. 5,235,081; U.S. Pat. No. 5,157,137; U.S. Pat. No. 5,103,031; U.S. Pat. No. 5,391,793; U.S. Pat.

No. 5,391,529; U.S. Pat. No. 5,693,838; U.S. Pat. No. 5,731,253; U.S. Pat. No. 5,731,451; U.S. Pat. No. 5,744,656; U.S. Pat. No. 5,847,177; U.S. Pat. No. 5,854,166; U.S. Pat. No. 5,856,256; U.S. Pat. No. 5,939,346; EP 0 561 476; EP 0 279 586; EP 0 594-218; EP 0 586 665; WO 94/10180; and WO 99/15534; halogenated MAO are described in U.S. Pat. No. 7,960,488; U.S. Pat. No. 7,355,058; and U.S. Pat. No. 8,354,485; dialkylaluminum cation enhanced MAO are described in US 2013/0345376; and surface bulky group modified supported MAO are described in U.S. Pat. No. 8,895,465, all of which are herein fully incorporated by reference.

When the activator is an alumoxane, some embodiments select the maximum amount of activator at a 5000-fold molar excess Al/M over the catalyst precursor compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1, e.g., 1:1 to 10:1 or 10:1 to 50:1.

In an alternate embodiment, little or no alumoxane is used in the polymerization processes described herein. Preferably, alumoxane is present at zero mol %, alternately the alumoxane is present at a molar ratio of aluminum to catalyst precursor compound transition metal less than 500:1, or less than 300:1, or less than 100:1, or less than 1:1.

It is within the scope of this invention to use an ionizing or stoichiometric activator, neutral or ionic, such as tri(n-butyl) ammonium tetrakis(pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators or non-coordinating anion activators alone or in combination with alumoxane activators such as in U.S. Pat. No. 8,501,655; U.S. Pat. No. 7,897,707; U.S. Pat. No. 7,928,172; U.S. Pat. No. 5,153,157; U.S. Pat. No. 5,453,410; EP 0 573 120, WO 94/07928; and WO 95/14044, which are herein fully incorporated by reference. Further information regarding ionizing and stoichiometric activators may be found in U.S. Pat. No. 8,283,428; U.S. Pat. No. 5,153,157; U.S. Pat. No. 5,198,401; U.S. Pat. No. 5,066,741; U.S. Pat. No. 5,206,197; U.S. Pat. No. 5,241,025; U.S. Pat. No. 5,384,299; U.S. Pat. No. 5,502,124; U.S. Pat. No. 5,447,895; U.S. Pat. No. 7,297,653; U.S. Pat. No. 7,799,879; WO 96/04319; EP 0 570 982; EP 0 520 732; EP 0 495 375; EP 0 500 944; EP 0 277 003; EP 0 277 004; EP 0 277 003; and EP 0 277 004; all of which are herein fully incorporated by reference.

Optional Scavengers or Co-Activators:

In addition to the activator compounds, scavengers or co-activators may be used. Suitable co-activators may be selected from the group consisting of: trialkylaluminum, dialkylmagnesium, alkylmagnesium halide, and dialkylzinc. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In an embodiment, the co-activator is selected from the group consisting of: trimethylaluminum, triethylaluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzic, dipropylzinc, and dibutylzinc).

Metallocene Catalyst Precursor Compounds:

According to some embodiments of the invention, the single site catalyst precursor compound is represented by the following formula: $(Cp)_m R^A_n M^4 Q_k$; wherein each Cp is a cyclopentadienyl moiety or a substituted cyclopentadienyl moiety substituted by one or more hydrocarbyl radicals having from 1 to 20 carbon atoms; $R^A$ is a structural bridge between two Cp rings; $M^4$ is a transition metal selected from groups 4 or 5; Q is a hydride or a hydrocarbyl group having from 1 to 20 carbon atoms or an alkenyl group having from 2 to 20 carbon atoms, or a halogen; m is 1, 2, or 3, with the proviso that if m is 2 or 3, each Cp may be the same or different; n is 0 or 1, with the proviso that n=0 if m=1; and k is such that k+m is equal to the oxidation state of $M^4$, with the proviso that if k is greater than 1, each Q may be the same or different.

According to some embodiments of the invention, the single site catalyst precursor compound is represented by the formula: $R^A(CpR''_p)(CpR^*_q)M^5 Q_r$; wherein each Cp is a cyclopentadienyl moiety or substituted cyclopentadienyl moiety; each R* and R'' is a hydrocarbyl group having from 1 to 20 carbon atoms and may the same or different; p is 0, 1, 2, 3, or 4; q is 1, 2, 3, or 4; $R^A$ is a structural bridge between the Cp rings imparting stereorigidity to the metallocene compound; $M^5$ is a group 4, 5, or 6 metal; Q is a hydrocarbyl radical having 1 to 20 carbon atoms or is a halogen; r is s minus 2, where s is the valence of $M^5$; wherein $(CpR^*_q)$ has bilateral or pseudobilateral symmetry; $R^*_q$ is an alkyl substituted indenyl radical, or tetra-, tri-, or dialkyl substituted cyclopentadienyl radical; and $(CpR''_p)$ contains a bulky group in one and only one of the distal positions; wherein the bulky group is of the formula $AR^W_v$; and where A is chosen from group 4 metals, oxygen, or nitrogen, and $R^W$ is a methyl radical or phenyl radical, and v is the valence of A minus 1.

According to some embodiments of the invention, the single site catalyst precursor compound is represented by the formula:

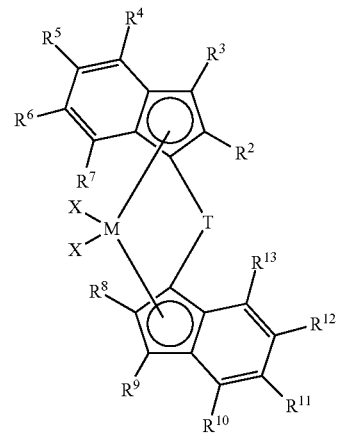

where M is a group 4, 5 or 6 metal; T is a bridging group; each X is, independently, an anionic leaving group; each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

According to some embodiments of the invention, at least one of $R^2$, $R^3$, $R^4$, $R^5$, $R^6$, $R^7$, $R^8$, $R^9$, $R^{10}$, $R^{11}$, $R^{12}$ and $R^{13}$ is acyclopropyl substituent represented by the formula:

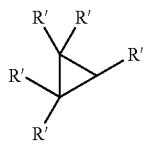

wherein each R' in the cyclopropyls substituent is, independently, hydrogen, a substituted hydrocarbyl group, an unsubstituted hydrocarbyl group, or a halogen.

According to some embodiments of the invention, the M is selected from titanium, zirconium, hafnium, vanadium, niobium, tantalum, chromium, molybdenum and tungsten; each X is independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; or optionally, are joined together to form a $C_4$ to $C_{40}$ alkanediyl group, or a conjugated $C_4$ to $C_{40}$ diene ligand, which is coordinated to M in a metallacyclopentene fashion; or optionally, represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a t complex with M; each $R^2$, $R^4$, $R^8$ and $R^{10}$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups; $R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and $C_7$ to $C_{40}$ substituted or unsubstituted arylalkenyl groups and T is selected from:

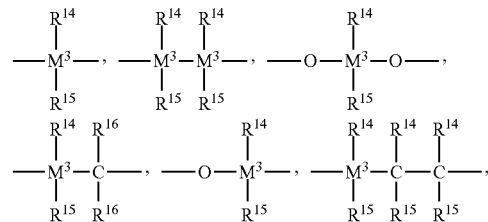

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—; wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups, and $C_7$ to $C_{40}$ alkylaryl groups, optionally, $R^{14}$ and $R^{15}$, together with the atom(s) connecting them, form a ring; and $M^3$ is selected from carbon, silicon, germanium, and tin; or T is represented by the formula:

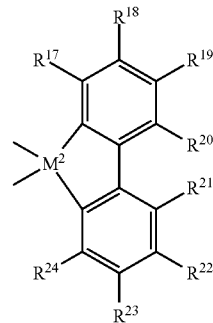

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups, and substituted or unsubstituted $C_8$ to $C_{40}$ arylalkenyl groups; optionally two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom.

In a preferred embodiment in any of the processes described herein one catalyst compound is used, e.g., where first and second (and or third) catalyst systems are present, the catalyst compounds are not different.

In some embodiments, two or more different catalyst compounds are present in the catalyst systems used herein. In some embodiments, two or more different catalyst systems are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator. Useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

In any embodiment of the invention, in any embodiment of any formula described herein, M is Zr or Hf.

In any embodiment of the invention in any embodiment of any formula described herein, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In a preferred embodiment of the invention in any embodiment of any formula described herein, each $R^3$, $R^5$, $R^6$, $R^7$, $R^9$, $R^{11}$, $R^{12}$, or $R^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any formula described herein, each $R^3$, $R^4$, $R^5$, $R^6$, $R^7$, $R^9$, $R^{10}$, $R^{11}$, $R^{12}$, or $R^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo, and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In a preferred embodiment of the invention in any embodiment of any formula described herein, T is a bridging group and comprises Si, Ge, or C, preferably T is dialkyl silicon or dialkyl germanium, preferably T is dimethyl silicon.

In a preferred embodiment of the invention in any embodiment of any formula described herein, T is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$CR'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent. Preferably, T is CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, cyclopentasilylene (Si(CH$_2$)$_4$), or Si(CH$_2$)$_5$.

In embodiments of the invention, in any formula described herein, each $R^2$ and $R^8$, is independently, a $C_1$ to $C_{20}$ hydrocarbyl, or a $C_1$ to $C_{20}$ substituted hydrocarbyl, $C_1$ to $C_{20}$ halocarbyl, $C_1$ to $C_{20}$ substituted halocarbyl, $C_1$ to $C_{20}$ silylcarbyl, $C_1$ to $C_{20}$ substituted silylcarbyl, $C_1$ to $C_{20}$ germylcarbyl, or $C_1$ to $C_{20}$ substituted germylcarbyl substituents. Preferably, each $R^2$ and $R^8$, is independently, methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, isopropyl, and the like.

In embodiments of the invention, in any embodiment of any formula described herein, $R^4$ and $R^{10}$ are, independently, a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom containing group.

In a preferred embodiment of the invention in any embodiment of any formula described herein, $R^2$ and $R^8$ are a $C_1$ to $C_{20}$ hydrocarbyl, such as methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, or isopropyl; and $R^4$ and $R^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, or cyclopenta[b]thiopheneyl. In a preferred embodiment, $R^2$, $R^8$, $R^4$ and $R^{10}$ are as described in the preceding sentence and $R^3$, $R^5$, $R^6$, $R^7$, $R^9$, $R^{11}$, $R^{12}$, and $R^{13}$ are hydrogen.

In embodiments according to the present invention, suitable MCN compounds are represented by the formula (1):

$$A_e M X_{n-e};$$

or the formula (1c):

$$TA_2 M X_{n-2};$$

wherein: e is 1 or 2; T is a bridging group between two A groups; each A is a substituted monocyclic or polycyclic ligand that is pi-bonded to M and optionally includes one or more ring heteroatoms selected from boron, a group 14 atom that is not carbon, a group 15 atom, or a group 16 atom, and when e is 2 each A may be the same or different, provided that at least one A is substituted with at least one cyclopropyl substituent directly bonded to any sp$^2$ carbon atom at a bondable ring position of the ligand, wherein the cyclopropyl substituent is represented by the formula:

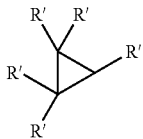

where each R' is, independently, hydrogen, a substituted or unsubstituted hydrocarbyl group, or a halogen; M is a transition metal atom having a coordination number of n and selected from group 3, 4, or 5 of the Periodic Table of Elements, or a lanthanide metal atom, or actinide metal atom; n is 3, 4, or 5; and each X is a univalent anionic ligand, or two X's are joined and bound to the metal atom to form a metallocycle ring, or two X's are joined to form a chelating ligand, a diene ligand, or an alkylidene ligand.

In embodiments according to the present invention, the MCN compound may be represented by the formula:

$$T_y(A)_e(E)MX_{n-e-1}$$

where E is $J-R''_{x-1-y}$, J is a heteroatom with a coordination number of three from group 15 or with a coordination number of two from group 16 of the Periodic Table of Elements; R" is a $C_1-C_{100}$ substituted or unsubstituted hydrocarbyl radical; x is the coordination number of the heteroatom J where "x-1-y" indicates the number of R" substituents bonded to J; T is a bridging group between A and E, A and E are bound to M, y is 0 or 1; and A, e, M, X and n are as defined above.

In embodiments according to the present invention, the MCN compound may be represented by one of the following formulae:

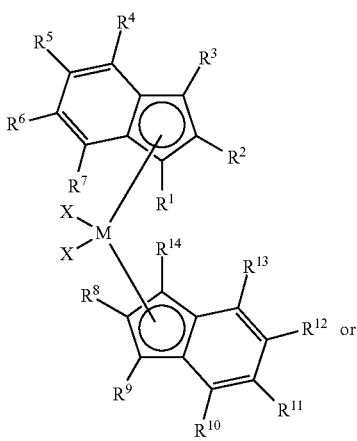

formula (1a)

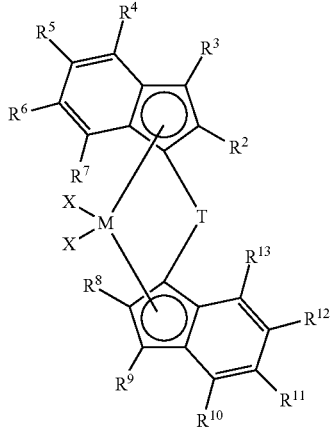

formula (1b)

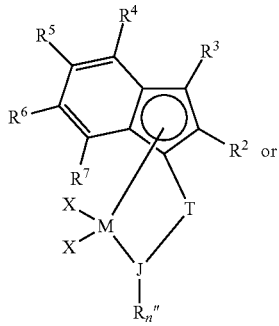

formula (2a)

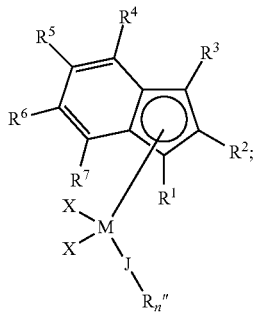

formula (2b)

where M, T, X, are as defined in claim 1; J, R", and n are as defined above, and
each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is, independently, hydrogen, a substituted hydrocarbyl group, an unsubstituted hydrocarbyl group, or a halide, provided that in formula 1a and 1b, at least one of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is a cyclopropyl substituent and in formula 2a and 2b at least one of $R^1$, $R^2$, $R^3$, $R^4$, $R^5$, $R^6$, or $R^7$, is a cyclopropyl substituent; and provided that any adjacent $R^1$ to $R^{14}$ groups that are not a cyclopropyl substituent, may form a fused ring or multi-center fused ring system where the rings may be aromatic, partially saturated, or saturated.

In embodiments according to the present invention, at least one A is monocyclic ligand selected from the group consisting of substituted or unsubstituted cyclopentadienyl, heterocyclopentadienyl, and heterophenyl ligands provided that when e is one, the monocyclic ligand is substituted with at least one cyclopropyl substituent, at least one A is a polycyclic ligand selected from the group consisting of substituted or unsubstituted indenyl, fluorenyl, cyclopenta

[a]naphthyl, cyclopenta[b]naphthyl, heteropentalenyl, heterocyclopentapentalenyl, heteroindenyl, heterofluorenyl, heterocyclopentanaphthyl, heterocyclopentaindenyl, and heterobenzocyclopentaindenyl ligands.

MCN compounds suitable for use herein may further include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl)zirconium dichloride; dimethylsilylene-bis(2-methyl-4-phenylindenyl) hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methylcyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

In a preferred embodiment of the invention, the molar ratio of rac to meso in the catalyst precursor compound is from 1:1 to 100:1, preferably 5:1 to 90:1, preferably 7:1 to 80:1, preferably 5:1 or greater, or 7:1 or greater, or 20:1 or greater, or 30:1 or greater, or 50:1 or greater. In an embodiment of the invention, the MCN catalyst comprises greater than 55 mol % of the racemic isomer, or greater than 60 mol % of the racemic isomer, or greater than 65 mol % of the racemic isomer, or greater than 70 mol % of the racemic isomer, or greater than 75 mol % of the racemic isomer, or greater than 80 mol % of the racemic isomer, or greater than 85 mol % of the racemic isomer, or greater than 90 mol % of the racemic isomer, or greater than 92 mol % of the racemic isomer, or greater than 95 mol % of the racemic isomer, or greater than 98 mol % of the racemic isomer, based on the total amount of the racemic and meso isomer-if any, formed. In a particular embodiment of the invention, the bridged bis(indenyl)metallocene transition metal compound formed consists essentially of the racemic isomer.

Amounts of rac and meso isomers are determined by proton NMR. $^1H$ NMR data are collected at 23° C. in a 5 mm probe using a 400 MHz Bruker spectrometer with deuterated methylene chloride. (Note that some of the examples herein use deuterated benzene, but for purposes of the claims, methylene chloride shall be used.) Data is recorded using a maximum pulse width of 45°, 5 seconds between pulses and signal averaging 16 transients. The spectrum is normalized to protonated methylene chloride in the deuterated methylene chloride, which is expected to show a peak at 5.32 ppm.

In some embodiments, two or more different MCN catalyst precursor compounds are present in the catalyst system used herein. In some embodiments, two or more different MCN catalyst precursor compounds are present in the reaction zone where the process(es) described herein occur. When two transition metal compound based catalysts are used in one reactor as a mixed catalyst system, the two transition metal compounds should be chosen such that the two are compatible. A simple screening method such as by 1H or $^{13}C$ NMR, known to those of ordinary skill in the art, can be used to determine which transition metal compounds are compatible. It is preferable to use the same activator for the transition metal compounds, however, two different activators, such as two non-coordination anions, a non-coordinating anion activator and an alumoxane, or two different alumoxanes can be used in combination. If one or more transition metal compounds contain an X ligand which is not a hydride, hydrocarbyl, or substituted hydrocarbyl, then the alumoxane (or other alkylating agent) is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

Chain Transfer Agents:

This invention further relates to methods to polymerize olefins using the above complex in the presence of a chain transfer agent ("CTA"). The CTA can be any desirable chemical compound such as those disclosed in WO 2007/130306. Preferably, the CTA is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; e.g., dialkyl zinc compounds, where the alkyl is selected independently from methyl, ethyl, propyl, butyl, isobutyl, tertbutyl, pentyl, hexyl, cyclohexyl, and phenyl, where diethylzinc is particularly preferred; or e.g., trialkyl aluminum compounds, where the alkyl is selected independently from methyl, ethyl, propyl, butyl, isobutyl, tertbutyl, pentyl, hexyl, cyclohexyl, and phenyl; or e.g., diethyl alhminum chloride, diisobutylaluminum hydride, diethylaluminum hydride, di-n-octylaluminum hydride, dibutylmagnesium, diethylmagnesium, dihexylmagnesium, and triethylboron.

Useful CTAs are typically present at from 10 or 20 or 50 or 100 equivalents to 600 or 700 or 800 or 1000 equivalents relative to the catalyst component. Alternately the CTA is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; or/and alternatively 1:10 to 1:1.

Monomers:

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene, and isomers thereof. In a preferred embodiment, the monomer comprises propylene and optional co-monomer(s) comprising one or more of ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In a preferred embodiment of the invention, the monomer is propylene and no co-monomer is present.

Exemplary $C_2$ to $C_{40}$ olefin monomers and optional co-monomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbomadiene, ethylidene norbornene, divinylbenzene, dicyclopentadiene, or higher ring containing diolefins with or without substituents at various ring positions.

Preferably, the polymerization or copolymerization is carried out using olefins such as ethylene, propylene, 1-butene, 1-hexene, 4-methyl-1-pentene, and 1-octene, vinylcyclohexane, norbornene and norbomadiene. In particular, propylene and ethylene are polymerized.

In some embodiments, where butene is the co-monomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can, therefore, be substantially less expensive than pure 1-butene.

In preferred embodiments, the monomers comprise 0 wt % diene monomer in any stage, preferably in all stages.

Preferably, the co-monomer(s) are present in the final propylene polymer composition at less than 50 mol %, preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of the main monomer (e.g., propylene), based on the molecular.

In a preferred embodiment of the invention, the polymer produced in stage A (and/or stages A1 and A2, e.g., when polymer A is bimodal) is iPP, preferably isotactic homopolypropylene and the polymer produced in stage B comprises propylene and from 0.5 to 50 mol % (preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of propylene) of ethylene or $C_4$ to $C_{20}$ alpha olefin, preferably ethylene and butene, hexene and/or octene.

In a preferred embodiment, stage A may comprise a plurality of substages, e.g., stage A1, stage A2, etc. As used herein stage A refers to all of the substages. In a preferred embodiment of the invention, the polymer produced in stage A1 is iPP, preferably isotactic homopolypropylene, and the polymer produced in stage A2 is an iPP.

In a preferred embodiment of the invention, the polymer produced in stage A1 is iPP, preferably isotactic homopolypropylene, and the polymer produced in stage A2 is an iPP, and the polymer produced in stage B comprises propylene and from 0.5 to 50 mol % (preferably from 0.5 to 45 mol %, preferably from 1 to 30 mol %, preferably from 3 to 25 mol %, preferably from 5 to 20 mol %, preferably from 7 to 15 mol %, with the balance of the copolymer being made up of propylene) of ethylene and butene, or ethylene and hexene, or ethylene and octene.

Sequential Polymerization:

The propylene polymer compositions according to embodiments of the invention may be prepared using conventional polymerization processes such as a two-stage process in two reactors or a three-stage process in three reactors, although it is also possible to produce these compositions in a single reactor. In embodiments, each stage may be independently carried out in either the gas, solution, or liquid slurry phase. For example, the first stage may be conducted in the gas phase and the second in liquid slurry, or vice versa, and the optional third stage in gas or slurry phase. Alternatively, each phase may be the same in the various stages. The propylene polymer compositions of this invention can be produced in multiple reactors, preferably two or three, operated in series, where component A1 is preferably polymerized first in a gas phase, liquid slurry or solution polymerization process. Component B (the polymeric material produced in the presence of component A) is preferably polymerized in a second reactor such as a gas phase or slurry phase reactor. In an alternative embodiment, component A can be made in at least two reactors in order to obtain fractions with different properties, e.g., varying molecular weights polydispersities, melt flow rates, or the like.

As used herein "stage" is defined as that portion of a polymerization process during which one component of the in-reactor composition, component A (or components A1 and A2 if present) or component B (or component C, if another stage is present), is produced. One or multiple reactors may be used during each stage. The same or different polymerization process may be used in each stage. For purposes of example, clarity and convenience, component A and/or Stage A may be referred to herein below as iPP and the stage producing the polypropylene, component A1 and/or Stage A1 may be referred to herein below as the first iPP mode and the stage producing the first polypropylene mode, component A2 and/or Stage A2 may be referred to herein below as the second iPP mode and the stage producing the second polypropylene mode, and component B and/or Stage B may be referred to herein below as the rubber and the stage producing the rubber, it being understood that the polymers may be produced in any order or in the same reactor and/or series of reactors.

The stages of the processes of this invention can be carried out in any manner known in the art, in solution, in suspension or in the gas phase, continuously or batch wise, or any combination thereof, in one or more steps. Homogeneous polymerization processes are useful. For purposes herein, a homogeneous polymerization process is defined to be a process where at least 90 wt % of the product is soluble in the reaction media. A bulk homogeneous process is also useful, wherein for purposes herein a bulk process is defined to be a process where monomer concentration in all feeds to the reactor is 70 vol % or more. Alternately, in embodiments, no solvent or diluent may be present or added in the reaction medium, except for the small amounts used as the carrier for the catalyst system or other additives, or amounts typically found with the monomer; e.g., propane in propylene as is known in the art. The term "gas phase polymerization" refers to the state of the monomers during polymerization, where the "gas phase" refers to the vapor state of the monomers. In another embodiment, a slurry process is used in one or more stages. As used herein the term "slurry polymerization process" means a polymerization process where a supported catalyst is employed and monomers are polymerized on the supported catalyst particles, and at least 95 wt % of polymer products derived from the supported catalyst are in granular form as solid particles (not dissolved in the diluent). Gas phase polymerization processes are particularly preferred and can be used in one or more stages.

In embodiments of the invention, stage A1 produces hPP, and stage B produces propylene copolymer, such as propylene-ethylene copolymer. In an alternate embodiment of the invention, stage A produces hPP and stage B produces hPP. In an alternate embodiment of the invention, stage A1 and stage A2 produce hPP and stage B produces propylene copolymer, such as propylene-ethylene copolymer. In alternate embodiments of the invention, stage B produces hPP, and stage A produces propylene copolymer, such as propylene-ethylene copolymer. In an alternate embodiment of the invention, stage A1 and stage A2 produce hPP.

In embodiments of the invention, if the polymerization is carried out as a suspension or solution polymerization, an inert solvent may be used, for example, the polymerization may be carried out in suitable diluents/solvents. Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or co-monomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents. It is also possible to use mineral spirit or a hydrogenated diesel oil fraction as a solvent. Toluene may also be used. The polymerization is preferably carried out in the liquid monomer(s). If inert solvents are used, the monomer(s) is (are) typically metered in gas or liquid form.

In embodiments of the invention, the feed concentration of the monomers and co-monomers for the polymerization is 60 vol % solvent or less, or 40 vol % or less, or 20 vol % or less, based on the total volume of the feedstream. In embodiments, the polymerization is run in a bulk process.

In embodiments of the invention, polymerizations can be run at any temperature and/or pressure suitable to obtain the desired polymers. Typical temperatures and/or pressures in any stage include a temperature greater than 30° C., or greater than 50° C., or greater than 65° C., or greater than 70° C., or greater than 75° C., alternately less than 300° C., or less than 200° C., or less than 150° C., or less than 140° C.; and/or at a pressure in the range of from 100 kPa to 20 MPa, about 0.35 MPa to about 10 MPa, or from about 0.45 MPa to about 6 MPa, or from about 0.5 MPa to about 5 MPa.

In embodiments, polymerization in any stage may include a reaction run time up to 300 minutes, or in the range of from about 5 to 250 minutes, or from about 10 to 120 minutes. In embodiments of the invention, in a continuous process the polymerization time for all stages is from 1 to 600 minutes, or 5 to 300 minutes, or from about 10 to 120 minutes.

Hydrogen and/or other CTA's may be added to one, two or more reactors or reaction zones. In embodiments, hydrogen is added to control molecular weight and MFR of the polymer produced. In embodiments, the overall pressure in the polymerization in each stage is at least about 0.5 bar, or at least about 2 bar, or at least about 5 bar. In embodiments, pressures higher than about 100 bar, e.g., higher than about 80 bar and, in particular, higher than about 64 bar may not be utilized. In some embodiments, hydrogen is present in the polymerization reaction zone at a partial pressure of from 0.001 to 100 psig (0.007 to 690 kPa), or from 0.001 to 50 psig (0.007 to 345 kPa), or from 0.01 to 25 psig (0.07 to 172 kPa), or 0.1 to 10 psig (0.7 to 70 kPa). In embodiments of the invention, hydrogen, and/or CTA, may be added to the first reactor, a second or third or subsequent reactor, or any combination thereof. Likewise, in a three stage process hydrogen may be added to the first stage, and/or the second stage, and/or the third stage. In embodiments of the invention, hydrogen is added in a higher concentration to the second stage as compared to the first stage. In an alternate embodiment of the invention, hydrogen is added in a higher concentration to the first stage as compared to the second stage. For further information on stage hydrogen addition in impact copolymer production please see U.S. Ser. No. 61/896,291, filed Oct. 28, 2013, published as US 2015-0119537, incorporated herein by reference.

Polymerization processes of this invention can be carried out in each of the stages in a batch, semi-batch, or continuous mode. If two or more reactors (or reaction zones) are used, preferably they are combined so as to form a continuous process. In embodiments of the invention, polymerizations can be run at any temperature and/or pressure suitable to obtain the desired polymers. In embodiments of the invention, the process to produce the propylene polymer composition is continuous.

In embodiments of the invention, in the first stage, A, propylene and from about 0 wt % to 15 wt % $C_2$ and/or $C_4$ to $C_{20}$ alpha olefins (alternately 0.5 to 10 wt %, alternately 1 to 5 wt %), based upon the weight of the monomer/co-monomer feeds (and optional $H_2$), are contacted with the MCN catalyst(s) described herein under polymerization conditions to form Component A. In the first stage, the monomers preferably comprise propylene and optional co-monomers comprising one or more of ethylene and/or $C_4$ to $C_{20}$ olefins, preferably $C_4$ to $C_{16}$ olefins, or preferably $C_6$ to $C_{12}$ olefins. The $C_4$ to $C_{20}$ olefin monomers may be linear, branched, or cyclic. The $C_4$ to $C_{20}$ cyclic olefins may be strained or unstrained, monocyclic or polycyclic, and may optionally include heteroatoms and/or one or more functional groups. In a preferred embodiment of the invention, the monomer in stage A is propylene and no co-monomer is present.

In embodiments of the invention, in the second stage, B, propylene and from about 0 wt % to 15 wt % $C_2$ and/or $C_4$ to $C_{20}$ alpha olefins (alternately 0.5 to 10 wt %, alternately 1 to 5 wt %), based upon the weight of the monomer/co-monomer feeds, are contacted with the MCN catalyst(s) described herein under polymerization conditions to form Component B. In the second stage, the monomers preferably comprise propylene and optional co-monomers comprising one or more of ethylene and/or $C_4$ to $C_{20}$ olefins, preferably $C_4$ to $C_{16}$ olefins, or preferably $C_6$ to $C_{12}$ olefins. The $C_4$ to $C_{20}$ olefin monomers may be linear, branched, or cyclic. The $C_4$ to $C_{20}$ cyclic olefins may be strained or unstrained, monocyclic or polycyclic, and may optionally include heteroatoms and/or one or more functional groups. In a preferred embodiment of the invention, the monomer in stage B is propylene and co-monomer is present.

Alternately, in the second stage, Component A, propylene and optionally from about 1 wt % to 15 wt % (preferably 3 wt % to 10 wt %), based upon the weight of the monomer/co-monomer feeds, of one or more co-monomers (such as ethylene or $C_4$ to $C_{20}$ alpha olefins) are contacted in the presence of the MCN catalyst system(s) described herein and optional hydrogen, under polymerization conditions to form Component B intimately mixed with Component A which forms the propylene polymer composition. In the second stage, the optional co-monomers may comprise one or more of ethylene and $C_3$ to $C_{20}$ olefins, preferably $C_4$ to $C_{16}$ olefins, or preferably $C_6$ to $C_{12}$ olefins. The $C_4$ to $C_{20}$ olefin monomers may be linear, branched, or cyclic. The $C_4$ to $C_{20}$ cyclic olefins may be strained or unstrained, monocyclic or polycyclic, and may optionally include heteroatoms and/or one or more functional groups.

Alternately, in the second stage, Component A and propylene are contacted in the presence of the MCN catalyst system(s) described herein and hydrogen, under polymerization conditions to form Component B intimately mixed with Component A which forms the propylene polymer composition.

Alternately, in the second stage, Component A and ethylene are contacted in the presence of the MCN catalyst system(s) described herein and hydrogen, under polymerization conditions to form Component B intimately mixed with Component A which forms the propylene polymer composition.

The catalyst systems used in the stages may be the same or different and are preferably the same. In embodiments of the invention, the catalyst system used in Stage A is transferred with the polymerizate (e.g., Component A) to Stage B, where it is contacted with additional monomer to form Component B, and thus the final propylene polymer composition. In other embodiments of the invention, catalyst is provided to one, two or all three reaction zones.

In embodiments of the invention, Stage A produces a homopolypropylene, and Stage B produces a copolymer of ethylene-butene, ethylene-hexene, ethylene-octene, ethylene-propylene, ethylene-propylene-butene, ethylene-propylene-hexene, or ethylene-propylene-octene.

In an embodiment of the invention, little or no scavenger is used in the polymerization in any stage to produce the polymer, i.e., scavenger (such as trialkyl aluminum) is present at a molar ratio of scavenger metal to transition metal of 0:1, alternately less than 100:1, or less than 50:1, or less than 15:1, or less than 10:1, or less than 1:1, or less than 0.1:1.

Other additives may also be used in the polymerization in any stage, as desired, such as one or more scavengers, promoters, modifiers, hydrogen, CTAs other than or in addition to hydrogen (such as diethyl zinc), reducing agents, oxidizing agents, aluminum alkyls, or silanes, or the like.

In an embodiment of the invention, the productivity of the catalyst system in a single stage or in all stages combined is at least 50 g (polymer)/g (cat)/hour, preferably 500 or more g (polymer)/g (cat)/hour, preferably 800 or more g (polymer)/g (cat)/hour, preferably 5000 or more g (polymer)/g (cat)/hour, preferably 50,000 or more g (polymer)/g (cat)/hour.

In an embodiment of the invention, the activity of the catalyst system in a single stage or in all stages combined is at least 50 kg P/mol cat, preferably 500 or more kg P/mol cat, preferably 5000 or more kg P/mol cat, preferably 50,000 or more kg P/mol cat. According to some embodiments of the invention, the catalyst system in a single stage or in all stages combined provides a catalyst activity of at least 800, or at least 1000, or at least 1500, or at least 2000 g propylene polymer produced per g of the catalyst precursor compound per hour.

In another embodiment of the invention, the conversion of olefin monomer is at least 10%, based upon polymer yield and the weight of the monomer entering the reaction zone, or 20% or more, or 30% or more, or 50% or more, or 80% or more. A "reaction zone", also referred to as a "polymerization zone", is a vessel or portion thereof or combination of vessels, where the polymerization process takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In preferred embodiments, the polymerization occurs in two, three, four or more reaction zones. In another embodiment of the invention, the conversion of olefin monomer is at least 10%, based upon polymer yield and the weight of the monomer entering all reaction zones, or 20% or more, or 30% or more, or 50% or more, or 80% or more.

In embodiments of the invention, processes to produce polymer compositions, such as heterophasic copolymers and/or impact copolymers (ICPs) utilizing a single MCN catalyst may comprise first polymerizing ethylene, and then using the same or a different catalyst, polymerizing propylene in the presence of the polyethylene. Typically, propylene is first polymerized and then modified with ethylene, ethylene polymers by blending and/or by modifying with ethylene/propylene copolymers. By reversing the order of polymerizations and by selecting an appropriate catalyst, ICPs with ethylene content of greater than 30 wt % are achieved.

In embodiments of the invention, the processes may comprise contacting ethylene and, optionally, a $C_2$ to a $C_{12}$ alpha-olefin comonomer under polymerization conditions in a first stage in the presence of a first MCN catalyst system to form Component A; contacting Component A of step a) with a $C_3$ to a $C_{12}$ alpha-olefin monomer under polymerization conditions in a second stage in the presence of a second MCN catalyst system to form Component B, wherein the first MCN catalyst system is present in both steps a and b and/or additional MCN catalyst is added to the reaction mixture between steps a and b and the first MCN catalyst system may be the same as the second MCN catalyst system; and obtaining an ethylene-based in-reactor composition comprising Component A and Component B, wherein the ethylene-based in-reactor composition has from greater than 20 mol % ethylene, based on the molecular weight of the ethylene-based in-reactor composition. In embodiments of the invention, the ethylene-based in-reactor composition may have a multimodal melting point. In embodiments of the invention, an ICP is provided that has an ethylene content of greater than 20 mol %, or greater than 30 mol %, or greater than about 40 mol %, or greater than about 50 mol %, or greater than about 65 mol %, or greater than 85 mol %, based on the molecular weight of the ICP.

In still another aspect, the reaction sequence of step 1 and step 2 can be carried out immediately. Alternatively, there can be a period of time between generating the polyethylene and further reacting the polyethylene with propylene of 1 second or more, alternately 30 seconds or more, alternately 1 minute or more, alternately 15 minutes or more, alternately 30 minutes or more, alternately 1 hr. or more, alternately 2 hrs. or more, alternately 1 day or more.

High Porosity Propylene Polymer Products:

The polymer products herein may comprise polypropylene, such as, for example, iPP, highly isotactic polypropylene, sPP, hPP, and RCP.

In any embodiment of the invention, the propylene polymer made in stage A1 is iPP or highly isotactic polypropylene, preferably homopolypropylene. In any embodiment of the invention, the propylene polymer made in stage A2 is propylene copolymer, preferably a copolymer of propylene and a $C_2$ or $C_4$ to $C_{20}$ olefin, preferably ethylene). In an embodiment of the invention, the propylene polymer made in stage A1 is isotactic homopolypropylene or highly isotactic homopolypropylene. In an embodiment of the invention, the propylene polymer made in stage A2 is ethylene-propylene rubber.

According to some embodiments of the invention, the propylene polymer matrix has a porosity of 15% or more, e.g., from 20%, or 25%, or 30%, or 35%, or 40%; up to 85%, 80%, 75%, 70%, 60%, or 50%, based on the total volume of the propylene polymer matrix, determined by mercury infiltration porosimetry.

According to some embodiments of the invention, the propylene polymer matrix has a median PD less than 165 µm, e.g., between greater than 6 and less than 160 µm, as determined by mercury intrusion porosimetry. In additional or alternate embodiments, the propylene polymer matrix has a median PD greater than 0.1, greater than 1, or greater than 2, or greater than 5, or greater than 6, or greater than 8, or greater than 10, or greater than 12, or greater than 15, or greater than 20 m; up to less than 50, or less than 60, or less than 70, or less than 80, or less than 90, or less than 100, or less than 120, or less than 125, or less than 140, or less than 150, or less than 160, or less than 165 µm.

According to some embodiments of the invention, the propylene polymer has more than 5, or more than 10, or more than 15 regio defects per 10,000 propylene units, determined by $^{13}C$ NMR.

According to some embodiments of the invention, the propylene polymer has a 1% Secant flexural modulus of at least 1000 MPa, e.g., at least 1300 MPa, or at least 1500 MPa, or at least 1700 MPa, or at least 1800 MPa, or at least 1900 MPa, or at least 2000 MPa, determined according to ASTM D 790 (A, 1.0 mm/min).

According to some embodiments of the invention, the propylene polymer has a multimodal MWD. According to some embodiments of the invention, the propylene polymer has a multimodal PSD.

According to some embodiments of the invention, the propylene polymer further comprises a second polymer at least partially filling the pores in the matrix. For example, the second polymer can be a rubber fill material at least partially filling the pores, such as, for example, an ethylene-propylene copolymer, e.g., a copolymer of ethylene and from about 3 wt % to 75 wt % of one or more $C_3$ to $C_{20}$ alpha olefins by weight of the ethylene copolymer. In some embodiments, the propylene polymer in which the pores are formed may conveniently be referred to herein as the "first polymer," without implying that the second polymer is necessarily present or, if present, that the first polymer is formed before the second polymer.

In embodiments according to the invention, the propylene polymer is heterophasic and/or an impact copolymer, for example, comprising a second polymer, e.g., fill rubber, disposed in the pores in an amount of at least 20, or at least 30, or at least 40, or at least 50, or at least 60, or at least 70, or at least 80, or up to 85 vol % or more, based on a total volume of the impact copolymer. In additional or alternate embodiments, the second polymer is disposed essentially entirely within the pores, i.e., an exterior surface of the polymer particle is essentially free of the second polymer so that the polymer particles remain free flowing and do not agglomerate and plug processing equipment such as reactors, lines, fittings, and/or valves used in their production.

According to some embodiments of the invention, the propylene polymer is in a particulated form, such as, for example, wherein at least 95% by weight has a particle size greater than about 120 µm, e.g., from 150, 200, 300, 400, or 500 m up to 10, 5 or 1 mm.

According to some embodiments of the invention, the polymer is made with a single site catalyst system, e.g., it has properties or a combination of properties generally attributed to and/or which can be obtained by polymerization with a single site catalyst system as opposed to a Ziegler-Natta (ZN) catalyst system, such as higher molecular weight, lower polydispersity index, lower cold xylene extractables, more uniformly distributed stereo irregularities, higher composition distribution breadth index (CBDI) in the case where a comonomer is present, between 5 and 200 regio defects per 10,000 propylene units, and the like. In additional or alternate embodiments, the polymer further comprises an active single site catalyst system, a residue of a single site catalyst system, or a combination thereof, wherein the single site catalyst system comprises a single site catalyst precursor compound, an activator for the precursor compound, and a support.

According to some embodiments of the invention, the propylene polymer further comprises an active catalyst system comprising a single site catalyst precursor compound, an activator for the precursor compound, and a support distributed in a porous matrix of the propylene polymer.

According to some embodiments of the invention, the matrix of the propylene polymer is comprised of a plurality of polymer subglobules defining interstitial spaces forming the pores in polymer globules. In additional or alternate embodiments, the matrix further comprises dispersed microparticles of a catalyst system comprising a single site catalyst precursor compound, an activator, and a support. In additional or alternate embodiments, the support comprises (1) silica agglomerates having an average PS of more than 30 μm up to 200 μm and comprising a plurality of primary particles having a relatively smaller average PS from 1 nm to 50 μm, wherein the silica agglomerates have a surface area of 400 m²/g or more, a pore volume of from 0.5 to 2 mL/g, and a mean pore diameter of from 1 to 20 nm as determined by BET nitrogen adsorption; or (2) a plurality of free primary particles spaced apart from each other in the polymer subglobules, wherein the primary particles comprise one or more of the primary particles disagglomerated from the silica agglomerates; or (3) a combination thereof.

Multimodal Propylene Polymer Products:

In a preferred embodiment of the invention, the propylene polymer compositions produced herein may have a multimodal MWD of polymer species as determined by GPC-DRI. By multimodal MWD is meant that the GPC-DRI trace has more than one peak or inflection point. In a preferred embodiment of the invention, the propylene polymer compositions produced herein may have a bimodal MWD of polymer species as determined by GPC-DRI. In a preferred embodiment of the invention, the propylene polymer compositions produced herein may have a unimodal MWD of polymer species as determined by GPC-DRI.

In an additional or alternative preferred embodiment of the invention, the propylene polymer compositions produced herein may have a multimodal PSD as determined by laser diffraction. By multimodal PSD is meant that the PSD curve with respect to volume has more than one peak or inflection point. In a preferred embodiment of the invention, the propylene polymer compositions produced herein may have a bimodal PSD as determined by laser diffraction. In another preferred embodiment of the invention, the propylene polymer compositions produced herein may have a unimodal PSD as determined by laser diffraction.

In any embodiment of the invention, the propylene polymer (the A1 component) advantageously has less than 200 regio defects (defined as the sum of 2,1-erythro and 2,1-threo insertions, and 3,1-isomerizations) per 10,000 propylene units, alternatively more than 5, 10, or 15 and less than 200 regio defects per 10,000 propylene units, alternatively more than 17 and less than 175 regio defects per 10,000 propylene units, alternatively more than 20, or 30, or 40, but less than 200 regio defects, alternatively less than 150 regio defects per 10,000 propylene units. The regio defects are determined using $^{13}C$ NMR spectroscopy as described below.

In any embodiment of the invention, the propylene polymer composition produced herein, particularly the composition produced after Stage A1 and Stage A2 (the combined A1&A2 components), has less than 200 regio defects (defined as the sum of 2,1-erythro and 2,1-threo insertions, and 3,1-isomerizations) per 10,000 propylene units, alternatively less than 150 regio defects per 10,000 propylene units, alternatively more than 5 and less than 200 regio defects per 10,000 propylene units, alternatively more than 15 and less than 175 regio defects per 10,000 propylene units, alternatively more than 17 and less than 175 regio defects per 10,000 propylene units.

In any embodiment of the invention, the propylene polymer (A1) component can have a melting point (Tm, DSC peak second melt) of at least 145° C., or at least 150° C., or at least 152° C., or at least 155° C., or at least 160° C., or at least 165° C., preferably from about 145° C. to about 175° C., about 150° C. to about 170° C., or about 152° C. to about 165° C.

In any embodiment of the invention, the propylene polymer compositions produced herein, particularly the composition produced after Stage A1 and Stage A2 (the combined A1&A2 components), can have a melting point (Tm, DSC peak second melt) of at least 145° C., or at least 150° C., or at least 152° C., or at least 155° C., or at least 160° C., or at least 165° C., preferably from about 145° C. to about 175° C., about 150° C. to about 170° C., or about 152° C. to about 165° C.

In any embodiment of the invention, the propylene polymer (A1) component can have a 1% secant flexural modulus from a low of about 1000 MPa, about 1100 MPa, about 1200 MPa, about 1250 MPa, about 1300 MPa, about 1400 MPa, or about 1,500 MPa to a high of about 1,800 MPa, about 2,100 MPa, about 2,600 MPa, or about 3,000 MPa, as measured according to ASTM D 790 (A, 1.0 mm/min), preferably from about 1100 MPa to about 2,200 MPa, about 1200 MPa to about 2,000 MPa, about 1400 MPa to about 2,000 MPa, or about 1500 MPa or more. 1% Secant flexural modulus is determined by using an ISO 37-Type 3 bar, with a crosshead speed of 1.0 mm/min and a support span of 30.0 mm via an Instron machine according to ASTM D 790(A, 1.0 mm/min).

In any embodiment of the invention, the propylene polymer compositions produced herein, particularly the composition produced after Stage A1 and Stage A2 (the combined A1&A2 components), preferably have a 1% secant flexural modulus from about 1000 MPa to about 3,000 MPa, about 1500 MPa to about 3000 MPa, about 1800 MPa to about 2,500 MPa, or about 1800 MPa to about 2,000 MPa.

In any embodiment of the invention, the propylene polymer (A1) component can have a melt flow rate (MFR, ASTM 1238, 230° C., 2.16 kg) from a low of about 0.1 dg/min, about 0.2 dg/min, about 0.5 dg/min, about 1 dg/min, about 15 dg/min, about 30 dg/min, or about 45 dg/min to a high of about 75 dg/min, about 100 dg/min, about 200 dg/min, or about 300 dg/min. For example, the polymer can have an MFR of about 0.5 dg/min to about 300 dg/min, about 1 dg/min to about 300 dg/min, about 5 dg/min to about 150 dg/min, about 10 dg/min to about 100 dg/min, or about 20 dg/min to about 60 dg/min.

In any embodiment of the invention, the propylene polymer compositions produced herein, particularly the composition produced after Stage A1 and Stage A2 (the combined A1&A2 components), can have an MFR (ASTM 1238, 230°

C., 2.16 kg) of from about 1 dg/min to about 300 dg/min, about 5 dg/min to about 150 dg/min, about 10 dg/min to about 100 dg/min, or about 20 dg/min to about 60 dg/min, preferably from about 50 to about 200 dg/min, preferably from about 55 to about 150 dg/min, preferably from about 60 to about 100 dg/min.

In any embodiment of the invention, the propylene polymer (A1) component can have an Mw (as measured by GPC-DRI) from 50,000 to 1,000,000 g/mol, alternately from 80,000 to 1,000,000 g/mol, alternately from 100,000 to 800,000 g/mol, alternately from 200,000 to 600,000 g/mol, alternately from 300,000 to 550,000 g/mol, or alternately from 330,000 to 500,000 g/mol.

In any embodiment of the invention, the propylene polymer compositions produced herein, particularly the composition produced after Stage A1 and Stage A2 (the combined A1&A2 components), can have an Mw (as measured by GPC-DRI) from 50,000 to 1,000,000 g/mol, alternately from 80,000 to 1,000,000 g/mol, alternately from 100,000 to 800,000 g/mol, alternately from 200,000 to 600,000 g/mol, alternately from 300,000 to 550,000 g/mol, or alternately from 330,000 to 500,000 g/mol.

In any embodiment of the invention, the propylene polymer (A1) component can have an Mw/Mn (as measured by GPC-DRI) of greater than 1 to 20, or 1.1 to 15, or 1.2 to 10, or 1.3 to 5, or 1.4 to 4.

In any embodiment of the invention, the propylene polymer compositions produced herein, particularly the composition produced after Stage A1 and Stage A2 (the combined A1&A2 components), can have an Mw/Mn (as measured by GPC-DRI) of greater than 5 to 50, or 5.5 to 45, or 6 to 40, or 6.5 to 35, or 7 to 30.

In any embodiment of the invention, the propylene polymer compositions produced herein, particularly the composition produced after Stage A1 and Stage A2 (the combined A1&A2 components), can have a total propylene content of at least 75 wt %, at least 80 wt %, at least 85 wt %, at least 90 wt %, or at least 95 wt %, or 100 wt % based on the weight of the propylene polymer composition.

In any embodiment of the invention, the propylene polymer compositions produced herein, particularly the composition produced after Stage A1 and Stage A2 (the combined A1&A2 components), can have a total co-monomer content from about 1 wt % to about 35 wt %, about 2 wt % to about 30 wt %, about 3 wt % to about 25 wt %, or about 5 wt % to about 20 wt %, based on the total weight of the propylene polymer compositions, with the balance being propylene.

In any embodiment of the invention, the propylene polymer compositions produced herein, particularly the composition produced after stage A1 and stage A2 (the combined A1&A2 components), can have a propylene meso diads content of 90% or more, 92% or more, about 94% or more, or about 96% or more. Polypropylene microstructure is determined according to the $^{13}$C NMR procedure described below.

In any embodiment of the invention, the propylene polymer compositions produced herein, particularly the composition produced after stage A1 and stage A2 (the combined A1&A2 components), can have a melting point ($T_m$, DSC peak second melt) from at least 100° C. to about 175° C., about 105° C. to about 170° C., about 110° C. to about 165° C., or about 115° C. to about 155° C.

In any embodiment of the invention, the propylene polymer compositions produced herein, particularly the composition produced after stage A1 and stage A2 (the combined A1&A2 components), can have a crystallization point (Tc, DSC) of 115° C. or more, preferably from at least 100° C. to about 150° C., about 105° C. to about 130° C., about 110° C. to about 125° C., or about 115° C. to about 125° C.

In any embodiment of the invention, the propylene polymer compositions produced herein, particularly the composition produced after stage A1 and stage A2 (the combined A1&A2 components), can have a CDBI of 50% or more (preferably 60% or more, alternately 70% or more, alternately 80% or more, alternately 90% or more, alternately 95% or more).

In any embodiment of the invention, the propylene polymer compositions produced herein, particularly the composition produced after stage A1 and stage A2 (the combined A1&A2 components), can have a multimodal (such as bimodal) molecular weight distribution (Mw/Mn) distribution of polymer species.

In an embodiment, the propylene polymer composition produced herein has:

a) at least 50 mol % propylene (or from 50 to 100 mol %, or from 60 to 97 mol %, or from 65 to 95 mol %, or from 70 to 90 mol %, or at least 90 mol %, or from 50 to 99 mol %) and optionally at least 1 mol % co-monomer (or from 1 to 50 mol %, or from 3 to 40 mol %, or from 5 to 35 mol %, or from 10 to 30 mol %) based upon the weight of the propylene polymer composition; and/or b) a 1% secant flexural modulus of at least 1000 MPa (or at least 1300 MPa, or at least 1500 MPa, or at least 1600 MPa, or at least 1800 MPa, or at least 1900 MPa, or at least 2000 MPa, or at least 2100 MPa, or at least 2200 MPa);

c) less than 200 regio defects (sum of 2,1-erythro and 2,1-threo insertions and 3,1-isomerizations) per 10,000 propylene units, as determined by $^{13}$C NMR spectroscopy (or from 5 to 200, or from 10 to 200, or from 15 to 200, or from 17 to 175 regio defects per 10,000 propylene units, alternatively more than 5, or 10, or 20, or 30, or 40, but less than 200 regio defects, alternatively less than 150 regio defects per 10,000 propylene units.); and/or d) a porosity greater than or equal to about 15%, based on the total volume of the propylene polymer base resin or matrix, determined by mercury infiltration porosimetry (or greater than or equal to 20, 25, 30, 35, 40, 45%, up to about 50, 60, 70, 80, or 85% or higher); and/or e) a median PD as determined by mercury intrusion porosimetry of less than 165 μm or less than 160 μm (or from 1, or 2, or 5, or 10 μm, up to 50, or 60, or 70, or 80, or 90, or 100, or 120, or 125, or 150, or 160, or 165 μm); and/or f) an Mw/Mn of at least 2, at least 3, at least 4, or at least 5, as determined GPC-DRI (or from 5 to 40, or from 6 to 20, or from 7 to 15); and/or g) a melt flow rate of 50 dg/min or more, as determined by ASTM D 1238, 230° C., 2.16 kg (or 60 dg/min or more, or 75 dg/min or more); and/or h) a multimodal Mw/Mn, as determined by GPC-DRI, particularly the composition produced after stage A and stage B (the combined A&B components), or (ii) an Mw/Mn of greater than 1 to 5 (alternatively 1.1 to 3, alternately 1.3 to 2.5), particularly the composition produced after stage A;

i) a multimodal PSD; and/or j) if co-monomer is present, a CDBI of 50% or more (or 60% or more, alternately 70% or more, alternately 80% or more, alternately 90% or more, alternately 95% or more).

In any embodiment described herein, propylene copolymer composition may have a melting point (Tm, DSC peak second melt) from at least 100° C. to about 175° C., about 105° C. to about 170° C., about 110° C. to about 165° C., or about 115° C. to about 155° C., and a crystallization point (Tc, DSC peak second melt) of 115° C. or more, preferably from at least 100° C. to about 150° C., about 105° C. to about 130° C., about 110° C. to about 125° C., or about 115° C. to about 125° C.

Heterophasic Copolymers:

In some embodiments of the invention, the propylene polymer is heterophasic. In some further embodiments of the invention the propylene polymer is an impact copolymer (ICP). In some embodiments, the ICP comprises a blend of iPP (component A or the composition produced after stage A1 and optionally stage A2 (the combined A1&A2 components) described above), preferably with a $T_m$ of 120° C. or more, with a propylene polymer with a glass transition temperature ($T_g$) of −30° C. or less and/or an ethylene polymer (component B). In the following ICP embodiments of the invention, component A refers to the composition produced after stage A discussed in the preceding polymer product embodiments, as well as the composition produced after stage A1 and stage A1 and stage A2 (the combined A1&A2 components) described above.

In some embodiments, component A (or the combined A1&A2 component if present) comprises 60 to 95 wt % of the ICP, and component B 5 to 40 wt %, by total weight of components A (or the combined A1&A2 component if present) and B, or by total weight of the ICP. The iPP of component A (or the combined A1&A2 component if present) may have any one, combination or all of the properties of any of the iPP embodiments disclosed herein, and/or may be made by any of the processes described herein for producing iPP. In some embodiments of the invention, component B is an ethylene copolymer or an EP rubber, preferably with a $T_g$ of −30° C. or less. In some embodiments of the invention the matrix phase is comprised primarily of component A (or the combined A1&A2 component if present), while component (B) primarily comprises the dispersed phase or is co-continuous. In some embodiments of the invention, the ICP comprises only two monomers: propylene and a single co-monomer chosen from among ethylene and $C_4$ to $C_8$ alpha-olefins, preferably ethylene, butene, hexene or octene, more preferably ethylene. Alternately or additionally, the ICP comprises three monomers: propylene and two co-monomers chosen from among ethylene and $C_4$ to $C_8$ alpha-olefins, preferably two selected from ethylene, butene, hexene and octene. Preferably, component A (or the combined A&B component if present) has a $T_m$ of 120° C. or more, or 130° C. or more, or 140° C. or more, or 150° C. or more, or 160° C. or more. Preferably, component C has a $T_g$ of −30° C. or less, or −40° C. or less, or −50° C. or less.

In an embodiment of the invention, the (B) component has a heat of fusion (Hf) of 90° C. or less (as determined by DSC). Preferably the (B) component has an Hf of 70° C. or less, preferably 50° C. or less, preferably 35° C. or less.

Preferably the ICP produced from Stages A, combined A1&A2, and/or B is heterophasic, especially wherein the iPP is a continuous phase and the fill rubber is a dispersed or co-continuous phase.

In some embodiments, the impact copolymer has a matrix phase comprising primarily a propylene polymer composition having a melting point ($T_m$) of 100° C. or more, an MWD of 5 or more and a multimodal MWD, and the dispersed or fill phase comprises (preferably primarily comprises) a polyolefin having a $T_g$ of −20° C. or less. Preferably, the matrix phase comprises primarily homopolymer polypropylene (hPP) and/or random copolymer polypropylene (RCP) with relatively low co-monomer content (less than 5 wt %), and has a melting point of 110° C. or more (preferably 120° C. or more, preferably 130° C. or more, preferably 140° C. or more, preferably 150° C. or more, preferably 160° C. or more). Preferably, the dispersed phase comprises primarily one or more ethylene or propylene copolymer(s) with relatively high co-monomer content (at least 5 wt %, preferably at least 10 wt %); and has a $T_g$ of −30° C. or less (preferably −40° C. or less, preferably −50° C. or less).

An "in-situ ICP" is a specific type of ICP which is a reactor blend of the (A) and (B) components of an ICP, meaning (A) optionally (A1&A2) and (C) were made in separate reactors (or reactions zones) physically connected in series, with the effect that an intimately mixed final product is obtained in the product exiting the final reactor (or reaction zone). Typically, the components are produced in a sequential polymerization process, wherein (A1) is produced in a first reactor is transferred to a second reactor where optionally (A2) is produced in a second reactor (or the combined A1&A2 components may be produced in one reactor), and the product is transferred to another reactor where (B) is produced and incorporated into the (A or A1&A2) matrix. There may also be a minor amount of a component (C), produced as a byproduct during this process, comprising primarily the non-propylene co-monomer (e.g., (C) will be an ethylene polymer if ethylene is used as the co-monomer). In the literature, especially in the patent literature, an in-situ ICP is sometimes identified as "reactor-blend ICP" or a "block copolymer", although the latter term is not strictly accurate since there is at best only a very small fraction of molecules that are (A)-(C) copolymers. In a preferred embodiment of the invention, the polymer composition produced herein is an in-situ-ICP.

An "ex-situ ICP" is a specific type of ICP which is a physical blend of (A) and optionally (A1&A2) and (B), meaning (A) (A1&A2) and/or (B) were synthesized independently and then subsequently blended typically using a melt-mixing process, such as an extruder. An ex-situ ICP is distinguished by the fact that (A) and or (A1&A2), and (B) are collected in solid form after exiting their respective synthesis processes, and then combined; whereas for an in-situ ICP, (A) optionally (A1&A2) and (B) are combined within a common synthesis process and only the blend is collected in solid form.

In one or more embodiments, the impact copolymer (the combination of A, optional A1&A2 and B components) advantageously has more than 15 and less than 200 regio defects (defined as the sum of 2,1-erythro and 2,1-threo insertions, and 3,1-isomerizations) per 10,000 propylene units, alternatively more than 17 and less than 175 regio defects per 10,000 propylene units, alternatively more than 20 or 30 or 40, but less than 200 regio defects, alternatively less than 150 regio defects per 10,000 propylene units. The regio defects are determined using $^{13}C$ NMR spectroscopy as described below.

The impact polymers produced typically have a heterophasic morphology such that the matrix phase is primarily propylene polymer having a Tm of 120° C. or more and the dispersed phase is primarily an ethylene copolymer (such as EP Rubber) or propylene polymer typically having a Tg of −30° C. or less.

The impact copolymers produced herein preferably have a total propylene content of at least 50 wt %, at least 75 wt %, at least 80 wt %, at least 85 wt %, at least 90 wt %, or at least 95 wt %, or 100 wt % based on the weight of the propylene polymer composition.

The impact copolymers produced herein preferably have a total co-monomer content from about 0.1 wt % to about 75 wt %, about 1 wt % to about 35 wt %, about 2 wt % to about 30 wt %, about 3 wt % to about 25 wt %, or about 5 wt % to about 20 wt %, based on the total weight of the propylene polymer compositions, with the balance being propylene.

In embodiments, impact copolymers comprise iPP (typically from stage A or A1&A2) and ethylene copolymer (typically from stage B) and typically have an ethylene copolymer (preferably ethylene propylene copolymer, preferably EP rubber) content in a range from a low of about 5 wt %, about 8 wt %, about 10 wt %, or about 15 wt %, or about 20 wt %, or about 30 wt %, or about 40 wt %, or about 50 wt %, to any higher upper limit of about 25 wt %, about 30 wt %, about 35 wt %, or about 40 wt %, or about 50 wt %, or about 60 wt %, or about 70 wt %, or about 75 wt %, or about 80 wt %, or about 85 wt % or higher. For example, the impact polymer can have an ethylene copolymer content of about 15 wt % to about 85 wt %, about 30 wt % to about 75 wt %, about 35 wt % to about 70 wt %, or about 40 wt % to about 60 wt %. In some preferred embodiments of the invention, the ICP has an ethylene copolymer content of at least about 25 wt %, at least about 30 wt %, at least about 35 wt %, or at least about 40 wt %, up to a high of about 50 wt %, 60 wt %, 70 wt %, 80 wt % or higher.

In embodiments, impact copolymers comprise iPP (from stage A or A1&A2) and ethylene copolymer (from stage B), the impact copolymer can have a propylene content in the ethylene copolymer component from a low of about 25 wt %, about 85 wt % or higher, or to about 37 wt %, or about 46 wt % to a high of about 73 wt %, or about 77 wt %, or about 80 wt %, based on the weight of the ethylene copolymer. For example, the impact copolymer can have a propylene content of the ethylene copolymer component from about 25 wt % to about 80 wt %, about 10 wt % to about 75 wt %, about 35 wt % to about 70 wt %, or at least 40 wt % to about 80 wt %, based on the weight of the ethylene copolymer.

The impact copolymers produced herein preferably have a heat of fusion ($H_f$, DSC second heat) of 60 J/g or more, 70 J/g or more, 80 J/g or more, 90 J/g or more, about 95 J/g or more, or about 100 J/g or more.

In embodiments, the impact polymers produced herein have a 1% secant flexural modulus greater than about 300 MPa, or 500 MPa, or 700 MPa, or 1000 MPa, or 1500 MPa, or 2000 MPa, or from about 300 MPa to about 3,000 MPa, about 500 MPa to about 2,500 MPa, about 700 MPa to about 2,000 MPa, or about 900 MPa to about 2,000 MPa, as measured according to ASTM D 790 (A, 1.0 mm/min).

In embodiments, the impact polymers produced herein may have an Mw (as measured by GPC-DRI) from 50,000 to 1,000,000 g/mol, alternately from 80,000 to 1,000,000 g/mol, alternately from 100,000 to 800,000 g/mol, alternately from 200,000 to 600,000 g/mol, alternately from 300,000 to 550,000 g/mol, or alternately from 330,000 to 500,000 g/mol.

$^{13}$C-NMR Spectroscopy on Polyolefins:

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in d2-1,1,2,2-tetrachloroethane at 120° C., and spectra are acquired with a 10-mm broadband probe recorded at 120° C. using a 400 MHz (or higher) NMR spectrometer (such as Varian Inova 700 or Unity Plus 400, in event of conflict the 700 shall be used). Polymer resonance peaks are referenced to mmmm=21.83 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

Regio Defect Concentrations by $^{13}$C NMR:

$^{13}$Carbon NMR spectroscopy is used to measure stereo and regio defect concentrations in the polypropylene. $^{13}$Carbon NMR spectra are acquired with a 10-mm broadband probe on a Varian Inova 700 or UnityPlus 400 spectrometer (in event of conflict the 700 shall be used). The samples were prepared in 1,1,2,2-tetrachloroethane-d2 (TCE). Sample preparation (polymer dissolution) was performed at 120° C. In order to optimize chemical shift resolution, the samples were prepared without chromium acetylacetonate relaxation agent. Signal-to-noise was enhanced by acquiring the spectra with nuclear Overhauser enhancement for 10 seconds before the acquisition pulse, and 3.2 second acquisition period, for an aggregate pulse repetition delay of 14 seconds. Free induction decays of 3400-4400 coadded transients were acquired at a temperature of 120° C. After Fourier transformation (256 K points and 0.3 Hz exponential line broadening), the spectrum is referenced by setting the dominant mmmm meso methyl resonance to 21.83 ppm.

Chemical shift assignments for the stereo defects (given as stereo pentads) can be found in the literature [L. Resconi, L. Cavallo, A. Fait, and F. Piemontesi, Chem. Rev. 2000, 100, pp. 1253-1345]. The stereo pentads (e.g., mmmm, mmmr, mrrm, etc.) can be summed appropriately to give a stereo triad distribution (mm, mr, and rr), and the mole percentage of stereo diads (m and r). Three types of regio defects were quantified: 2,1-erythro, 2,1-threo, and 3,1-isomerization. The structures and peak assignments for these are also given in Chem. Rev. 2000, 100, pp. 1253-1345. The concentrations for all defects are quoted in terms of defects per 10,000 monomer units.

The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
| --- | --- |
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals ($CH_3$, CH, $CH_2$), and multiplied by 10,000 to determine the defect concentration per 10,000 monomer units.

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, J. Appl. Polym. Sci., 56, p. 1781, (1995), and using peak assignments from Zhang, Polymer, 45, p. 2651, (2004), for higher olefin co-monomers.

Composition Distribution Breadth index (CDBI) is a measure of the composition distribution of monomer within the polymer chains. It is measured as described in WO 93/03093, specifically columns 7 and 8 as well as in Wild et al, J. Poly. Sci., Poly. Phys. Ed., Vol. 20, p. 441, (1982) and U.S. Pat. No. 5,008,204, including that fractions having a weight average molecular weight (Mw) below 15,000 g/mol are ignored when determining CDBI.

Unless otherwise indicated, Tg is determined by DMA, according to the procedure set out in US 2008/0045638 at page 36, including any references cited therein.

EMBODIMENTS LISTING

The present invention provides, among others, the following embodiments, each of which may be considered as optionally including any alternate embodiments.

E1. A propylene polymer comprising:
- at least 50 mol % propylene;
- a 1% Secant flexural modulus of at least 1000 MPa, determined according to ASTM D 790 (A, 1.0 mm/min);
- less than 200 regio defects (alternately between greater than 5 and less than 200 regio defects) per 10,000 propylene units, determined by 13C NMR;
- if comonomer is present, a composition distribution breadth index (CDBI) of 50% or more;
- a matrix comprising a porosity of 15% or more and a median pore diameter less than 165 μm (alternately greater than 6 and/or less than 160 μm), as determined by mercury intrusion porosimetry.

E2. The propylene polymer of Embodiment E1, wherein the porosity is 20% or more (alternately 25% or more, or 30% or more, or 35% or more, or 40% or more; up to 85%, or up to 80%, or up to 75%, or up to 70%, or up to 60%, or up to 50%).

E3. The propylene polymer of Embodiment E1 or Embodiment E2, wherein the median pore diameter (PD) is greater than 0.1 μm (alternately greater than 1 μm, or greater than 2 μm, or greater than 5 μm, or greater than 6 μm, or greater than 8 μm, or greater than 10 μm, or greater than 12 μm, or greater than 15 μm, or greater than 20 μm) and/or less than 160 μm (alternately less than 50 μm, or less than 60 μm, or less than 70 μm, or less than 80 μm, or less than 90 μm, or less than 100 μm, or less than 120 μm, or less than 125 μm, or less than 140 μm, or less than 150 μm) (alternately from 8 μm up to 150 μm).

E4. The propylene polymer of any one of the preceding embodiments, comprising a multimodal (alternately bimodal) molecular weight distribution.

E5. The propylene polymer of any one of the preceding embodiments, wherein the polymer is in a particulated form.

E6. The propylene polymer of any one of the preceding embodiments, wherein at least 90% (alternately at least 95%, or at least 98%, or at least 99%) by volume has a particle size (PS) greater than about 120 μm (alternately from 150, 200, 300, 400, or 500 μm up to 10, 5 or 1 mm).

E7. The propylene polymer of any one of the preceding embodiments, comprising a multimodal (alternately bimodal) particle size distribution.

E8. The propylene polymer of any one of the preceding embodiments, comprising a heterophasic copolymer comprising a fill phase at least partially filling the pores in the matrix.

E9. The propylene polymer of Embodiment E8, wherein the fill phase comprises ethylene propylene rubber.

E10. The propylene polymer of Embodiment E8 or Embodiment E9, wherein the propylene polymer comprises an ethylene copolymer content from about 5 wt % (alternately about 8 wt %, about 10 wt %, or about 15 wt %, or about 20 wt %, about 30 wt %, or about 40 wt %, or about 50 wt %) up to about 25 wt % (alternately about 30 wt %, about 35 wt %, or about 40 wt %, or about 50 wt %, or about 60 wt %, or about 70 wt %, or about 75 wt %, or about 80 wt %, or about 85 wt %) based on the total weight of the propylene polymer.

E11. The propylene polymer of any one of the preceding embodiments, wherein the polymer is made with a single site catalyst system.

E12. The propylene polymer of Embodiment E11, wherein the polymer further comprises active sites of the catalyst system, a residue of the catalyst system, or a combination thereof.

E13. The propylene polymer of Embodiment E11 or Embodiment E12, wherein the single site catalyst system comprises a single site catalyst precursor compound, an activator for the precursor compound, and a support.

E14. The propylene polymer of any one of the preceding embodiments, further comprising an active catalyst system dispersed in the matrix.

E15. The propylene polymer of Embodiment E13 or Embodiment E14, wherein the catalyst system comprises a single site catalyst precursor compound, an activator for the precursor compound, and a support, the support having a specific surface area (SA) of 400 $m^2$/g or more (alternately 400-1000 $m^2$/g, or 400-650 $m^2$/g, or 650-1000 $m^2$/g), a pore volume (PV) of from 0.5 to 2 mL/g (alternately 0.5 to 1.5 mL/g), and a mean PD of from 1 to 20 nm (10 to 200 Å) (alternately 1 to 7 nm, or 7 to 20 nm).

E16. The propylene polymer of any one of the preceding embodiments, wherein the matrix is comprised of a plurality of polymer subglobules defining interstitial spaces forming the pores in polymer globules.

E17. The propylene polymer of any one of the preceding embodiments, further comprising a total propylene content of at least 75 wt % (alternately at least 80 wt %, at least 85 wt %, at least 90 wt %, or at least 95 wt %, or 100 wt %) based on the weight of the propylene polymer composition.

E18. The propylene polymer of any one of the preceding embodiments, further comprising a total comonomer content from about 1 wt % to about 35 wt % (alternately about 2 wt % to about 30 wt %, or about 3 wt % to about 25 wt %, or about 5 wt % to about 20 wt %) based on the total weight of the propylene polymer composition.

E19. The propylene polymer of any one of the preceding embodiments, further comprising a comonomer and a CDBI of 50% or more (alternately 60% or more, 70% or more, 80% or more, 90% or more, or 95% or more).

E20. The propylene polymer of any one of the preceding embodiments, further comprising at least 10% isotactic pentads (alternately at least 20% isotactic pentads, or at least 30% isotactic pentads, or at least 40% isotactic pentads, or at least 50% isotactic pentads).

E21. The propylene polymer of any one of the preceding embodiments, further comprising more than 5 (alternately more than 10, or more than 15, or more than 17, or more than 20, or more than 30, or more than 40) regio defects per 10,000 propylene units, as determined by 13C NMR.

E22. The propylene polymer of any one of the preceding embodiments, further comprising less than 200 regio defects (alternatively less than 175 or less than 150) per 10,000 propylene units.

E23. The propylene polymer of any one of the preceding embodiments, wherein the 1% Secant flexural modulus is at least 1300 MPa (alternately at least 1500 MPa, or at least 1700 MPa, or at least 1800 MPa, or at least 1900

MPa, or at least 2000 MPa, or at least 2100 MPa, or at least 2200 MPa), determined according to ASTM D 790 (A, 1.0 mm/min).

E24. The propylene polymer of any one of the preceding embodiments, further comprising a melting point (Tm, DSC peak second melt) of at least 120° C. or more (alternately 130° C. or more, or 140° C. or more, or 150° C. or more, or 160° C. or more).

E25. The propylene polymer of any one of the preceding embodiments, further comprising an Mw/Mn as measured by GPC-DRI of greater than 1 (alternately 1.1, or 1.2, or 1.3, or 1.4) to 20 (alternately 15, or 10, or 5, or 4).

E26. The propylene polymer of any one of the preceding embodiments, further comprising a multimodal molecular weight distribution with an overall Mw/Mn of greater than 1 to 20 and at least one mode having an Mw/Mn of greater than 1 to 5.

E27. The propylene polymer of any one of the preceding embodiments, further comprising a melt flow rate (MFR, ASTM 1238, 230° C., 2.16 kg) from about 0.1 dg/min (alternately from about 0.2 dg/min, about 0.5 dg/min, about 1 dg/min, about 15 dg/min, about 30 dg/min, or about 45 dg/min) up to about 300 dg/min (alternately about 75 dg/min, about 100 dg/min, about 200 dg/min, or about 300 dg/min).

E28. The propylene polymer of any one of the preceding embodiments, further comprising an Mw (as measured by GPC-DRI) from 50,000 g/mol (alternately 80,000 g/mol, 100,000 g/mol, 200,000 g/mol, 300,000 g/mol, or 330,000 g/mol) to 1,000,000 g/mol (alternately 800,000 g/mol, 600,000 g/mol, 550,000 g/mol, or 500,000 g/mol).

E29. [Reserved]

E30. [Reserved]

E31. A process to polymerize propylene comprising:
(a) contacting propylene monomer under polymerization conditions with a catalyst system, the catalyst system comprising a single site catalyst precursor compound, an activator, and a support, wherein the support has an average PS of more than 30 µm up to 200 µm, an SA of 400 m²/g or more, a PV of from 0.5 to 2 mL/g (alternately 0.5 to 1.5 mL/g), and a mean PD of from 1 to 20 nm (10 to 200 Å), as determined by BET nitrogen adsorption; and
(b) forming a matrix of propylene polymer comprising at least 50 mol % propylene and a porosity of 15% or more as determined by mercury intrusion porosimetry.

E32. The process of Embodiment E31, wherein the support comprises agglomerates of a plurality of primary particles.

E33. The process of Embodiment E32, wherein the primary particles have a smaller average particle size relative to the agglomerates, the primary particles having an average particle size from 1 nm to 50 microns.

E34. The process of Embodiment E32 or Embodiment E33, further comprising fragmenting the agglomerates in (b) to disperse catalyst sites in the propylene polymer matrix.

E35. The process of any one of embodiments E31 to E34, wherein the support comprises metal oxide.

E36. The process of any one of embodiments E31 to E35, wherein the support comprises silica.

E37. The process of any one of embodiments E31 to E36, wherein the support is spray dried.

E38. The process of any one of embodiments E31 to E37, wherein the support has an average PS of more than 30 µm (alternately more than 40 µm, more than 50 µm, or more than 60 µm, more than 65 µm, or more than 70 µm, or more than 75 µm, or more than 80 µm, or more than 85 µm, or more than 90 µm, or more than 100 µm, or more than 120 µm) up to 200 µm (alternately less than 180 µm, or less than 160 µm, or less than 150 µm, or less than 130 µm).

E39. The process of any one of embodiments E31 to E38, wherein the support comprises:
SA less than wherein the support has SA less than 1400 m²/g (alternately less than 1200 m²/g, or less than 1100 m²/g, or less than 1000 m²/g, or less than 900 m²/g, or less than 850 m²/g, or less than 800 m²/g, or less than 750 m²/g, or less than 700 m²/g, or less than 650 m²/g; and/or more than 500 m²/g, or more than 600 m²/g, or more than 650 m²/g, or more than 700 m²/g); and/or
a mean PD greater than 2 nm (alternately greater than 3 nm, or greater than 4 nm, or greater than 5 nm, or greater than 6 nm, or greater than 7 nm, or greater than 8 nm; and/or less than 20 nm, or less than 15 nm, or less than 13 nm, or less than 12 nm, or less than 10 nm, or less than 8 nm, or less than 7 nm, or less than 6 nm).

E40. The process of any one of embodiments E31 to E39, wherein the SA is more than 650 m²/g and the mean pore diameter is less than 7 nm (70 Å).

E41. The process of any one of embodiments E31 to E39, wherein the specific surface area is less than 650 m²/g or the mean pore diameter is greater than 7 nm (70 Å).

E42. The process of any one of embodiments E31 to E41, wherein the activator comprises alumoxane (alternately MAO or MMAO).

E43. The process of any one of embodiments E31 to E42, wherein the catalyst system further comprises a co-activator selected from the group consisting of: trimethylaluminum, triethylaluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzic, dipropylzinc, and dibutylzinc) (alternately the group consisting of: trimethylaluminum, triethylaluminum, triisobutylaluminum, tri-n-octylaluminum, trihexylaluminum, and diethylzinc).

E44. The process of any one of embodiments E31 to E43, wherein the single site catalyst precursor compound is represented by the following formula:

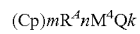

$$(Cp)_m R^A_n M^4 Q_k$$

wherein:
each Cp is a cyclopentadienyl moiety or a substituted cyclopentadienyl moiety substituted by one or more hydrocarbyl radicals having from 1 to 20 carbon atoms;
$R^A$ is a structural bridge between two Cp moieties;
$M^4$ is a transition metal selected from groups 4 or 5;
Q is a hydride or a hydrocarbyl group having from 1 to 20 carbon atoms or an alkenyl group having from 2 to 20 carbon atoms, or a halogen;
m is 1, 2, or 3, with the proviso that if m is 2 or 3, each Cp may be the same or different;

n is 0 or 1, with the proviso that n=0 if m=1; and
k is such that k+m is equal to the oxidation state of $M^4$, with the proviso that if k is greater than 1, each Q may be the same or different.

E45. The process of any one of embodiments E31 to E43, wherein the single site catalyst precursor compound is represented by the formula:

$$R^A(CpR''p)(CpR^* q)M^5Qr$$

wherein:
each Cp is a cyclopentadienyl moiety or substituted cyclopentadienyl moiety;
each R* and R" is a hydrocarbyl group having from 1 to 20 carbon atoms and may be the same or different;
p is 0, 1, 2, 3, or 4;
q is 1, 2, 3, or 4;
RA is a structural bridge between the Cp moieties imparting stereorigidity to the metallocene compound;
$M^5$ is a group 4, 5, or 6 metal;
Q is a hydrocarbyl radical having 1 to 20 carbon atoms or is a halogen;
r is s minus 2, where s is the valence of $M^5$;
wherein (CpR*q) has bilateral or pseudobilateral symmetry; R*q is selected such that (CpR*q) forms a fluorenyl, alkyl substituted indenyl, or tetra-, tri-, or dialkyl substituted cyclopentadienyl radical; and (CpR"p) contains a bulky group in one and only one of the distal positions;
wherein the bulky group is of the formula ARw; and
where A is chosen from group 4 metals, oxygen, or nitrogen, and Rw is a methyl radical or phenyl radical, and v is the valence of A minus 1.

E46. The process of any one of embodiments E31 to E43, wherein the single site catalyst precursor compound is represented by the formula:

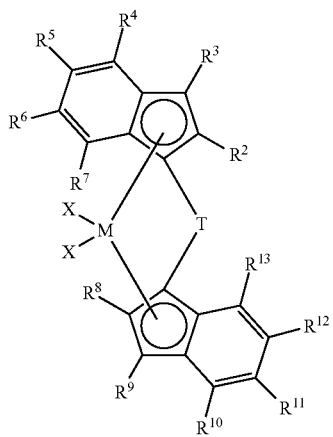

where:
M is a group 4, 5 or 6 metal;
T is a bridging group;
each X is, independently, an anionic leaving group;
each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or an —NR'$_2$, —SR', —OR', —OSiR'$_3$, or —PR'$_2$ radical, wherein R' is one of a halogen atom, a $C_1$-$C_{10}$ alkyl group, or a $C_6$-$C_{10}$ aryl group.

E47. The process of Embodiment E46, wherein at least one of $R^2$, $R^3$, $R^4$, $R^5$, $R^6$, $R^7$, $R^8$, $R^9$, $R^{10}$, $R^{11}$, $R^{12}$, and $R^{13}$ is a cyclopropyl substituent represented by the formula:

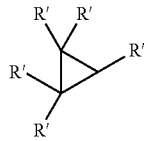

wherein each R' in the cyclopropyls substituent is, independently, hydrogen, a substituted hydrocarbyl group, an unsubstituted hydrocarbyl group, or a halogen.

E48. The process of Embodiment E46 or Embodiment E47, wherein:
M is selected from titanium, zirconium, hafnium, vanadium, niobium, tantalum, chromium, molybdenum and tungsten;
each X is independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; or optionally are joined together to form a $C_4$ to $C_{40}$ alkanediyl group or a conjugated $C_4$ to $C_{40}$ diene ligand which is coordinated to M in a metallacyclopentene fashion; or optionally represent a conjugated diene, optionally, substituted with one or more groups independently selected from hydrocarbyl, trihydrocarbylsilyl, and trihydrocarbylsilylhydrocarbyl groups, said diene having a total of up to 40 atoms, not counting hydrogen, and forming a π complex with M;
each $R^2$, $R^4$, $R^8$ and $R^{10}$ is independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups;
$R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and $C_7$ to $C_{40}$ substituted or unsubstituted arylalkenyl groups; and
T is selected from:

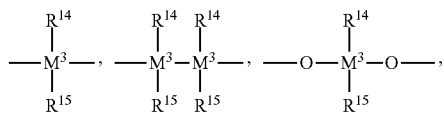

53

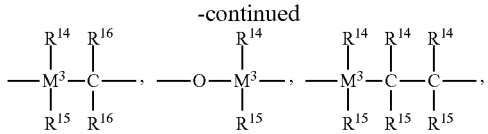

—B(R$^{14}$)—, —Al(R$^{14}$)—, —Ge—, —Sn—, —O—, —S—, —SO—, —SO$_2$—, —N(R$^{14}$)—, —CO—, —P(R$^{14}$)—, and —P(O)(R$^{14}$)—;

wherein R$^{14}$, R$^{15}$, and R$^{16}$ are each independently selected from hydrogen, halogen, C$_1$ to C$_{20}$ alkyl groups, C$_6$ to C$_{30}$ aryl groups, C$_1$ to C$_{20}$ alkoxy groups, C$_2$ to C$_{20}$ alkenyl groups, C$_7$ to C$_{40}$ arylalkyl groups, C$_8$ to C$_{40}$ arylalkenyl groups and C$_7$ to C$_{40}$ alkylaryl groups, optionally R$^{14}$ and R$^{15}$, together with the atom(s) connecting them, form a ring; and M$^3$ is selected from carbon, silicon, germanium, and tin; or T is represented by the formula:

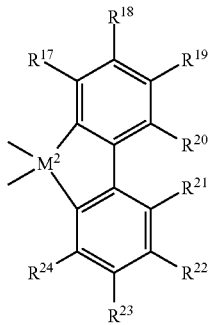

wherein R$^{17}$, R$^{18}$, R$^{19}$, R$^{20}$, R$^{21}$, R$^{22}$, R$^{23}$, and R$^{24}$ are each independently selected from hydrogen, halogen, hydroxy, substituted or unsubstituted C$_1$ to C$_{10}$ alkyl groups, substituted or unsubstituted C$_1$ to C$_{10}$ alkoxy groups, substituted or unsubstituted C$_6$ to C$_{14}$ aryl groups, substituted or unsubstituted C$_6$ to C$_{14}$ aryloxy groups, substituted or unsubstituted C$_2$ to C$_{10}$ alkenyl groups, substituted or unsubstituted C$_7$ to C$_{40}$ alkylaryl groups, substituted or unsubstituted C$_7$ to C$_{40}$ alkylaryl groups and substituted or unsubstituted C$_8$ to C$_{40}$ arylalkenyl groups; optionally two or more adjacent radicals R$^{17}$, R$^{18}$, R$^{19}$, R$^{20}$, R$^{21}$, R$^{22}$, R$^{23}$, and R$^{24}$, including R$^{20}$ and R$^{21}$, together with the atoms connecting them, form one or more rings; and M$^2$ represents one or more carbon atoms, or a silicon, germanium, or tin atom.

E49. The process of any one of Embodiments E31 to E48, wherein the contacting of the propylene monomer with the catalyst system is carried out in a liquid slurry phase.

E50. The process of any one of Embodiments E31 to E48, wherein the contacting of the propylene monomer with the catalyst system is carried out in a gas phase.

E51. The process of any one of Embodiments E31 to E48, wherein the contacting of the propylene monomer with the catalyst system is carried out in a solution phase.

E52. The process of any one of Embodiments E31 to E51, wherein the polymerization conditions comprise a pressure of from about 0.96 MPa to about 7 MPa.

E53. The process of any one of Embodiments E31 to E52, wherein the polymerization conditions comprise a temperature of from about −20° C. to 150° C.

E54. The process of any one of Embodiments E31 to E53, wherein the polymerization conditions comprise a residence time from 15 to 720 minutes.

E55. The process of any one of Embodiments E31 to E54, wherein the polymerization conditions comprise the presence of hydrogen.

E56. The process of any one of Embodiments E31 to E54, wherein the polymerization conditions comprise the essential absence of hydrogen.

E57. The process of any one of Embodiments E31 to E56, wherein the polymerization conditions comprise the presence of an ethylene or C$_4$ to C$_{20}$ comonomer.

E58. The process of any one of Embodiments E31 to E56, wherein the propylene monomer in (a) is essentially free of ethylene and C$_4$ to C$_{20}$ alpha olefins, and the propylene polymer formed is a propylene homopolymer.

E59. The process of any one of Embodiments E31 to E58, further comprising varying a concentration of hydrogen or other chain transfer agent in (a).

E60. The process of any one of Embodiments E31 to E59, wherein the propylene polymer formed in (b) comprises a multimodal molecular weight distribution.

E61. The process of any one of Embodiments E31 to E60, wherein the polymerization conditions comprise further comprising contacting the propylene polymer matrix from (b) with one or more alpha-olefin monomers under polymerization conditions to form a heterophasic copolymer comprising a fill phase at least partially filling the pores in the matrix.

E62. The process of any one of Embodiments E31 to E61, further comprising melt processing the propylene polymer at a shear rate of 1000 sec$^{-1}$ or more.

E63. The process of any one of Embodiments E31 to E62, wherein the propylene polymer matrix formed in (b) has a median PD less than 165 μm, as determined by mercury intrusion porosimetry (alternately greater than 0.1 μm, or greater than 1 μm, or greater than 2 μm, or greater than 5 μm, or greater than 6 μm, or greater than 8 μm, or greater than 10 μm, or greater than 12 μm, or greater than 15 μm, or greater than 20 μm, and/or less than 160 μm, or less than 50 μm, or less than 60 μm, or less than 70 μm, or less than 80 μm, or less than 90 μm, or less than 100 μm, or less than 120 μm, or less than 125 μm, or less than 140 μm, or less than 150 μm; or from 8 μm up to 150 μm).

E64. The process of any one of Embodiments E31 to E63, wherein the support has a PV of from 0.5 to 1.5 mL/g.

E65. The process of any one of Embodiments E31 to E64, wherein the support has an average PS of more than 40 μm (alternately more than 50 μm, or more than 60 μm, or more than 65 μm, or more than 70 μm, or more than 75 μm, or more than 80 μm, or more than 85 μm, or more than 90 μm, or more than 100 μm, or more than 120 μm; and/or up to 200 μm, or less than 180 μm, or less than 160 μm, or less than 150 μm, or less than 130 μm).

E66. The process of any one of Embodiments E31 to E65, wherein the support has a specific SA less than 1400 m$^2$/g (alternately less than 1200 m$^2$/g, or less than 1100 m$^2$/g, or less than 1000 m$^2$/g, or less than 900 m$^2$/g, or less than 850 m$^2$/g, or less than 800 m$^2$/g, or less than m$^2$/g, or less than 700 m$^2$/g, or less than 650 m$^2$/g; and/or more than 600 m$^2$/g, or more than 650 m$^2$/g, or more than 700 m$^2$/g).

E67. The process of any one of Embodiments E31 to E66, wherein the support has a mean PD greater than 2 nm (alternately greater than 3 nm, or greater than 4 nm, or greater than 5 nm, or greater than 6 nm, or greater than 7 nm, or greater than 8 nm; and/or less than 20 nm, or less than 15 nm, or less than 13 nm, or less than 12 nm, or less than 10 nm, or less than 8 nm, or less than 7 nm, or less than 6 nm).

E68. The process of any one of Embodiments E31 to E67, wherein the porosity is 20% or more (alternately 25% or more, or 30% or more, or 35% or more, or 40% or more; up to 85%, or up to 80%, or up to 75%, or up to 70%, or up to 60%, or up to 50%).

E69. The process of any one of Embodiments E31 to E68, wherein the propylene polymer from (b) comprises a multimodal (alternately bimodal) molecular weight distribution.

E70. The process of any one of Embodiments E31 to E69, wherein the propylene polymer from (b) is in a particulated form.

E71. The process of any one of Embodiments E31 to E70, wherein at least 90% (alternately at least 95%, or at least 98%, or at least 99%) of the propylene polymer from (b) by volume has a particle size greater than about 120 μm (alternately from 150, 200, 300, 400, or 500 μm up to 10, 5 or 1 mm).

E72. The process of any one of Embodiments E31 to E71, wherein the propylene polymer from (b) comprises a multimodal (alternately bimodal) particle size distribution.

E73. The process of any one of Embodiments E31 to E72, wherein the propylene polymer from (b) comprises an ethylene copolymer content from about 5 wt % (alternately about 8 wt %, about 10 wt %, or about 15 wt %, or about 20 wt %, or about 30 wt %, or about 40 wt %, or about 50 wt %) up to about 25 wt % (alternately about 30 wt %, about 35 wt %, or about 40 wt %, or about 50 wt %, or about 60 wt %, or about 70 wt %, or about 75 wt %, or about 80 wt %, or about 85 wt %) based on the total weight of the propylene polymer.

E74. The process of any one of Embodiments E31 to E73, wherein the propylene polymer from (b) comprises a total propylene content of at least 75 wt % (alternately at least 80 wt %, at least 85 wt %, at least 90 wt %, or at least 95 wt %, or at least 100 wt %) based on the weight of the propylene polymer composition.

E75. The process of any one of Embodiments E31 to E74, wherein the propylene polymer from (b) comprises a total comonomer content from about 1 wt % to about 35 wt % (alternately about 2 wt % to about 30 wt %, or about 3 wt % to about 25 wt %, or about 5 wt % to about 20 wt %) based on the total weight of the propylene polymer composition.

E76 The process of any one of Embodiments E31 to E75, wherein the propylene polymer from (b) comprises a comonomer and a CDBI of 50% or more (alternately 60% or more, 70% or more, 80% or more, 90% or more, or 95% or more).

E77. The process of any one of Embodiments E31 to E76, wherein the propylene polymer from (b) comprises at least 10% isotactic pentads (alternately at least 20% isotactic pentads, or at least 30% isotactic pentads, or at least 40% isotactic pentads, or at least 50% isotactic pentads).

E78. The process of any one of Embodiments E31 to E77, wherein the propylene polymer from (b) comprises more than 5 (alternately more than 10, or more than 15, or more than 17, or more than 20, or more than 30, or more than 40) regio defects per 10,000 propylene units, determined by $^{13}C$ NMR.

E79. The process of any one of Embodiments E31 to E78, wherein the propylene polymer from (b) comprises less than 200 regio defects (alternatively less than 175 or less than 150) per 10,000 propylene units.

E80. The process of any one of Embodiments E31 to E79, wherein the propylene polymer from (b) comprises a 1% Secant flexural modulus of at least 1000 MPa (alternately at least 1300 MPa, or at least 1500 MPa, or at least 1700 MPa, or at least 1800 MPa, or at least 1900 MPa, or at least 2000 MPa, or at least 2100 MPa, or at least 2200 MPa), determined according to ASTM D 790 (A, 1.0 mm/min).

E81. The process of any one of Embodiments E31 to E80, wherein the propylene polymer from (b) comprises a melting point (Tm, DSC peak second melt) of at least 120° C. or more (alternately 130° C. or more, or 140° C. or more, or 150° C. or more, or 160° C. or more).

E82. The process of any one of Embodiments E31 to E81, wherein the propylene polymer from (b) comprises an Mw/Mn as measured by GPC-DRI of greater than 1 (alternately 1.1, or 1.2, or 1.3, or 1.4) to 20 (alternately 15, or 10, or 5, or 4).

E83. The process of any one of Embodiments E31 to E82, wherein the propylene polymer from (b) comprises a multimodal molecular weight distribution with an overall Mw/Mn of greater than 1 to 20 and at least one mode having an Mw/Mn of greater than 1 to 5.

E84. The process of any one of Embodiments E31 to E83, wherein the propylene polymer from (b) comprises a melt flow rate (MFR, ASTM 1238, 230° C., 2.16 kg) from about 0.1 dg/min (alternately from about 0.2 dg/min, about 0.5 dg/min, about 1 dg/min, about 15 dg/min, about 30 dg/min, or about 45 dg/min) up to about 300 dg/min (alternately about 75 dg/min, about 100 dg/min, about 200 dg/min, or about 300 dg/min).

E85. The process of any one of Embodiments E31 to E84, wherein the propylene polymer from (b) comprises an Mw (as measured by GPC-DRI) from 50,000 g/mol (alternately 80,000 g/mol, 100,000 g/mol, 200,000 g/mol, 300,000 g/mol, or 330,000 g/mol) to 1,000,000 g/mol (alternately 800,000 g/mol, 600,000 g/mol, 550,000 g/mol, or 500,000 g/mol).

E86. The propylene polymer from (b) made by the process according to any one of Embodiments E31 to E85.

EXPERIMENTAL

All reactions were carried out under a purified nitrogen atmosphere using standard glovebox, high vacuum or Schlenk techniques, in a CELSTIR reactor unless otherwise noted. All solvents used were anhydrous, de-oxygenated and purified according to known procedures. All starting materials were either purchased from Aldrich and purified prior to use or prepared according to procedures known to those skilled in the art. Silica was obtained from the Asahi Glass Co., Ltd. or AGC Chemicals Americas, Inc. (D 150-60A, D 100-100A), PQ Corporation (PD 13054), and Davison Chemical Division of W.R. Grace and Company (GRACE 948). MAO was obtained as a 30 wt % MAO in toluene solution from Albemarle (13.6 wt % Al or 5.04 mmol/g). Deuterated solvents were obtained from Cambridge Isotope Laboratories (Andover, Mass.) and dried over 3 Å molecular sieves. All $^1H$ NMR data were collected on a Broker AVANCE III 400 MHz spectrometer running Topspin™ 3.0 software at room temperature (RT) using tetrachloroethane-$d_2$ as a solvent (chemical shift of 5.98 ppm was used as a reference) for all materials.

Gel Permeation Chromatography-DRI (GPC-DRI):

For purposes herein, Mw, Mn and Mw/Mn are determined by using a High temperature gel permeation chromatograph (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 m Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hrs. All quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hrs. before injecting the first sample. The molecular weight is determined by combining universal calibration relationship with the column calibration which is performed with a series of monodispersed polystyrene (PS) standards. The Mw is calculated at each elution volume with following equation.

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $a_{PS}$=0.67 and $K_{PS}$=0.000175 $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, $I_{DRI}$, using the equation: c $K_{DRI}I_{DRI}$/(dn/dc), where $K_{DRI}$ is a constant determined by calibrating the DRI, and (dn/dc)=0.109, the refractive index increment for both PE and PP. The mass recovery is calculated from the ratio of the integrated area of the concentration chromatography over elution volume and the injection mass which is equal to the pre-determined concentration multiplied by injection loop volume. All molecular weights are reported in g/mol unless otherwise noted.

Melt Flow Rate (MFR):

MFR was measured as per ASTM D1238, condition L, at 230° C. and 2.16 kg load unless otherwise indicated.

Differential Scanning Calorimetry (DSC):

Peak crystallization temperature ($T_c$), peak melting temperature ($T_m$), heat of fusion ($H_f$) and glass transition temperature ($T_g$) are measured via differential scanning calorimetry (DSC) using a DSCQ200 unit. The sample is first equilibrated at 25° C. and subsequently heated to 220° C. using a heating rate of 10° C./min (first heat). The sample is held at 220° C. for 3 min. The sample is subsequently cooled down to –100° C. with a constant cooling rate of 10° C./min (first cool). The sample is equilibrated at –100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and $T_m$ corresponding to 10° C./min heating rate is determined. Areas under the DSC curve are used to determine $H_f$, upon melting or $H_c$, upon crystallization, and Tg.

Secant Flexural Modulus:

The 1% secant flexural modulus (1% SFM) was measured using a ISO 37-Type 3 bar, with a crosshead speed of 1.0 mm/min and a support span of 30.0 mm using an Instron machine according to ASTM D 790 (A, 1.0 mm/min).

Capillary Rheology:

All capillary rheology tests on polymers were conducted with an ARC 2 rheometer at 200° C. using a 1 mm die with a path length of 30 mm. The test conditions were reproduced according to ASTM D3835, Standard Test Method for Determination of Properties of Polymeric Materials by Means of a Capillary Rheometer, and the shear viscosity data were corrected using the Rabinowitsch correction factor to account for the velocity gradient at the die wall for non-Newtonian fluids.

Mercury Porosimetry:

Mercury intrusion porosimetry was used to determine the porosity and the median PD of porous iPPs using an Autopore IV 9500 series mercury porosimeter, and unless indicated otherwise, an average Hg contact angle of 130.000°, an Hg surface tension of 485.000 dynes/cm, an evacuation pressure of 50 μm Hg, and an Hg filling pressure of 3.65 kPa (0.53 psia) unless otherwise indicated.

Calcination of Raw Silica:

Raw silica was calcined in a CARBOLITE Model VST 12/600 tube furnace using a EUROTHERM 3216P1 temperature controller, according to the following procedure. The controller was programmed with the desired temperature profile. A quartz tube was filled with 100 g silica, and a valve was opened and adjusted to flow the nitrogen through the tube so that the silica was completely fluidized. The quartz tube was then placed inside the heating zone of the furnace. The silica was heated slowly to the desired temperature and held at this temperature for at least 8 hrs. to allow complete calcination and removal of water or moisture. After the dehydration was complete, the quartz tube was cooled to ambient temperature. Calcined silica was recovered in a silica catcher, and collected into a glass container inside a dry box. Diffuse reflectance infrared Fourier transform spectroscopy (DRIFTS) was used as a quality control check. The different silicas used in some of the following examples and their calcination conditions are listed in Table 1.

Example 1: Supportation of MAO on Silica

Supported MAO (sMAO) was prepared at reaction initiation temperatures of –20° C. to RT to reduce the risk of fragmentation of high SA, small PD silica upon reaction with MAO; or at temperatures up to 100° C. or more, to facilitate higher MAO loading and/or stronger fixation to minimize MAO leaching from the support. The sMAO preparation conditions are listed in Table 2 below.

sMAO Method I:

For low temperature sMAO preparation to minimize sMAO fragmentation (sMAO2, sMAO7), the following or a similar procedure was used. The silica was slurried in a reactor with 10× toluene-nota bene, all slurry and solvent liquid ratios are given as weight ratios relative to the starting silica material, e.g., raw silica or silica supported MAO and/or catalyst. The reactor was chilled in a freezer to –20°

C. and/or maintained at RT. The reactor was stirred at 500 rpm. Cold (−20° C.) 30 wt % MAO was added slowly to the reactor to maintain the temperature below 40° C., and then the reactor was stirred at 350 rpm at RT for 3 hrs. The mixture was filtered through a medium frit, the wet solid washed with 10× toluene and then 10× hexane, and dried under vacuum for 3 hrs.

sMAO Method II:

For partial fragmentation of sMAO (sMAO3) and preparation of comparative, non-fragmented sMAO (CsMAO1, CsMAO4), the following or a similar procedure was used. The silica was slurried in 4-5× toluene, chilled to −20° C., and 30 wt % MAO in toluene was added in two equal aliquots. The first aliquot was added under agitation, and the resultant slurry chilled in the freezer for about 5 minutes before addition of the second aliquot to maintain temperature below RT. The slurry was then allowed to stir for 2 hrs. at RT, filtered, reslurried in 3× toluene for 15 min and filtered a second time. Then the material was reslurried a second time in 3× toluene, stirred for 30 min at 80° C., filtered, reslurried a third time in 3× toluene, stirred at 80° C. for 30 min, filtered, rinsed with 3× toluene, rinsed with 3× pentane, and dried under vacuum overnight.

sMAO Method III:

For high temperature sMAO preparation (fragmented sMAO1; non-fragmented sMAO4, sMAO5, sMAO6, sMAO8; comparative CsMAO2), the following or a similar procedure was used. The silica was slurried into 6× toluene in a reactor stirred at 500 rpm. The 30 wt % MAO solution was added slowly to the reactor to maintain the temperature below 40° C., then the reactor was stirred at 350 rpm at RT for 30 mins, and then heated at 100° C. for 3 hrs. The mixture was filtered through a medium frit, the wet solid was washed with 10× toluene, then 10× hexane, and dried under vacuum for 3 hrs.

CsMAO Method IV:

For comparative CsMAO5, the following or a similar procedure was used. The silica was slurried into 6× toluene in a stirred reactor and chilled in the freezer. The 30 wt % MAO solution was added in 3 parts with the silica slurry returned to the freezer for a few minutes between additions. The slurry was stirred at RT for 2 hrs., filtered, reslurried in 4× of toluene for 15 min at RT, and then filtered again. The solid was reslurried in 4× toluene at 80° C. for 30 min and then filtered. The solid was reslurried in 4× toluene at 80° C. for 30 min and then filtered a final time. The solid was washed with 2× toluene, then with pentane and dried under vacuum for 24 hrs.

Example 2: Catalyst Supportation

The metallocene catalyst precursor compounds (MCN) and Ziegler-Natta catalysts (ZN) used in the examples and comparative examples below are identified in Table 3. The catalyst preparation/supportation conditions and yield of supported catalyst examples SC1-SC10 according to the present invention, and comparative examples CSC1 and CSC2, are given in Table 4.

Finished Catalyst Method I (SCat1-SCat8, SCat10; comparative CSC1): A reactor was charged at RT with solid sMAO and 5× toluene. The slurry was stirred at 350 rpm. TIBA (neat) was added at 0.34 mmol/g sMAO slowly into the sMAO slurry and the reactor stirred for 15 mins. Then, the MCN was added and the solution mixture was stirred for 1 to 2 hrs. at RT. The slurry was filtered through a medium frit. The wet solid was washed twice with 10× toluene, once with 10× hexane, and dried under vacuum for 3 hrs., yielding free flowing solid supported catalysts (SCat or CSC).

Finished Catalyst Method II (SCat9, SCat11):

MCN was preactivated by mixing with 40 eq. of MAO, and stirring for 1 hr. at RT. Meanwhile, the sMAO was slurried in 20 mL of toluene and chilled in a freezer for 1 min. The preactivated MCN solution was then added to the chilled sMAO slurry, and the resulting mixture was allowed to stir for 1 hr., with cooling in the freezer for 1 minute out of every 10 minutes. The resulting slurry was heated to 40° C. for 2 hrs. and filtered, reslurried in 20 mL toluene at 60° C. over a period of 5 mins, stirred for 30 mins, and filtered again. The toluene wash was repeated twice, the solid material washed with 50 mL pentane, and dried under vacuum overnight to obtain a pink/purple solid.

Example 3: Preparation of Porous iPP ("First Stage Reactor" or "Stage 1A and or 1B")

Porous iPP was prepared according to embodiments of the present invention (PiPP1-PiPP11) and according to comparatives (CiPP1-CiPP5) with the following representative procedure or similar. A 35 mL catalyst tube was loaded with 2 mL of 0.091M TNOAL (AkzoNobel) in hexane and injected into the reactor with nitrogen. The catalyst tube was then pressurized with hydrogen, which was then added to the reactor. Next, 600 mL of propylene was added to the reactor through the catalyst tube. The reactor was heated to 70° C. with a stir rate of 500 rpm. Then, the supported or comparative catalyst was loaded into a second catalyst tube as a dry powder and inserted into the reactor along with 200 mL of propylene. The reactor was maintained at 70° C. for 1 hr. Finally, the reactor was vented and polymer collected. The iPP polymerization data are shown in Table 5, mercury intrusion porosimetry data in Table 6A, and capillary rheology data and polymer characterizations in Table 6B.

Figure 4:
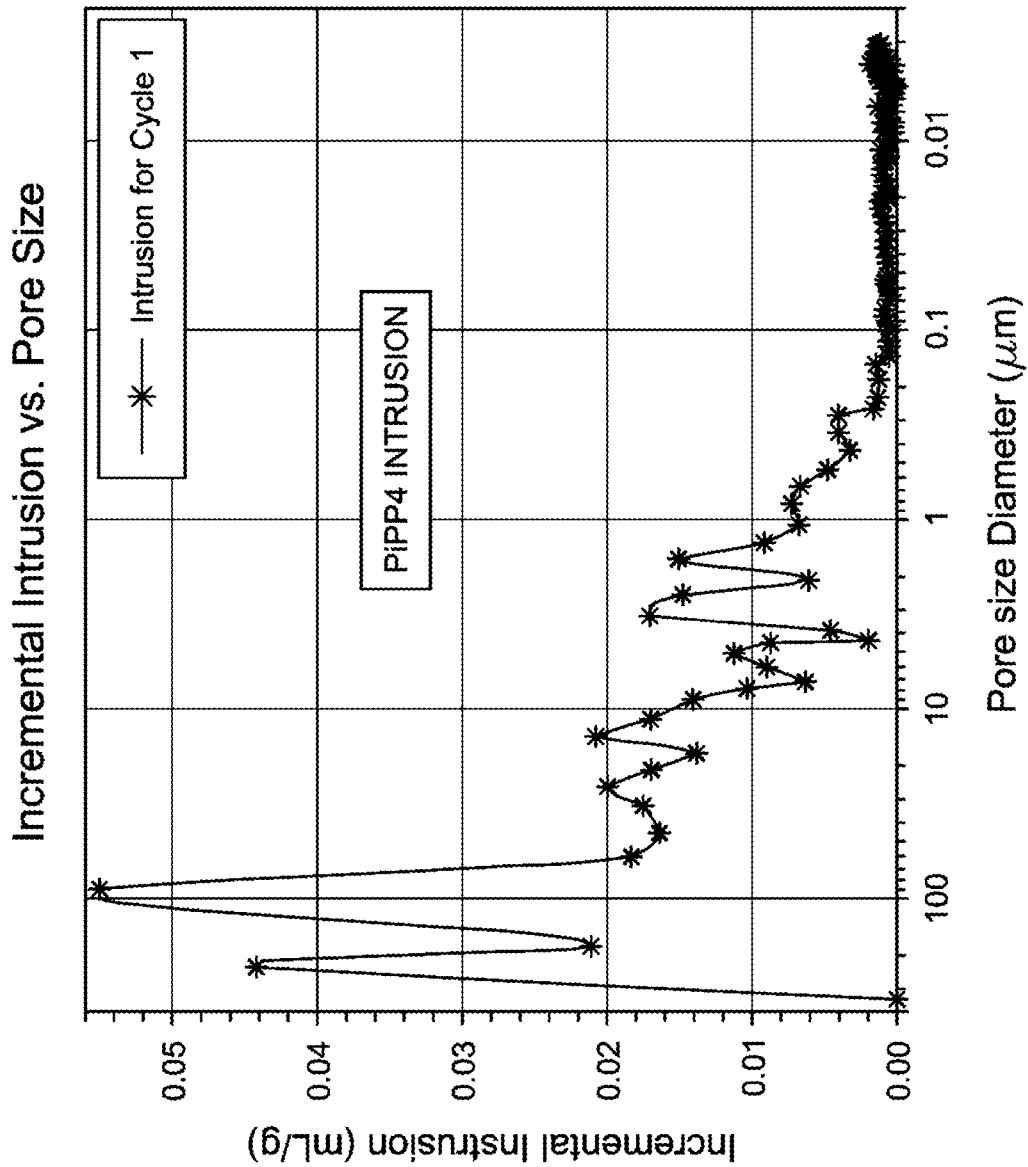
FIG. 4 is a graphical representation showing incremental intrusion (mL/g) versus pore size diameter (μm) of the MCN-catalyzed PiPP4 produced according to Example 3.
Figure 5:
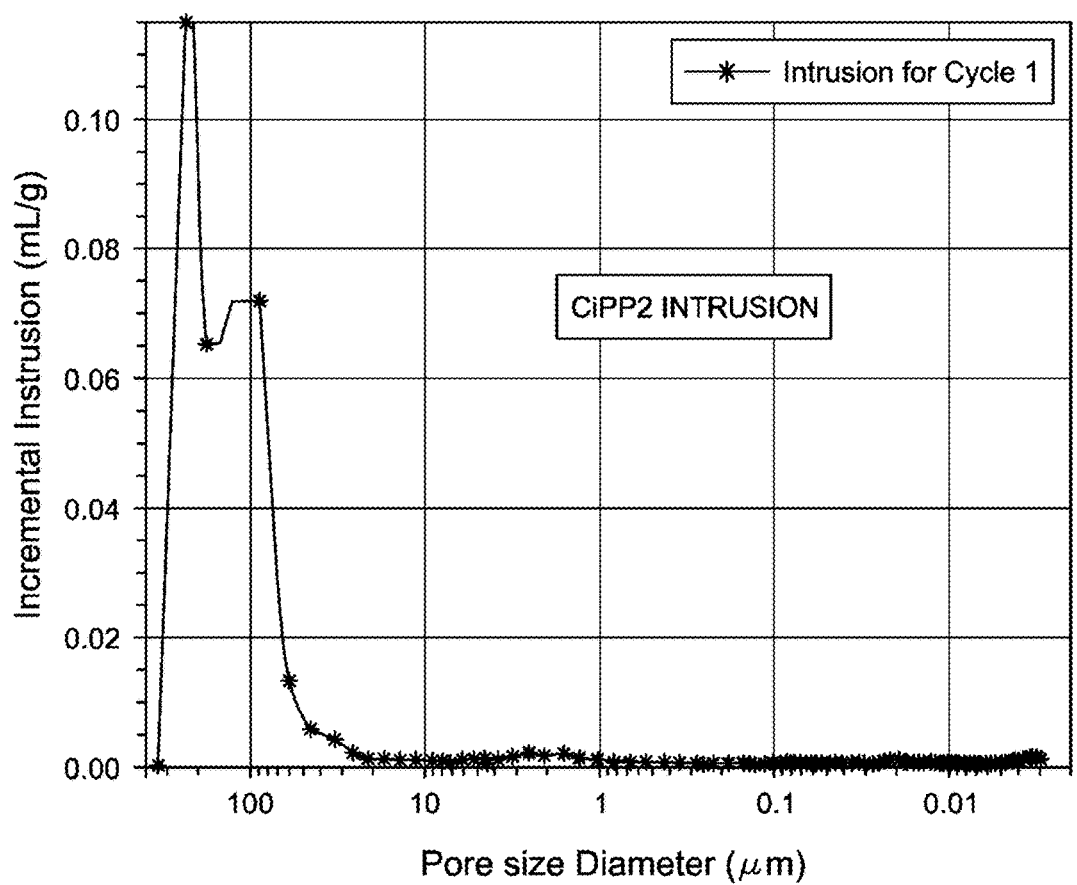
FIG. 5 is a graphical representation showing incremental intrusion (mL/g) versus pore size diameter (μm) of the comparative MCN-catalyzed CiPP2 produced according to Example 3.
Figure 6:
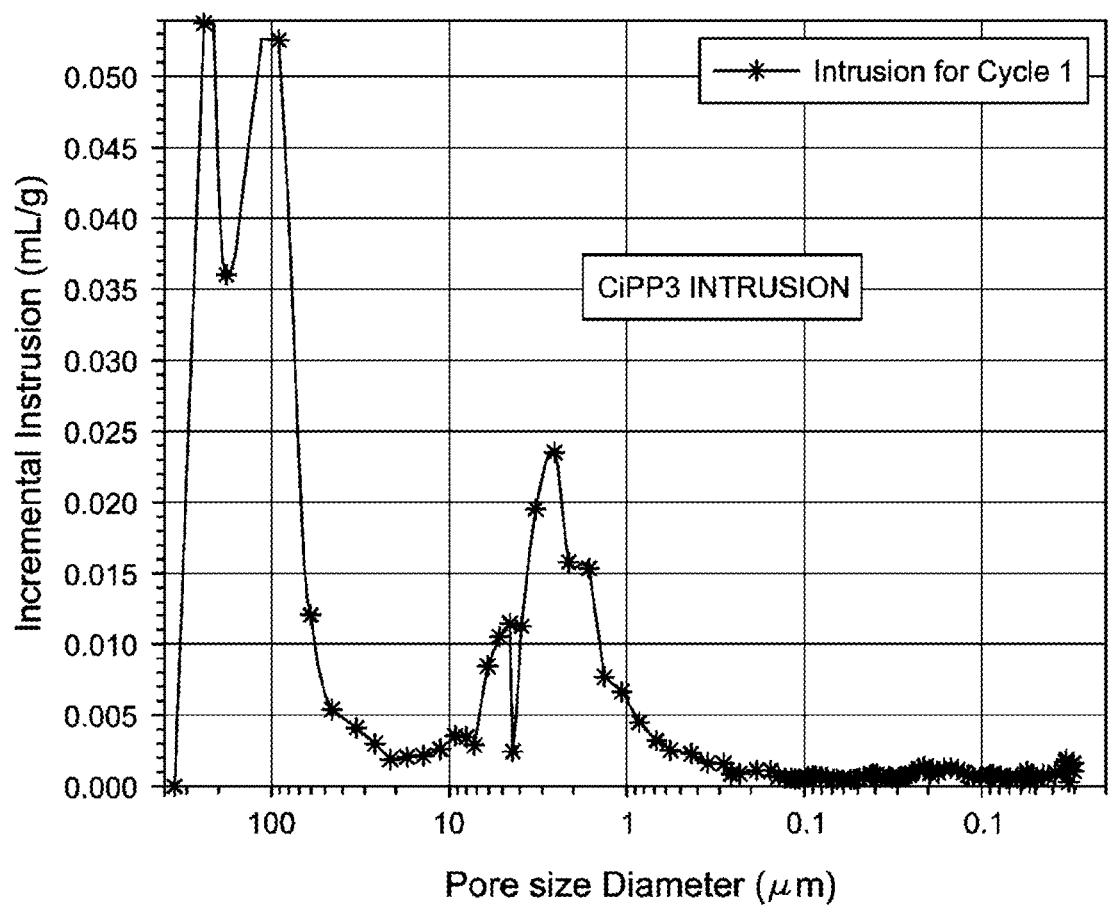
FIG. 6 is a graphical representation showing incremental intrusion (mL/g) versus pore size diameter (μm) of comparative Ziegler-Natta catalyzed CiPP3 produced according to Example 3.

Representative plots of incremental intrusion (mL/g) vs pore size diameter (μm) are shown graphically in FIGS. 4, 5, and 6 for inventive sample PiPP4 and comparative samples CiPP2 and CiPP3. Statistically, the large pores indicated at the left sides of these incremental intrusion plots represent interstitial spaces between particles, and are accounted for in the reporting of the intrusion data. From FIG. 4, it is seen that the inventive PiPP4 has a relatively large number of pores in the 6-100 μm range, and a median pore diameter of 12.2 μm as reported in Table 6A. The inventive samples PiPP1, PiPP2, PiPP3, and PiPP4 have a porosity greater than 30% or greater than 40%, and the median pore diameters are in a suitable range, e.g., 10-100 μm that will facilitate a relatively high rubber loading relative to iPP prepared using an MCN catalyst supported on a conventional silica support.

From FIG. 5, it is seen that the comparative CiPP2 prepared with the metallocene supported on 948 silica has relatively few pores less than 100 μm, and a median pore diameter of 165 μm is reported in Table 4. The median pore diameter is greater than 160 μm, which has been found to be too high to facilitate high rubber loading. On the other hand, in FIG. 6 it is seen that the comparative CiPP3 prepared with ZN has a much different morphology at the other end of the spectrum with a high proportion of pores less than 6 μm range, and a median pore diameter of 5 μm is reported in Table 4.

As seen from the capillary rheology data presented in Table 6B, similar viscosities at the high shear rates probed by capillary rheology confirm similar processability at conditions similar to commercial processing equipment, i.e., shear rates of 1000 sec$^{-1}$ or higher. Thus, capillary rheology confirms the MCN performance benefits of the inventive porous iPP, prepared with the inventive supports, on existing commercial processing equipment.

These examples demonstrate that the inventive iPP can be prepared using a silica-supported MCN catalyst, thus providing a narrower molecular weight distribution, narrower composition distribution in the case of copolymers, lower extractables, processability and other advantages of an iPP prepared with a single site catalyst such as MCN, as compared to a similar iPP prepared using a ZN catalyst system.

Example 4: ICP Polymerization from Unimodal and Bimodal iPP

In this example, a unimodal or bimodal iPP prepolymer was prepared, then followed by addition of a comonomer to prepare an ICP heterophasic copolymer. Polymerization data for runs of the bimodal prepolymer, and ICP based on unimodal and bimodal iPP, are presented in Table 7.

For Bimodal iPP (Runs 1, 2, 5):

the following procedure was used except Run 1 was stopped after making the iPP, and the polymerization times in Runs 2 and 5 were as indicated in Table 7. To make the iPP prepolymer, in a dry box, sCat2 slurry containing the catalyst amount indicated in Table 7 was charged to a catalyst tube, followed by 1 mL hexane ($N_2$ sparged and mol sieve purified). To a 3 mL syringe was charged to a catalyst tube 1.0 ml of a solution of 5 ml TNOAL in 100 ml hexane. The catalyst tube and the 3 ml syringe were removed from the dry box and the catalyst tube attached to a 2 L reactor while the reactor was being purged with nitrogen. The TNOAL was injected into the reactor via the scavenger port capped with a rubber septum, and the scavenger port valve was then closed. Propylene (1000 ml) was introduced to the reactor through a purified propylene line. The agitator was brought to 500 rpm. The mixture was allowed to mix for 5 minutes at RT. The catalyst slurry in the catalyst tube was then flushed into the reactor with 250 ml propylene. The polymerization reaction was allowed to run for 5 minutes at RT.

For the Stage A1 iPP Prepolymer:

the reactor temperature was increased to and maintained at 70° C. for the indicated time period. For stage A2 iPP, at the end of the A1 stage, a 150 mL bomb with 0.207 MPa (30 psig) $H_2$ was opened to the reactor. A 0.220 MPa (31.9 psi) increase in reactor pressure and a 3° C. increase in reactor temperature were observed. The reaction was allowed to run for the indicated time after the $H_2$ charge.

For Stage B ICP:

the agitator was set to 250 rpm 1 minute before the end of time period A2. At the end of the A2 period, using the reactor vent block valve, the reactor pressure was vented to 1.475 MPa (214 psig) while maintaining reactor temperature as close as possible to 70° C. The agitator was increased back up to 500 rpm. The reactor temperature was stabilized at 70° C. with the reactor pressure reading 1.481 MPa (214.8 psig). Ethylene gas at 0.938 MPa (136 psi) was introduced into the reactor, targeting a total pressure of 2.41 MPa (350 psig). The reactor was held at this pressure for 20 minutes. Using the reactor vent block valve, the reactor was quickly vented to stop the polymerization. The reactor bottom was dropped and a polymer sample collected. After overnight drying, the sample was a free flowing ICP resin.

ICP from Unimodal iPP (Runs 3-4, 6-8):

iPP prepolymer was prepared generally as described above. After heating the reactor to 70° C., a 150 mL bomb filled with $H_2$ pressure as indicated in Table 7 was opened to the reactor. The reaction was allowed to run for A1 time indicated after the $H_2$ charge. At 1 minute before the A1 time, the agitator was set to 250 rpm. At the end of the A1 time, using the reactor vent block valve, the reactor pressure was vented to 1.475 MPa (214 psi) while maintaining reactor temperature as close as possible to 70° C. The agitator was increased back up to 500 rpm. The reactor temperature was stabilized at 70° C. with the reactor pressure reading 1.481 MPa (214.8 psi). Ethylene gas at 0.938 MPa (136 psig) was introduced to the reactor, targeting a total pressure of 2.413 MPa (350 psi). The reactor was held at this pressure for the B (ICP) stage time indicated. Using the vent block valve, the reactor was quickly vented to stop the polymerization. Dropped reactor bottom and collected sample. Using the reactor vent block valve, the reactor was quickly vented to stop the polymerization. The reactor bottom was dropped and a polymer sample collected. After overnight drying, the sample was a free flowing ICP resin.

Example 6: iPP from Controlled Fragmentation of Catalyst Support

In this example, MCN compounds were supported on sMAO prepared at varying temperature conditions and metal alkyl treatments to investigate catalyst activity and the PSD, stiffness, and other properties of the iPP and ICP made with the catalyst systems. The catalyst systems CSC3, SCat2, SCat11, and SCat1A were used to prepare comparative and inventive porous iPP polymers CiPP6, PiPP12, PiPP13, and PiPP13, respectively, using the polymerization procedures of Example 3 at the polymerization conditions listed in Table 8 below.

As shown in FIG. 7, the median size of the CiPP6 particles produced using the conventionally supported MCN system has a bell-shaped unimodal PSD centered near 700 μm.

As shown in FIG. 8, PiPP12, produced using a generally non-fragmented support that survived generally intact from MAO supportation conducted at ambient or below for 3 hrs., produced relatively large iPP particles with very few if any particles less than 500 m, and most or all greater than about 600 μm up to 1500 μm or more.

As shown in FIG. 9, PiPP13, produced using a partially fragmented support from an MAO supportation reaction conducted at 80° C. for 1 hr., produced a bimodal PSD comprising a small particle mode centered near 200 μm and the larger particles having a size increasing from near 600 μm up to 1000 μm or more.

As shown in FIG. 10, PiPP14, produced using a fragmented support from an MAO supportation reaction conducted at 100° C. for 3 hrs., produced a PSD comprised mainly (>80 wt %) of small particles centered near 200 μm, with only small amounts (<10 wt %) of larger particles in the 500 m to 1000 m range.

Example 7: iPP from Catalyst Supportation with and without TIBA Treatment

In this example, MAO was supported on D 150-60A silica using both high temperatures (100° C. for 3 hrs., for high loading (11.5 mmol Al/g silica) to gain iPP polymerization activity) and low temperatures (<30° C. for 3 hrs., for low loading (7 mmol Al/g silica) to build high porosity iPP resins), with and without TIBA treatment to investigate any activity enhancement. The MAO and MCN supportation procedures follow below, and the catalyst systems were used to prepare iPP and ICP using procedures similar to Examples 3-4.

High Temperature Supportation with TIBA Treatment (iPP15):

A reactor was charged with 10 g of silica S1 and 5× toluene. While stirring at 350 rpm, 22.8 g of 30% MAO (11.5 mmol Al/g silica) were slowly added to the silica slurry over 15 min, which was then allowed to stir at RT for 30 min and then heated in an oil bath to 100° C. over about 35 min. The temperature of the slurry was maintained at 100° C. for 3 hrs. while stirring. The oil bath was then removed and the reactor allowed to cool to 50° C. under ambient conditions. The slurry was then filtered through a fine frit and the filtrate sampled for NMR analysis, which indicated neither MAO nor TMA was present. The wet solid was washed with 4× hexane and dried under vacuum for 90 mins, yielding 18.0 g sMAO, which was analyzed and found to still contain about 7% solvent. Testing of the 11.5 mmol Al/g silica sMAO ("sMAO-11.5") indicated uptake of an additional 5.07 mmol Al/g silica. Then, 3.1 g of the sMAO-11.5 were slurried into 8 g toluene in a 20 mL vial. About 0.17 g neat TIBA (0.85 mmol) were added slowly to the slurry with vigorous shaking. The slurry was then placed on a shaker for 10 min during which gas evolution was observed, indicating that the sMAO had undergone fragmentation while being heated at 100° C. for 3 hrs., uncovering reserved surface area and allowing more reactive hydroxyls to be exposed for reaction. Then, 30 mg MCN3 (0.051 mmol Zr) was added to the slurry and the mixture was shaken on a shaker for 2 hrs. at RT. The dark brown slurry was filtered, washed with 10 g toluene and 2×6 g hexane, and then dried under vacuum for 2 hrs., yielding 3.08 g sCat+TIBA. This sCat was used to prepare iPP15 as indicated in Table 9.

High Temperature Supportation without TIBA Treatment (iPP16):

To a reactor were charged 11.0 g of sMAO-11.5 and 53 g toluene, and stirred at 350 rpm. A 20 mL vial was charged simultaneously with 0.130 g of MCN3 (0.22 mmol Zr) and 6.11 g MAO for an additional 5 mmol Al/g silica charge, based on the above sMAO uptake analysis. The mixture in the vial was shaken well before it was added to the slurry in the reactor. The mixture was then allowed to stir at RT for 2 hrs., then filtered through a fine frit, washed twice with 5× toluene and twice with 4× hexane, and dried under vacuum for 60 hrs. at RT, yielding 11.3 g sCat. This sCat was used to prepare iPP16 as indicated in Table 9.

Low Temperature Supportation with TIBA Treatment (ICP1):

In a glove box, 5.0 g silica S2 and 10× toluene were added to the reactor and placed in a freezer at −20° C. for 30 min. Then, 7.0 g of prechilled 30% MAO (7.0 mmol Al/g silica) were slowly added to the silica slurry stirred at 600 rpm over 20 min. The stirring rate was reduced to 300 rpm and the reactor held for 3 hrs. at RT. The stirrer was stopped and the slurry allowed to settle for 5 min prior to being filtered through a coarse frit. The wet cake was washed twice with 10× toluene. The wet cake was charged into a reactor with 7× toluene and stirred at 300 rpm. Then, 0.501 g TIBA were added to the slurry, and after stirring for 15 min, 0.139 g of MCN3 was added to the reactor. After stirring 1 hr at RT, the slurry was filtered through a coarse frit and washed twice with 8× toluene and twice with 8× hexane. The wet cake was dried under vacuum for 1 hr, yielding 7.04 g. This sCat was used to prepare ICP1 as indicated in Table 9.

Low Temperature Supportation without TIBA Treatment (ICP1):

a similar procedure was used but without TIBA addition, and the yield was 7.07 g. This sCat was used to prepare ICP2 as indicated in Table 9.

As indicated in Table 9, TIBA treatment increased the catalyst activity, considered to be attributable to the removal of possible hydroxyl groups which may have been uncovered during MAO supportation and/or support fragmentation. The polymer characterization and stiffness data are presented in Table 10. These data further confirm that the catalysts according to embodiments disclosed herein provide a significant improvement in the iPP and/or ICP stiffness characterized by 1% secant flex modulus stiffness, e.g., greater than about 1950 MPa, greater than about 2000 MPa, greater than about 2100 MPa, greater than about 2200 MPa.

Figure 11:
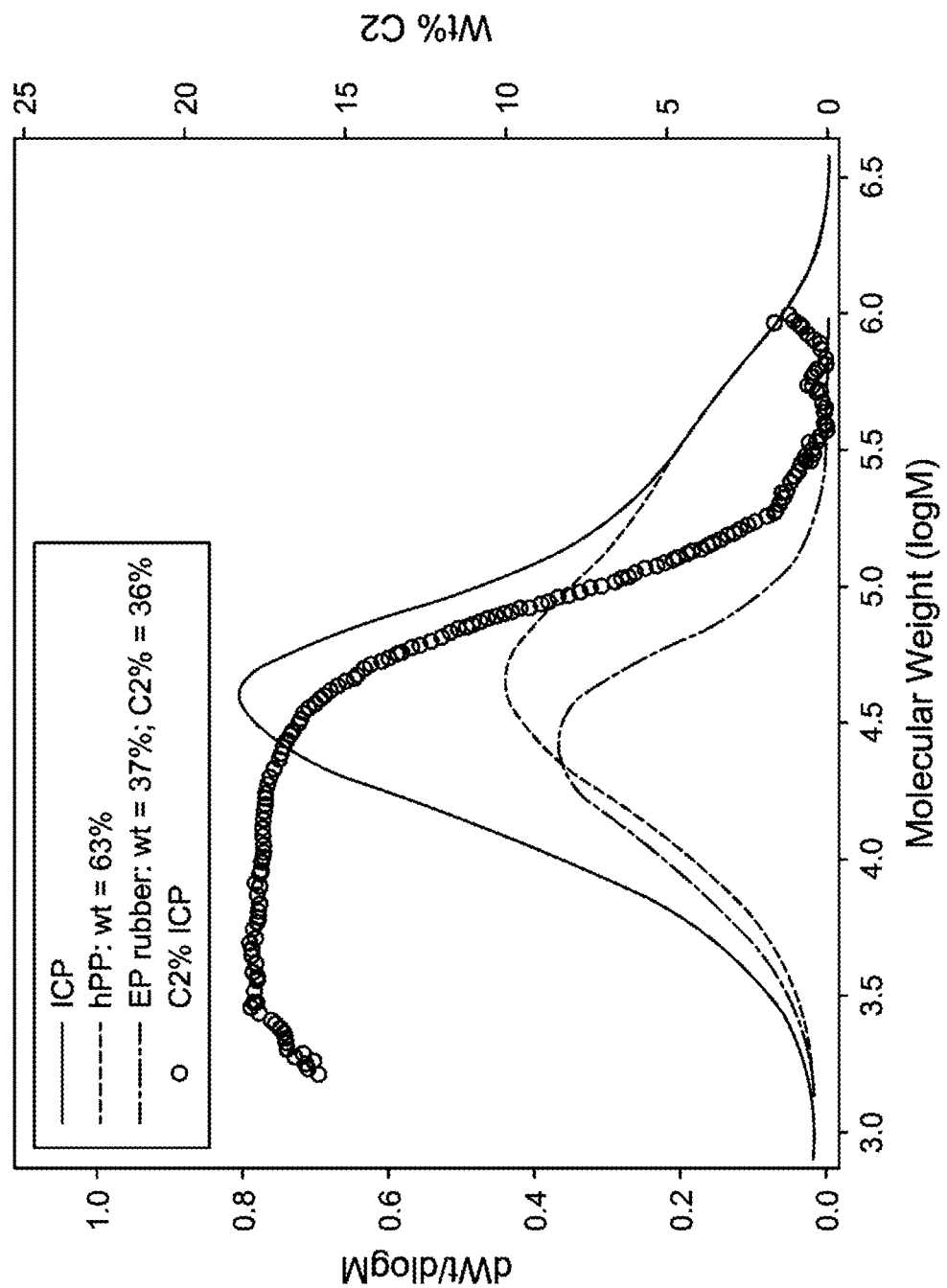
FIG. 11 is a plot of the 4D gel permeation chromatograph (GPC-4D) for a heterophasic copolymer ICP1 having about 40% ethylene-propylene rubber loading in a porous iPP matrix according to Example 7.

FIG. 11 is a GPC-4D chromatogram for ICP1 indicating the ethylene uptake is about 18-20 wt % and the EP rubber uptake is 37 wt %. Calculated from the yield data, the total EP rubber uptake is 44 wt %. Accordingly, 37-44 wt % EP rubber uptake may be achieved according to embodiments of the present invention, representing a vast improvement over impact copolymers produced using ZN catalyst systems known in the art, which typically require post reactor addition of plastomer to produce the ICP.

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of", "consisting of", "selected from the group of consisting of", or "is" preceding the recitation of the composition, element, or elements and vice versa.

TABLE 1

Silica Properties and Calcination Temperature

| Support | SiO$_2$ | Tc (° C.) | PS (um) | SA (m$^2$/g) | PV (mL/g) | PD (nm (Å)) |
|---|---|---|---|---|---|---|
| S1 | D 150-60A | 200 | 150 | 733 | 1.17 | 6.4 (64) |
| S2 | D 150-60A | 600 | 150 | 733 | 1.17 | 6.4 (64) |
| S3 | D 100-100A | 200 | 100 | 543 | 1.51 | 11.1 (111) |
| S4 | D 100-100A | 600 | 100 | 543 | 1.51 | 11.1 (111) |
| S5 | PD 13054 | 200 | 130 | 671 | 1.11 | 6.6 (66) |
| S6 | PD 13054 | 600 | 130 | 671 | 1.11 | 6.6 (66) |
| S7 | PD 14024 | 200 | 85 | 611 | 1.40 | 9.2 (92) |
| CS1 | 948 | 130 | 58 | 278 | 1.68 | 24.2 (242) |
| CS2 | 948 | 600 | 58 | 278 | 1.68 | 24.2 (242) |
| CS3 | MS 3050 | 600 | 90 | 500 | 3.0 | 24 (240) |

Tc - Calcination temperature;
PS - average particle size (from manufacturer);
SA - BET surface area (from manufacturer);
PV - pore volume (from manufacturer);
PD - pore diameter (from manufacturer)

TABLE 2

Supported MAO Preparation Conditions

| sMAO# | Silica# | Silica Mass (g) | MAO[a] (mmol Al/g) | T1[b] (° C.) | T2[c] (° C.) | T2 Time[d] (hr) | Yield (g) |
|---|---|---|---|---|---|---|---|
| sMAO1 | S1 | 10.15 | 11.5 | RT | 100 | 3 | 17.02 |
| sMAO2 | S2 | 10.67 | 7.0 | <RT | RT | 3 | 14.23 |
| sMAO3 | S2 | 16.2 | 12.3 | <RT | 80 | 1 | 27.1 |
| sMAO4 | S3 | 5.01 | 12.5 | RT | 100 | 3 | 8.72 |
| sMAO5 | S4 | 5.06 | 10.0 | RT | 100 | 3 | 8.46 |
| sMAO6 | S5 | 5.02 | 11.5 | RT | 100 | 3 | 8.73 |
| sMAO7 | S6 | 5.01 | 7.0 | RT | RT | 3 | 7.20 |
| sMAO8 | S7 | 1.00 | 13.0 | RT | 100 | 3 | 1.68 |
| CsMAO1 | CS1 | 6.31 | 12.3 | <RT | 80 | 1 | 10.4* |
| CsMAO2 | CS2 | 5.00 | 9.5 | RT | 100 | 3 | 7.07 |
| CsMAO3 | CS2 | 5.00 | 8.63 | <RT | 80 | 1 | 6.6* |
| CsMAO4 | CS3 | 5.00 | 12 | <RT | 80 | 1 | 8.5* |
| CsMAO5 | CS1 | 20.86 | 12.2 | <RT | RT | 2 | 28.94 |

[a]MAO proportions given in total mmol Al/g silica;
[b]MAO addition temperature T1;
[c]MAO reaction temperature T2 after MAO addition;
[d]Time for MAO under reaction temperature T2.
*estimated based on MAO charge by assuming MAO molecular weight on support = 59 g/mol.

TABLE 3

Catalysts

| Catalyst | Catalyst precursor compound |
|---|---|
| MCN1 | [(6-methyl-8-phenyl-1,2,3-hydroindacenyl)(7-(4-tert-butylphenyl)-2-isopropyl indenyl) dimethylsilyl]zirconium dichloride |
| MCN2 | rac-dimethylsilyl bis(2-cyclopropyl-4-(3',5'-di-tert-butylphenyl)-indenyl) zirconium dichloride |
| MCN3 | rac-dimethylsilyl bis(2-methyl-4-phenyl-indenyl) zirconium dimethyl |
| MCN4 | rac-dimethylsilyl bis(2-methyl-4-(3',5'-di-tert-butyl-4'-methoxy-phenyl)-indenyl) zirconium dichloride |
| MCN5 | rac-dimethylsilyl[(4-(4'-tert-butylphenyl)-2-isopropylindenyl)(4-(4'-tert-butylphenyl)-2-methylindenyl)]zirconium dimethyl |
| MCN6 | rac-dimethylsilyl(4-o-biphenyl-2-(1-methylcyclohexyl)methyl-indenyl)(4-(3',5'-di-tert-butylphenyl)-2-methyl-indenyl)zirconium dichloride |
| MCN7 | rac-dimethylsilyl bis(2-cyclopropyl-4-(3',5'-di-tert-butylphenyl)-indenyl) hafnium dichloride |
| MCN8 | rac-pentamethylenesilylene-bis(2,4,7-trimethylindenyl)hafnium(IV) dimethyl |
| ZN1 | Commercial Ziegler-Natta polypropylene catalyst from Toho Titanium |

TABLE 4

Supported Catalyst Preparation Conditions

| SCat# | sMAO# | Cat. | sMAO Wt (g) | MCN Wt (g) | Pre-Activation[a] | Calc. Zr[b] (Wt %) | TIBA (g) | Reaction Temp[c] | Reaction Time (h) | Yield (g) |
|---|---|---|---|---|---|---|---|---|---|---|
| SCat1 | sMAO1 | MCN4 | 1.0 | 0.0205 | No | 0.12 | 0.072 | 18-25° C. | 1 | 0.98 |
| SCat1A | sMAO1 | MCN2 | 1.0 | 0.046 | No | 0.30 | 0.072 | 18-25° C. | 1 | 1.0 |
| SCat2 | sMAO2 | MCN2 | 15.0 | 0.278 | No | 0.12 | 1.02 | 18-25° C. | 1 | 14.2 |
| SCat2A | sMAO2 | MCN1 | 1.00 | 0.017 | No | 0.20 | 0.078 | 18-25° C. | 1 | 0.88 |
| SCat2B | sMAO2 | MCN4 | 8.46 | 0.064 | No | 0.08 | 0.584 | 18-25° C. | 1 | 8.30 |
| SCat3 | sMAO4 | MCN2 | 1.01 | 0.021 | No | 0.12 | 0.079 | 18-25° C. | 1 | 1.00 |
| SCat4 | sMAO5 | MCN4 | 8.05 | 0.064 | No | 0.08 | 0.584 | 18-25° C. | 1 | 8.46 |
| SCat5 | sMAO6 | MCN2 | 3.1 | 0.061 | No | 0.12 | 0.18 | 18-25° C. | 2 | 3.55 |
| SCat6 | sMAO7 | MCN2 | 1.00 | 0.017 | No | 0.12 | 0.079 | 18-25° C. | 1 | 0.86 |
| SCat7 | sMAO8 | MCN2 | 1.68 | 0.033 | No | 0.12 | 0.121 | 18-25° C. | 1 | 1.77 |
| SCat8 | sMAO8 | MCN4 | 1.00 | 0.0082 | No | 0.08 | 0.073 | 18-25° C. | 2 | 0.96 |
| SCat9 | sMAO3 | MCN1 | 0.6253 | 0.0178 | Yes | 0.34 | 0 | 18-25° C. | 1 | 0.4967 |
| SCat10 | sMAO2 | MCN2 | 464.1 | 12.8 | No | 0.18 | 45.56 | 18-25° C. | 3 | 616.5 |
| SCat11 | sMAO3 | MCN2 | 1.0 | 0.03 | Yes | 0.30 | 0 | 18-25° C. | 1 | 1.00[d] |
| CSC1 | CsMAO1 | MCN4 | 1.01 | 0.0297 | No | 0.30 | 0.078 | 18-25° C. | 1 | 1.00[d] |
| CSC2 | CsMAO2 | MCN5 | 10.5 | 0.1824 | Yes | 0.21 | 0 | <RT | 1 | 8.04 |
| CSC3 | CsMAO3 | MCN4 | 1.05 | 0.043 | Yes | 0.21 | 0 | 18-25° C. | 1 | 1.00[d] |
| CSC4 | CsMAO2 | MCN3 | 1.0012 | 0.0305 | Yes | 0.32 | 0 | <RT | 1 | 0.942 |
| CSC5 | CsMAO5 | MCN2 | 0.8565 | 0.031 | Yes | ND | 0 | <RT | 1 | 0.8066 |
| CSC6 | CsMAO5 | MCN4 | ND | ND | Yes | ND | 0 | <RT | 1 | |

[a]Pre-activation: MCN is mixed with 40 eq. MAO (40:1 Al:Zr) at RT for 1 hr before adding to sMAO slurry;
[b]Calculated based on charge materials;
[c]<RT = chilled in the freezer inside the dry box, −20 to −35° C., and warming up at RT after taking out from the dry box for reagent addition.
[d]estimated based on charges;
ND - data not determined or otherwise not available.

TABLE 5

Porous Isotactic Polypropylene Polymerization

| PiPP# | Cat.[a] | Mod[b] | 1st Stage H₂ P (kPa (psi)) | 1st Stage Time (min) | 2nd Stage H₂ P (kPa (psi)) | 2nd Stage Time (min) | iPP Yield (g) | Activity (gP/g cat-h) | iPP MFR[d] | iPP Porosity[e] (%) | iPP PV[f] (mL/g) | 1% SFM (MPa) | iPP Mw (kg/mol) | iPP PDI |
|---|---|---|---|---|---|---|---|---|---|---|---|---|---|---|
| PiPP1 | SCat9 | U | 27.6 (4) | 50 | NA | NA | 49.4 | 1097 | ND | 36.37 | 0.613 | 1676 | 135 | 2.46 |
| PiPP2 | SCat9 | U | 414 (60) | 32 | NA | NA | 40.5 | 2132 | ND | 41.2 | 0.758 | 1427 | ND | ND |
| PiPP3 | SCat2A | U | 0 | 50 | NA | NA | 107.1 | 1285 | 0.96 | 33.37 | 0.515 | 1517 | 478 | 2.70 |
| PiPP4 | SCat2 | U | 0 | 40 | NA | NA | 57.9 | 869 | 4 | 32.25 | 0.510 | 1169 | ND | ND |
| PiPP5 | SCat2 | B | 0 | 50 | 30 | 10 | 232.7 | 1164 | 219.3 | 32.08 | 0.511 | 1503 | ND | ND |
| PiPP6 | SCat11 | B | 0 | 10 | 30 | 45 | 69.8 | 1730 | 82.6 | 32.96 | 0.571 | 1919 | 226 | 10.57 |
| PiPP7 | SCat11 | B | 0 | 10 | 35 | 45 | 93.4 | 2317 | 145.3 | 35.18 | 0.583 | 1646 | 201 | 9.05 |
| PiPP8 | SCat2 | B | 0 | 50 | 30 | 45 | 127.5 | 1275 | 118 | ND | ND | 1618 | 198.9 | 14.9 |
| PiPP9 | SCat2B | U | 15 | 40 | NA | NA | 85.2 | 2557 | 39.0 | ND | ND | 1139 | 203.5 | 4.33 |
| PiPP10 | SCat2 | U[g] | 207 (30)[g] | 60[g] | NA | NA | 127 | 1290 | 118 | ND | ND | 1618 | 198.9 | 14.9 |
| PiPP11 | SCat4 | U | 103 (15) | 40 | NA | NA | 85.2 | 2540 | 39 | ND | ND | 1139 | 203.5 | 4.33 |
| CiPP1 | CSC2 | U | 0 | 40 | NA | NA | 41.8 | 4150 | 2.5 | 28.42 | 0.414 | ND | ND | ND |
| CiPP2 | SCat11 | U | 48.3 (7) | 50 | NA | NA | 169 | 2820 | 42.1 | 26.05 | 0.378 | ND | ND | ND |
| CiPP3 | ZN1 | U | 172 (25) | 50 | NA | NA | 136 | 2360 | ND | 27.99 | 0.413 | 1453 | ND | 6.49 |
| CiPP4 | CSC5 | U[g] | 345 (50)[g] | 55[g] | NA | NA | 74.1 | 1220 | 102 | ND | ND | 2143 | 234.9 | 15.3 |
| CiPP5 | CSC6 | U | 138 (20) | 60 | NA | NA | 54.2 | 3040 | 52 | ND | ND | 1148 | 181.5 | 2.63 |

[a]catalyst, see Table 4;
[b]iPP modality, B = bimodal, U = unimodal;
c - activity given as grams polymer per gram of catalyst per hr.;
[d]melt flow rate, ASTM D1238, condition L, at 230° C. and 2.16 kg load;
[e]porosity per Hg porosimetry;
[f]pore volume per Hg porosimetry; 1% SFM - 1% secant flex modulus;
[g]H2 was added after 10 min prepolymerization (5 min at RT +/−5° C., 5 min heating included in times given), high Mw mode presumed negligible;
A - not applicable;
ND - not determined or otherwise not available.

TABLE 6A

Porosimetry Data for Inventive and Comparative Porous iPP Homopolymers

| | PiPP3 | PiPP4* | PiPP5 | PiPP6 | PiPP7 | CiPP2 | CiPP3 |
|---|---|---|---|---|---|---|---|
| Catalyst/Support | SCat2A/S2 | CAT2/S1 | SCat2/S2 | SCat2/S2 | SCat12/S2 | CAT2/CS1 | ZN1 |
| Total intrusion (mL/g) | 0.515 | 0.511 | 0.511 | 0.571 | 0.583 | 0.378 | 0.431 |
| Total pore area (m²/g) | 44.4 | 40.4 | 43.6 | 42.9 | 42.4 | 38.5 | 37.5 |
| Median PD (μm) | 84.2 | 12.2 | 84.6 | 22.7 | 25.1 | 165 | 5.00 |
| Bulk density @ 3.65 kPa (g/mL) | 0.648 | 0.632 | 0.628 | 0.577 | 0.604 | 0.688 | 0.677 |
| Apparent (skeletal) density (g/mL) | 0.972 | 0.932 | 0.924 | 0.861 | 0.931 | 0.931 | 0.941 |
| Porosity (%) | 33.4 | 32.3 | 32.1 | 33.0 | 35.2 | 26.0 | 28.0 |
| Stem Volume Used (%) | 63 | 60 | 29 | 32 | 32 | 66 | 40 |

TABLE 6B

Capillary Rheometry Data for Inventive and Comparative Porous iPP Homopolymers

| iPP# | Catalyst/Support | MFR* | SV** (Pa-s) @ 1 sec⁻¹ | SV** (Pa-s) @ 1000 sec⁻¹ | SV** (Pa-s) @ 2000 sec⁻¹ | 1% SFM (MPa) | Mw (kg/mol) | Mn (kg/mol) | PDI |
|---|---|---|---|---|---|---|---|---|---|
| CiPP4 | CSC5 | 102 | 2650 | 23.2 | 16 | 2143 | 234.9 | 15.37 | 15.3 |
| PiPP10 | SCat2 | 118 | 2090 | 107 | 20 | 1618 | 198.9 | 13.36 | 14.9 |
| CiPP5 | CSC6 | 52 | 2476 | 71.7 | 45 | 1148 | 181.5 | 68.81 | 2.63 |
| PiPP11 | SCat4 | 39 | 3470 | 75.6 | 46 | 1139 | 203.5 | 46.97 | 4.33 |

*MFR - Melt Flow Rate, ASTM D1238, condition L, at 230° C. and 2.16 kg load;
**SV - Shear Viscosity (apparent viscosity)

TABLE 7 iPP/ICP Polymerization Data

| Run # | Cat | iPP/ICP | iPP Modality | iPP$^{1/2}$ H$_2$ (PSI) | iPP$^{1/2}$ Time (min) | Stage 2 Time (min) | Cat (g) | Yield (g) | Activity (g P/g cat/hr) | ICP Cv$^d$ (wt %) |
|---|---|---|---|---|---|---|---|---|---|---|
| 1 | SCat2 | iPP | Bi | 0/30 | 50/10 | N/A | 0.10 | 144 | 1440 | NA |
| 2 | SCat2 | ICP | Bi | 0/30 | 50/10 | 20 | 0.10 | 254 | 1904 | 35 |
| 3 | SCat2 | ICP | Uni | 0/NA | 60/NA | 10 | 0.10 | 186 | 1596 | 39 |
| 4 | SCat1 | ICP | Uni | 5/NA | 10/NA | 40 | 0.017 | 60.8 | 4294 | 76 |
| 5 | SCat3 | ICP | Bi | 0/30 | 10/15 | 20 | 0.020 | 66.8 | 4450 | 34 |
| 6 | SCat4 | ICP | Uni | 0/NA | 30/NA | 10 | 0.20 | 118.5 | 889$^a$ | 43$^b$ |
| 7 | SCat7 | ICP | Uni | 0/NA | 40/NA | 20 | 0.050 | 57.0 | 1140 | 38 |
| 8 | CSC1 | ICP | Uni | 0/NA | 40/NA | 20 | 0.10 | 271 | 2710 | 34$^c$ | iPP$^{1/2}$ H$_2$ is the iPP Stages I and II H$_2$ pressure in the 150 mL bomb charged into the reactor;
iPP$^{1/2}$ T is the iPP Stages A1/A2 polymerization times;
ICP Time is the Stage B time;
$^a$too much catalyst charge caused melted polymer that likely decreased the activity;
$^b$some melted ICP resins formed, the Cv is for the non-melted majority ICP resins;
$^c$comparative example; serious reactor fouling was found;
$^d$from RT recrystallization of iPP from ICP xylene solution obtained from 130° C. 60 min heating, the actual Cv is typically 10-20 wt % higher.

TABLE 8 iPP Polymerization Based on Varying MCN Supportation Temperatures to Control iPP Particle Size Distribution

| iPP# | Cat. | Supp. T (° C.)/time (h) | MAO (mmol/g SiO$_2$) | Cat. Wt (g) | Rxn T (° C.) | Stage 1 H$_2$ (kPa) | Stage 1 Time (min) | Stage 2 H$_2$ (kPa) | Stage 2 Time (min) | iPP PSD |
|---|---|---|---|---|---|---|---|---|---|---|
| CiPP6 | CSC3 | 80/1 | 8.63 | 0.020 | 70 | 0 | 60 | 0 | 0 | Uni, 700 μm |
| PiPP12 | SCat2 | <30/3 | 7.00 | 0.10 | 70 | 0 | 50 | 30 | 10 | 80% 600+ μm |
| PiPP13 | SCat11 | 80/1 | 12 | 0.040 | 70 | 0 | 50 | 30 | 10 | 200 μm/1000 μm |
| PiPP14 | SCat1A | 100/3 | 11.5 | 0.046 | 70 | 0 | 50 | 30 | 10 | 80% 200 μm |

TABLE 9 iPP Polymerization Data TIBA Treatment Comparisons

| | | | | | | iPP - Stage A | | | | EPR | |
| | | CATALYST | | | | Stage A1 | | Stage A2 | | Stage B | |
| iPP#/ICP# | sCat | MAO (mmol/g SiO$_2$) | TIBA Y/N | sCat (mg) | Cat Activity (g P/g cat-h) | T (° C.) | H$_2$ (kPa) | t (min) | H$_2$ (kPa) | t (min) | H$_2$ (kPa) | t (min) |
|---|---|---|---|---|---|---|---|---|---|---|---|---|
| PiPP15 | S1/MCN3 | 11.5 | Yes | 12.6 | 2962 | 70 | 0 | 50 | 103.4 | 5 | NA | NA |
| PiPP16 | S1/MCN3 | 11.5 | No | 12.9 | 1288 | 70 | 0 | 50 | 103.4 | 5 | NA | NA |
| ICP1 | S2/MCN2 | 7.0 | Yes | 100 | 2527 | 70 | 0 | 50 | 206.8 | 20 | 0 | 20 |
| ICP2 | S2/MCN2 | 7.0 | No | 110 | 672 | 70 | 0 | 50 | 206.8 | 20 | 0 | 20 |

TABLE 10

Stiffness of iPP/ICP Resins

| iPP#/ICP# | Tm (° C.) | MFR | 1% SFM (MPa) | Mw (g/mol) | Mn (g/mol) | PDI |
|---|---|---|---|---|---|---|
| PiPP15 | 150.7 | 0.23 | 2092 | 641227 | 108035 | 5.94 |
| PiPP16 | 150.2 | 0.09 | 2163 | 784949 | 73476 | 10.68 |
| ICP1 | 151.2 | 0.38 | 1978 | 663795 | 159275 | 2.47 |
| ICP2 | 150.7 | 0.11 | 2213 | 693051 | 193182 | 3.59 |

What is claimed is:

1. A propylene polymer comprising at least 50 mol % propylene and having:
   1) a 1% Secant flexural modulus of at least 1000 MPa, determined according to ASTM D 790 (A, 1.0 mm/min);
   2) greater than 5 and less than 200 regio defects, defined to be the sum of 2,1-erythro and 2,1-threo insertions and 3,1-isomerizations, per 10,000 propylene units, determined by $^{13}$C NMR;
   3) when comonomer is present, a composition distribution breadth index (CDBI) of 50% or more;
   4) a matrix having a porosity of 15% or more and a median pore diameter of between greater than 6 and less than 160 μm, as determined by mercury intrusion porosimetry.

2. The propylene polymer of claim 1, wherein the porosity is 30% or more.

3. The propylene polymer of claim 1, comprising a multimodal molecular weight distribution.

4. The propylene polymer of claim 1, wherein the polymer is in a particulated form wherein at least 95% by volume has a particle size greater than about 120 μm.

5. The propylene polymer of claim 1, comprising a multimodal particle size distribution.

6. The propylene polymer of claim 1, further comprising an active catalyst system dispersed in the matrix, the catalyst system comprising a single site catalyst precursor compound, an activator for the precursor compound, and a support having a specific surface area of 400 m$^2$/g or more, a pore volume of from 0.5 to 2 mL/g, and a mean pore diameter of from 1 to 20 nm (10 to 200 Å).

7. A polypropylene impact copolymer comprising the propylene polymer of claim 1, where a fill phase at least partially filling the pores in the matrix of the propylene polymer.

8. The propylene polymer of claim 1, further comprising:
a total propylene content of at least 75 wt %;
when comonomer is present, a total co-monomer content from about 3 wt % up to about 25 wt % and a CDBI of at least 60%;
a matrix porosity of at least 35%;
a matrix median pore diameter greater than 8 μm and less than 150 μm, as determined by mercury intrusion porosimetry;
at least 50% isotactic pentads;
more than 10 regio defects per 10,000 propylene units, determined by $^{13}$C NMR;
a 1% Secant flexural modulus of at least 1800 MPa;
a melting point (Tm, DSC peak second melt) of at least 145° C.;
at least 95% by volume having a particle size greater than 150 μm up to 10 mm;
a melt flow rate (MFR, ASTM 1238, 230° C., 2.16 kg) from about 0.1 dg/min up to about 300 dg/min;
an Mw (as measured by GPC-DRI) from 50,000 to 1,000,000 g/mol; or
a combination thereof.

9. A process to polymerize propylene comprising:
(a) contacting propylene monomer under polymerization conditions with a catalyst system, the catalyst system comprising a single site catalyst precursor compound, an activator, and a support, wherein the support has an average particle size of from 30 microns up to 200 microns, a surface area of 400 m²/g or more, a pore volume of from 0.5 to 2 mL/g, and a mean pore diameter of from 1 to 20 nm (10 to 200 Å), as determined by BET nitrogen adsorption; and
(b) forming a matrix of propylene polymer comprising at least 50 mol % propylene and a porosity of 15% or more and a median pore diameter of between greater than 6 and less than 160 μm, as determined by mercury intrusion porosimetry, wherein the propylene polymer has:
1) a 1% Secant flexural modulus of at least 1000 MPa, determined according to ASTM D 790 (A, 1.0 mm/min);
2) greater than 5 and less than 200 regio defects, defined to be the sum of 2,1-erythro and 2,1-threo insertions and 3,1-isomerizations, per 10,000 propylene units, determined by $^{13}$C NMR; and
3) when comonomer is present, a composition distribution breadth index (CDBI) of 50% or more.

10. The process of claim 9, wherein the support comprises agglomerates of a plurality of primary particles.

11. The process of claim 10, further comprising fragmenting the agglomerates to disperse catalyst sites in the propylene polymer matrix.

12. The process of claim 9, wherein the support comprises spray dried silica, the spray dried silica having an average particle size of more than 50 μm, a specific surface area less than 1000 m²/g, or a combination thereof.

13. The process of claim 9, wherein the specific surface area is more than 650 m²/g and the mean pore diameter is less than 7 nm (70 Å).

14. The process of claim 9, wherein the specific surface area is less than 650 m²/g or the mean pore diameter is greater than 7 nm (70 Å).

15. The process of claim 9, wherein the activator comprises alumoxane.

16. The process of claim 9, wherein the catalyst system further comprises a co-activator, selected from the group consisting of: trimethylaluminum, triethylaluminum, triisobutylaluminum, tri-n-octylaluminum, trihexylaluminum, and diethylzinc.

17. The process of claim 9, wherein the contacting of the propylene monomer with the catalyst system is carried out in a slurry.

18. The process of claim 9, wherein the polymerization conditions comprise a pressure of from about 0.96 MPa (140 psi) to about 7 MPa (1 kpsi), a temperature of from about −20° C. to 150° C., a residence time from 15 to 720 minutes, with or without hydrogen present, and with or without an ethylene or $C_4$ to $C_{20}$ comonomer present.

19. The process of claim 9, wherein the propylene monomer in (a) is essentially free of ethylene and $C_4$ to $C_{20}$ alpha olefins, and the propylene polymer formed is a propylene homopolymer.

20. The process of claim 9, further comprising varying a concentration of hydrogen or other chain transfer agent in (a), and wherein the propylene polymer formed in (b) comprises a multimodal molecular weight distribution.

21. The process of claim 9, further comprising contacting the propylene polymer matrix from (b) with one or more alpha-olefin monomers under polymerization conditions to form a heterophasic copolymer comprising a fill phase at least partially filling the pores in the matrix.

22. The process of claim 9, further comprising melt processing the propylene polymer at a shear rate of 1000 sec$^{-1}$ or more.

23. The process of claim 9, wherein the single site catalyst precursor compound is represented by the following formula:

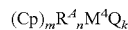

$(Cp)_m R^4_n M^4 Q_k$ wherein:
each Cp is a cyclopentadienyl moiety or a substituted cyclopentadienyl moiety substituted by one or more hydrocarbyl radicals having from 1 to 20 carbon atoms;
$R^4$ is a structural bridge between two Cp moieties;
$M^4$ is a transition metal selected from groups 4 or 5;
Q is a hydride or a hydrocarbyl group having from 1 to 20 carbon atoms or an alkenyl group having from 2 to 20 carbon atoms, or a halogen;
m is 1, 2, or 3, with the proviso that if m is 2 or 3, each Cp may be the same or different;
n is 0 or 1, with the proviso that n=0 if m=1; and
k is such that k+m is equal to the oxidation state of $M^4$, with the proviso that if k is greater than 1, each Q may be the same or different.

24. The process of claim 9, wherein the single site catalyst precursor compound is represented by the formula:

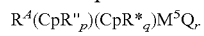

$R^A(CpR''_p)(CpR*_q)M^5 Q_r$ wherein:
each Cp is a cyclopentadienyl moiety or substituted cyclopentadienyl moiety;
each R* and R" is a hydrocarbyl group having from 1 to 20 carbon atoms and may the same or different;
p is 0, 1, 2, 3, or 4;
q is 1, 2, 3, or 4;
$R^A$ is a structural bridge between the Cp moieties imparting stereorigidity to the metallocene compound;
$M^5$ is a group 4, 5, or 6 metal;
Q is a hydrocarbyl radical having 1 to 20 carbon atoms or is a halogen;
r is s minus 2, where s is the valence of $M^5$;
wherein (CpR*$_q$) has bilateral or pseudobilateral symmetry; R*$_q$ is selected such that (CpR*$_q$) forms a fluorenyl, alkyl substituted indenyl, or tetra-, tri-, or dialkyl substituted cyclopentadienyl radical; and (CpR"$_p$) contains a bulky group in one and only one of the distal positions;
wherein the bulky group is of the formula $AR^W_v$; and
where A is chosen from group 4 metals, oxygen, or nitrogen, and $R^W$ is a methyl radical or phenyl radical, and v is the valence of A minus 1.

25. The process of claim 9, wherein the single site catalyst precursor compound is represented by the formula:

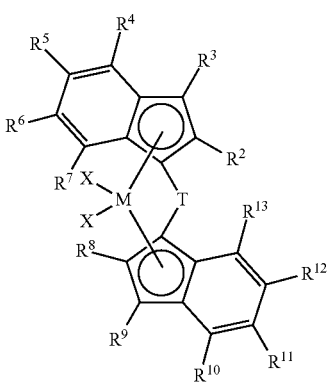

where:

M is a group 4, 5, or 6 metal;

T is a bridging group;

each X is, independently, an anionic leaving group;

each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$, or —PR'$_2$ radical, wherein R' is one of a halogen atom, a $C_1$-$C_{10}$ alkyl group, or a $C_6$-$C_{10}$ aryl group.

* * * * *